United States Patent
Mukherjee et al.

(10) Patent No.: US 12,266,804 B2
(45) Date of Patent: Apr. 1, 2025

(54) COMPOSITIONS, SYSTEMS AND METHODS FOR PRODUCING NANOALLOYS AND/OR NANOCOMPOSITES USING TANDEM LASER ABLATION SYNTHESIS IN SOLUTION-GALVANIC REPLACEMENT REACTION

(71) Applicants: Dibyendu Mukherjee, Knoxville, TN (US); Sheng Hu, Knoxville, TN (US)

(72) Inventors: Dibyendu Mukherjee, Knoxville, TN (US); Sheng Hu, Knoxville, TN (US)

(*) Notice: Subject to any disclaimer, the term of this patent is extended or adjusted under 35 U.S.C. 154(b) by 784 days.

(21) Appl. No.: 17/479,956

(22) Filed: Sep. 20, 2021

(65) Prior Publication Data

US 2022/0115674 A1 Apr. 14, 2022

Related U.S. Application Data

(62) Division of application No. 16/439,052, filed on Jun. 12, 2019, now Pat. No. 11,127,956, which is a division of application No. 15/132,916, filed on Apr. 19, 2016, now Pat. No. 10,326,146.

(51) Int. Cl.
*H01M 4/92* (2006.01)

(52) U.S. Cl.
CPC ................. *H01M 4/921* (2013.01)

(58) Field of Classification Search
CPC .............. H01M 4/921; Y02E 60/50
See application file for complete search history.

(56) References Cited

U.S. PATENT DOCUMENTS

| | | | |
|---|---|---|---|
| 7,374,730 B2 | 5/2008 | Simard et al. | |
| 7,671,306 B1 | 3/2010 | Smith et al. | |
| 8,246,714 B2 | 8/2012 | Liu et al. | |
| 10,326,146 B2 | 6/2019 | Mukherjee et al. | |
| 11,127,956 B2 | 9/2021 | Mukherjee et al. | |
| 2005/0008861 A1 | 1/2005 | Yadav et al. | |
| 2008/0087314 A1* | 4/2008 | Xiao | H10N 10/01 136/203 |
| 2009/0114061 A1 | 5/2009 | Strasser et al. | |
| 2010/0166870 A1* | 7/2010 | Iyer | B82Y 5/00 424/490 |
| 2010/0196192 A1 | 8/2010 | Liu et al. | |
| 2013/0150231 A1 | 6/2013 | Hagedorn et al. | |
| 2014/0213807 A1 | 7/2014 | Ichikawa et al. | |
| 2014/0322138 A1 | 10/2014 | Ichikawa et al. | |
| 2015/0320895 A1* | 11/2015 | Sun | B82Y 30/00 424/1.29 |
| 2016/0256930 A1 | 9/2016 | Rioux et al. | |
| 2017/0296997 A1 | 10/2017 | Mukherjee et al. | |
| 2019/0334180 A1 | 10/2019 | Mukherjee et al. | |

OTHER PUBLICATIONS

Amendola and Meneghetti, "Laser ablation synthesis in solution and size manipulation of noble metal nanoparticles," Phys. Chem. Chem. Phys., vol. 11, pp. 3805-3821 (2009).
Amendola and Meneghetti, "What controls the composition and the structure of nanomaterials generated by laser ablation in liquid solution?," Phys. Chem. Chem. Phys., vol. 15 pp. 3027-3046 (2013).
Antolini et al., "Effects of geometric and electronic factors on ORR activity of carbon supported Pt-Co electrocatalysts in PEM fuel cells," Int. J. Hydrogen Energy 30, pp. 1213-1220 (2005).
Barcikowski and Compagnini, "Advanced nanoparticle generation and excitation by lasers in liquids," Phys. Chem. Chem. Phys., vol. 15, No. 9, pp. 3022-3326 (2013).
Blakemore et al., "Co3O4 nanoparticles made by pulsed-laser ablation in liquids as high activity catalysts for water oxidation," ACS Catal., vol. 3, pp. 2497-2500 (2013).
Carpenter et al., "Solvothermal synthesis of platinum alloy nanoparticles for oxygen reduction electrocatalysis," J. Am. Chem. Soc., vol. 134, pp. 8535-8542 (2012).
Chen et al., "Synthesis of PtCu nanowires in nonaqueous solvent with enhanced activity and stability for oxygen reduction reaction," J. Power Sources, vol. 267, pp. 380-387 (2014).
Choi et al., "Synthesis and characterization of Pd @ Pt À Ni Core À Shell Octahedra with High Activity toward Oxygen Reduction," ACS Nano., vol. 8, No. 10, pp. 10363-10371 (2014).
Cortés-Escobedo et al., "Mechanically activated Pt-Ni and Pt-Co alloys as electrocatalysts in the oxygen reduction reaction," Int. J. Hydrogen Energy, vol. 39, pp. 16722-16730 (2014).
Cristoforetti et al., "Production of palladium nanoparticles by pulsed laser ablation in water and their characterization," J. Phys. Chem. C., vol. 115, pp. 5073-5083 (2011).
Duong et al., "Oxygen Reduction Catalysis of the Pt3Co Alloy in Alkaline and Acidic Media Studied by X-ray Photoelectron Spectroscopy and Electrochemical Methods, Evaluation," J. Phys. Chem. C., vol. 111, pp. 13460-13465 (2007).
Gan et al., "Element-specific anisotropic growth of shaped platinum alloy nanocrystals," Science 346 (2014) 1512-1516.
Giorgetti et al., "Cu/Ag-based bifunctional nanoparticles obtained by one-pot laser-assisted galvanic replacement," J. Nanopart. Research, 15 (2013) 1360 (12 pages).
Godínez-Salomón et al., "Enhanced electroactivity for the oxygen reduction on Ni@Pt core-shell nanocatalysts," Int. J. Hydrogen Energy, vol. 37, pp. 14902-14910 (2012).

(Continued)

*Primary Examiner* — Muhammad S Siddiquee
(74) *Attorney, Agent, or Firm* — Jenkins, Taylor & Hunt, P.A.

(57) ABSTRACT

Compositions, systems, and methods for producing nanoalloys and/or nanocomposites using tandem laser ablation synthesis in solution-galvanic replacement reaction (LASiS-GRR) are disclosed. The method may include disposing a first metal composition within a reaction cell, adding a quantity of a second metal composition into the reaction cell, ablating, with a laser, the first metal composition disposed in the quantity of the second metal composition within the reaction cell, and tuning one or more reaction parameter and/or one or more functional parameter during the tandem LASiS-GRR in order to tailor at least one characteristic of the metal nanoalloy and/or the metal nanocomposite.

19 Claims, 38 Drawing Sheets

(10 of 38 Drawing Sheet(s) Filed in Color)

(56) References Cited

OTHER PUBLICATIONS

Gorlin and Jaramillo, "A bifunctional nonprecious metal catalyst for oxygen reduction and water oxidation," J. Am. Chem. Soc., vol. 132, pp. 13612-13614 (2010).
Greeley et al., "Alloys of platinum and early transition metals as oxygen reduction electrocatalysts," Nat. Chem. 1 (2009) 552-556.
Grimaud et al., "Double perovskites as a family of highly active catalysts for oxygen evolution in alkaline solution," Nat. Commun. 4 (2013) 2439 (7 pages).
Han et al., "A seed-mediated approach to the morphology-controlled synthesis of bimetallic copper-platinum alloy nanoparticles with enhanced electrocatalytic performance for the methanol oxidation reaction," J. Power Sources. 286 (2015) 488-494.
He and Mukerjee, "Electrocatalysis of oxygen reduction on carbon-supported PtCo catalysts prepared by water-in-oil micro-emulsion," Electrochim. Acta. 55 (2010) 1709-1719.
Hsieh et al., "Ordered bilayer ruthenium-platinum core-shell nanoparticles as carbon monoxide-tolerant fuel cell catalysts," Nat. Commun. 4 (2013) 2466 (9 pages).
Hu et al., "A facile route for the synthesis of nanostructured oxides and hydroxides of cobalt using laser ablation synthesis in solution (LASIS)," Physical Chemistry Chemical Physics 16 (2014) 24034-24044 (Published Sep. 9, 2014).
Hu et al., "PtCo/CoOx nanocomposites: bifunctional electrocatalysts for oxygen reduction and evolution reactions synthesized via tandem laser ablation synthesis in solution-galvanic replacement reactions," Applied Catalysis B: Environmental 182 (2016) 286-296 (Published Sep. 18, 2015).
Hu et al., "Tandem laser ablation synthesis in solution-galvanic replacement reaction (LASiS-GRR) for the production of PtCo nanoalloys as oxygen reduction electrocatalysts," Journal of Power Sources 206 (2016) 413-423 (Published Dec. 22, 2015).
Huang et al., "Carbon-supported Pt-Co alloy nanoparticles for oxygen reduction reaction," Electrochem. Commun., vol. 8, pp. 1220-1224 (2006).
Huang et al., "Transient platinum oxide formation and oxygen reduction on carbon-supported platinum and platinum-cobalt alloy electrocatalysts," J. Electrochem. Soc., vol. 161, No. 1, pp. F10-F15 (2014).
Huang et al., "High-performance transition metal—doped Pt3Ni octahedra for oxygen reduction reaction," Science, vol. 348, Issue 6240, pp. 1230-1234 (Jun. 12, 2015).
Hwang et al., "An investigation of structure—catalytic activity relationship for Pt—Co / C bimetallic nanoparticles toward the oxygen reduction reaction," J. Phys. Chem. C. (2007) 15267-15276.
Jaksic et al., "Novel spillover interrelating reversible electrocatalysts for oxygen and hydrogen electrode reactions," J. Phys. Chem. C., vol. 114, pp. 18298-18312 (2010).
Jang et al., "Rational syntheses of core-shell Fex@Pt nanoparticles for the study of electrocatalytic oxygen reduction reaction," Sci. Rep. 3 (2013) 2872.
Jin et al., "Comparison of the oxygen reduction reaction between NaOH and KOH solutions on a Pt electrode: The electrolyte-dependent effect," J. Phys. Chem. B. 114 (2010) 6542-6548.
Kim et al., "Effects of stabilizers on the synthesis of Pt3Cox/C electrocatalysts for oxygen reduction," Int. J. Hydrogen Energy, vol. 36, pp. 12088-12095 (2011). doi:10.1016/j.ijhydene.2011.06.137.
Koh et al., "Activity-stability relationships of ordered and disordered alloy phases of Pt3Co electrocatalysts for the oxygen reduction reaction (ORR)," Electrochim. Acta. 52 (2007) 2765-2774. doi:10.1016/j.electacta.2006.08.039.
Kristian et al., "Synthesis and characterization of Co core-Pt shell electrocatalyst prepared by spontaneous replacement reaction for oxygen reduction reaction," Electrochim. Acta. 56 (2010) 1000-1007. doi:10.1016/j.electacta.2010.09.073.
Ledoux et al., "Facile and rapid synthesis of highly luminescent nanoparticles via pulsed laser ablation in liquid," Nanotechnology. 20 (2009) 445605. doi:10.1088/0957-4484/20/44/445605.
Li et al., "Development of Method for Synthesis of Pt-Co Cathode Catalysts for PEM Fuel Cells," Electrochem. Solid-State Lett. 10 (2007) B201. doi:10.1149/1.2777009.
Li et al., "Pure gold nanocages by galvanic replacement reaction of magnesium nanoparticles," RSC Adv. 4 (2014), 1185-1188. Doi: 10.1039/c3ra45995k.
Li et al., "Architecture of PtFe/C catalyst with high activity and durability for oxygen reduction reaction," Nano Res. 7 (2014) 1519-1527.
Liao et al., "Efficient solar water-splitting using a nanocrystalline CoO photocatalyst," Nat. Nanotechnol. 9 (2014) 69-73. doi:10.1038/nnano.2013.272.
Lin et al., "Synthesis and application of core-shell Co@Pt/C electrocatalysts for proton exchange membrane fuel cells," J. Power Sources, vol. 223, pp. 190-198 (2013).
Liu et al., "Synthesis of Pt3Co alloy nanocatalyst via reverse micelle for oxygen reduction reaction in PEMFCs," Top. Catal., vol. 49, pp. 241-250 (2008).
Liu et al., "Room temperature synthesized rutile TiO(2) nanoparticles induced by laser ablation in liquid and their photocatalytic activity," Nanotechnology, vol. 20, pp. 1-6 (2009).
Liu et al., "From nanocrystal synthesis to functional nanostructure fabrication: laser ablation in liquid," Phys. Chem. Chem. Phys., vol. 12, pp. 3942-3952 (2010).
Loukrakpam et al., "Atomic ordering enhanced electrocatalytic activity of nanoalloys for oxygen reduction reaction," J. Phys. Chem. C., vol. 117, pp. 20715-20721 (2013).
Markovic et al., "Oxygen Reduction Reaction on Pt and Pt Bimetallic Surfaces: a Selective Review," Fuel Cells. 1 (2001) 105-116.
Miotello and Kelly, "Laser-induced phase explosion: New physical problems when a condensed phase approaches the thermodynamic critical temperature," Appl. Phys. A Mater. Sci. Process, vol. 69 [Suppl.], pp. S67-S73 (1999).
Muniz-Miranda et al., "SERS and catalytically active Ag/Pd nanoparticles obtained by combining laser ablation and galvanic replacement," J. Alloys and Compounds 615(1) (2014) S352-S356.
Niu et al., "Hollow nanoparticles of metal oxides and sulfides: Fast preparation via laser ablation in liquid," Langmuir. 26 (2010) 16652-16657. doi:10.1021/la1033146.
Niu et al., "Galvanic replacement reactions of active-metal nanoparticles," Chem. Eur. J. 18 (2012) 4234-4241.
Notice of Allowance corresponding to U.S. Appl. No. 15/132,916 dated Jan. 28, 2019.
Notice of Allowance corresponding to U.S. Appl. No. 16/439,052 dated May 14, 2021.
Office Action (Restriction Requirement) corresponding to U.S. Appl. No. 15/132,916 dated May 4, 2018.
Office Action corresponding to U.S. Appl. No. 15/132,916 dated Oct. 2, 2018.
Office Action (Restriction Requirement) corresponding to U.S. Appl. No. 16/439,052 dated Jul. 21, 2020.
Office Action corresponding to U.S. Appl. No. 16/439,052 dated Oct. 13, 2020.
Paulus and Wokaun, "Oxygen reduction on carbon-supported Pt—Ni and Pt—Co alloy catalysts," J. Phys. Chem. B., vol. 106, pp. 4181-4191 (2002).
Sa et al., "Ordered mesoporous Co3O4 spinels as stable, bifunctional, noble metal-free oxygen electrocatalysts," J. Mater. Chem. A. 1 (2013) 9992-10001.
Salgado et al., "Structure and activity of carbon-supported Pt-Co electrocatalysts for oxygen Reduction," J. Phys. Chem. B., vol. 108, pp. 17767-17774 (2004).
Santiago et al., "Carbon-supported Pt-Co catalysts prepared by a modified polyol process as cathodes for PEM fuel cells," J. Phys. Chem. C. 111 (2007) 3146-3151.
Schenk, et al., "Platinum-cobalt catalysts for the oxygen reduction reaction in high temperature proton exchange membrane fuel cells—Long term behavior under ex-situ and in-situ conditions," J. Power Sources, vol. 266, pp. 313-322 (2014).
Shan et al., "Nanoalloy catalysts for electrochemical energy conversion and storage reactions," Rsc Adv. 4 (2014) 42654-42669.

(56) References Cited

OTHER PUBLICATIONS

Sievers et al., "Mesoporous Pt-Co oxygen reduction reaction (ORR) catalysts for low temperature proton exchange membrane fuel cell synthesized by alternating sputtering," J. Power Sources. 268 (2014) 255-260.
Stamenković et al., "Surface composition effects in electrocatalysis: Kinetics of oxygen reduction on well-defined Pt3Ni and Pt3Co alloy surfaces," J. Phys. Chem. B. 106 (2002) 11970-11979.
Stamenkovic et al., "Trends in electrocatalysis on extended and nanoscale Pt-bimetallic alloy surfaces," Nat. Mater. 6 (2007) 241-247.
Suntivich et al., "A perovskite oxide optimized for oxygen evolution catalysis from molecular orbital principles," Science 334 (2011) 1383-1385.
Toda, "Enhancement of the Electroreduction of Oxygen on Pt Alloys with Fe, Ni, and Co," J. Electrochem. Soc., vol. 146, No. 10, pp. 3750-3756 (1999).
US Department of Energy, Fuel Cell Technical Team Roadmap, Jun. 2013, Http://Www1.Eere.Energy.Gov/Vehiclesandfuels/Pdfs/Program/Fctt_Roadmap_June2013.Pdf. (2013). (80 pages).
Wang et al., "Monodisperse Pt3Co nanoparticles as a catalyst for the oxygen reduction reaction: Size-dependent activity," J. Phys. Chem. C, vol. 113, pp. 19365-19368 (Oct. 16, 2009).
Wang et al., "Synthesis of homogeneous Pt-bimetallic nanoparticles as highly efficient electrocatalysts," ACS Catal., vol. 1 ppl 1355-1359 (2011).
Wang et al., "Advanced platinum alloy electrocatalysts for the oxygen reduction reaction," ACS Catal., vol. 2, pp. 891-898 (Apr. 10, 2012).
Wang et al., "Structurally ordered intermetallic platinum-cobalt core-shell nanoparticles with enhanced activity and stability as oxygen reduction electrocatalysts," Nat. Mater. 12 (2012) 81-7.
Wang et al., "Carbon-supported Pt-based alloy electrocatalysts for the oxygen reduction reaction in polymer electrolyte membrane fuel cells: particle size, shape, and composition manipulation and their impact to activity," Chem. Rev. 115 (2015) 3433-3467.
Wagener et al., "Dynamics of silver nanoparticle formation and agglomeration inside the cavitation bubble after pulsed laser ablation in liquid," Phys. Chem. Chem. Phys. 15 (2013) 3068-3074.
Wu and Yang, "Platinum-based oxygen reduction electrocatalysts," Acc. Chem. Res., vol. 46, No. 8, pp. 1848-1857 (2013).
Yano et al., "Oxygen reduction activity of carbon-supported Pt-M (M = V, Ni, Cr, Co, and Fe) alloys prepared by nanocapsule method," Langmuir, vol. 23, pp. 6438-6445 (2007).
Yin et al., "A fast soluble carbon-free molecular water oxidation catalyst based on abundant metals," Science. 328 (2010) 342-345.
Zeng et al., "Nanomaterials via laser ablation/irradiation in liquid: a review," Adv. Funct. Mater. 22 (2012) 1333-1353.
Zhang et al., "Synthesis and oxygen reduction activity of shape-controlled Pt(3)Ni nanopolyhedra," Nano Lett., vol. 10, pp. 638-644 (2010).
Zhang et al., "Facile synthesis of platinum alloy nanoparticles with enhanced activity for ethylene glycol electro-xxidation," ECS Electrochem. Lett., vol. 3, No. 12, pp. F73-F75 (2014).
Zhang et al., "Solid-state chemistry-enabled scalable production of octahedral Pt-Ni alloy electrocatalyst for oxygen reduction reaction," J. Am. Chem. Soc., vol. 136, pp. 7805-7808 (2014).
Zhao et al., "Octahedral Pd@Pt 1.8 Ni core-shell nanocrystals with ultrathin PtNi alloy shells as active catalysts for oxygen reduction reaction," J. Am. Chem. Soc., vol. 137, pp. 2804-2807 (2015).
Zheng et al., "One-pot synthesis of platinum3cobalt nanoflowers with enhanced oxygen reduction and methanol oxidation," J. Power Sources, vol. 268, pp. 744-751 (2014).
Zhu et al., "Facial synthesis of PtM (M = Fe, Co, Cu, Ni) bimetallic alloy nanosponges and their enhanced catalysis for oxygen reduction reaction," ACS Appl. Mater. Interfaces 6 (2014) 16721-16726.
Zhu et al., "A universal and facile way for the development of superior bifunctional electrocatalysts for oxygen reduction and evolution reactions utilizing the synergistic effect," Chem.—A Eur. J., vol. 20, pp. 15533-15542 (2014).
Zignani et al., "Evaluation of the stability and durability of Pt and Pt-Co/C catalysts for polymer electrolyte membrane fuel cells," J. Power Sources 182 (2008) 83-90.

\* cited by examiner

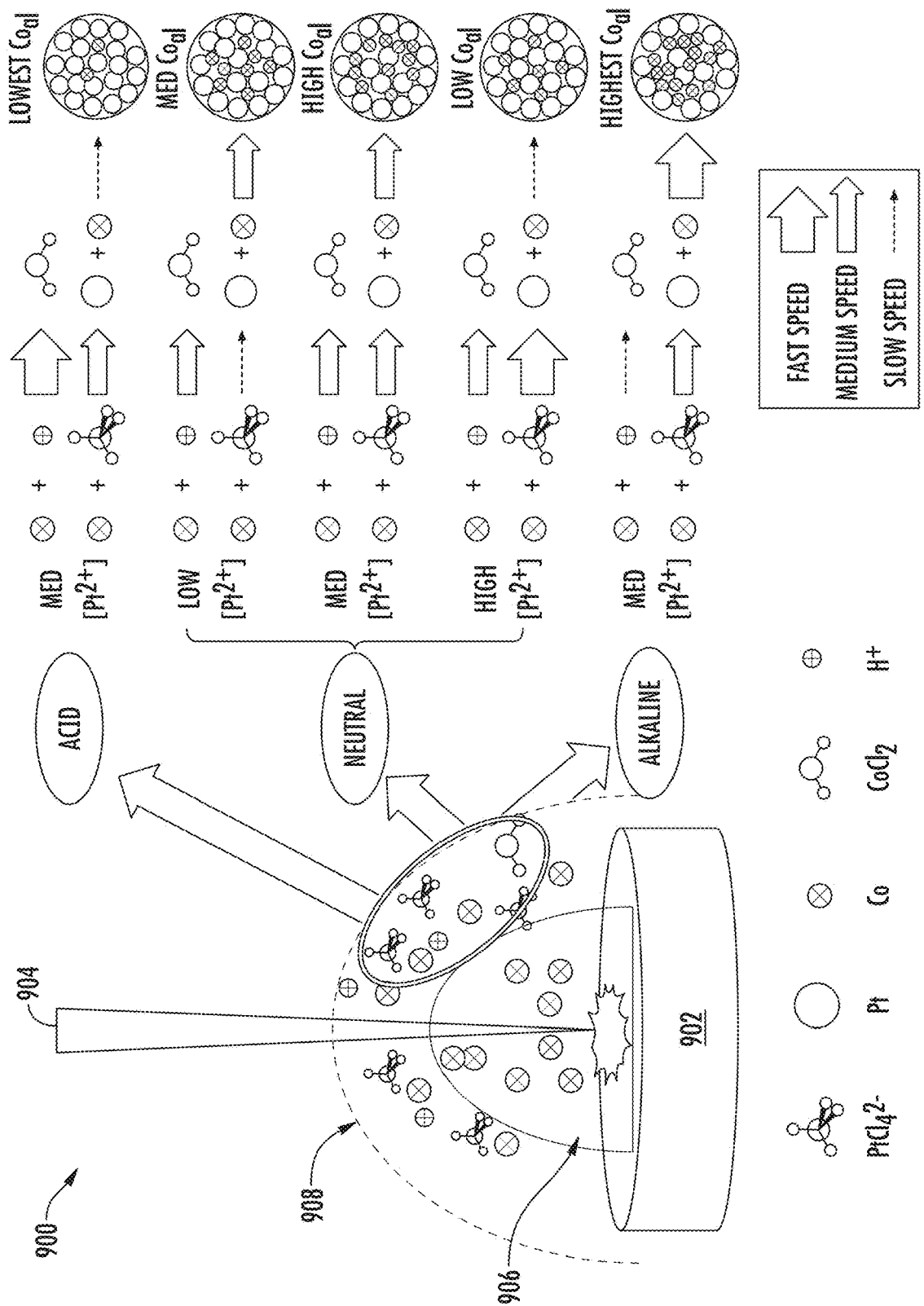

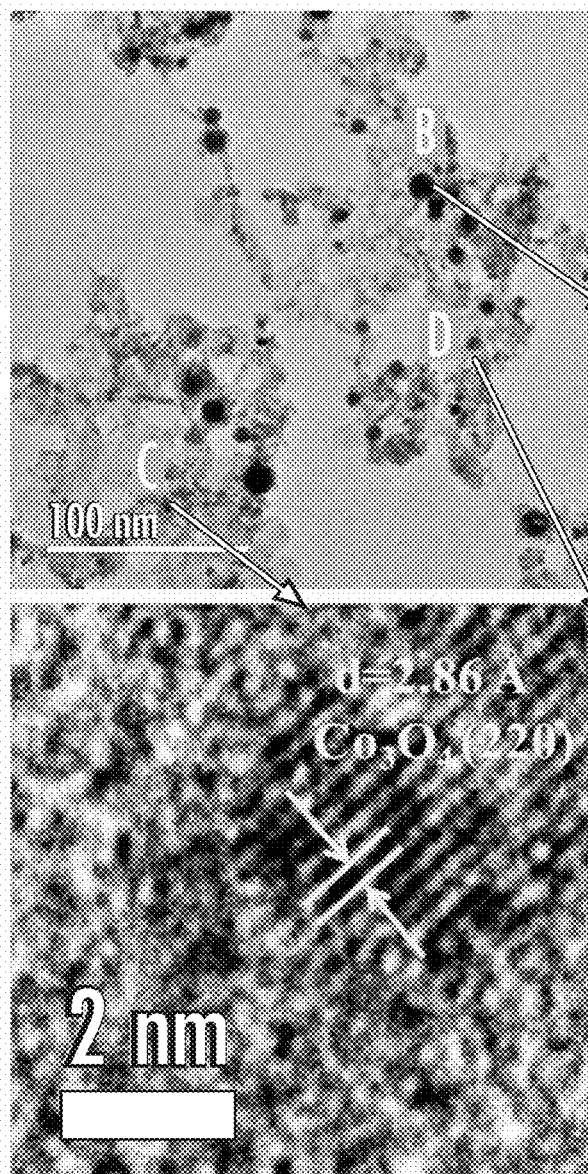
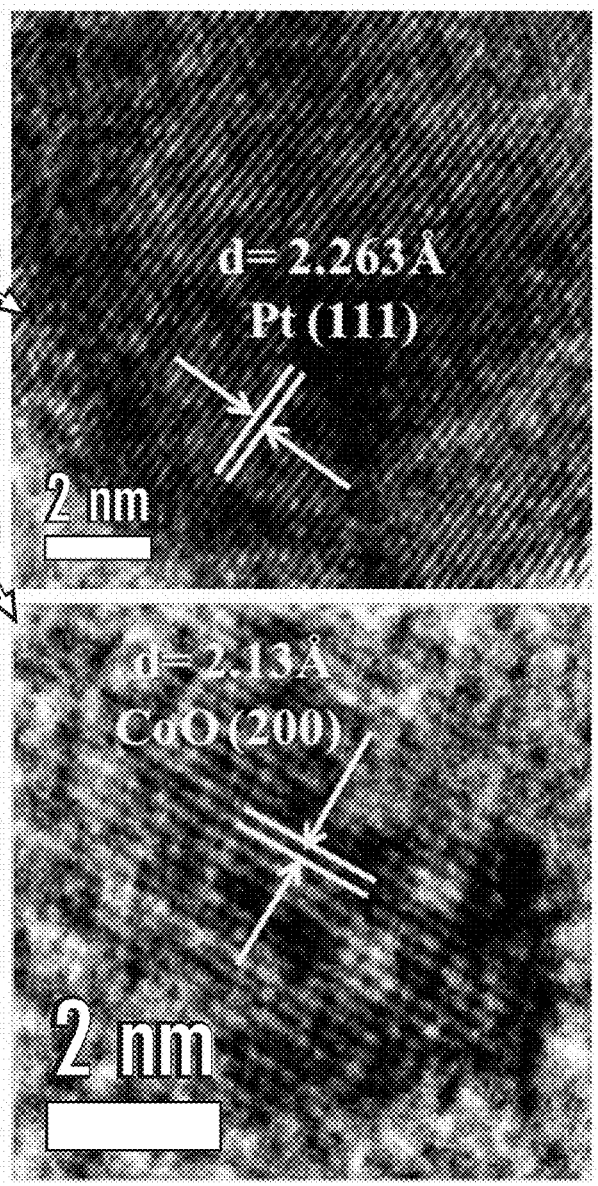
FIG. 11A  FIG. 11B
FIG. 11C  FIG. 11D

COMPOSITIONS, SYSTEMS AND METHODS FOR PRODUCING NANOALLOYS AND/OR NANOCOMPOSITES USING TANDEM LASER ABLATION SYNTHESIS IN SOLUTION-GALVANIC REPLACEMENT REACTION

RELATED APPLICATION

This application is a divisional of U.S. patent application Ser. No. 16/439,052, now U.S. Pat. No. 11,127,956, filed on Jun. 12, 2019, which is a divisional of U.S. patent application Ser. No. 15/132,916, now U.S. Pat. No. 10,326,146, filed on Apr. 19, 2016, the disclosures of each which are incorporated herein by reference in their entireties.

TECHNICAL FIELD

The presently disclosed subject matter relates generally to tandem laser ablation synthesis in solution-galvanic replacement reaction (LASiS-GRR) techniques. In some embodiments, the presently disclosed subject matter relates to compositions, systems, and methods for producing nanoalloys and nanocomposites using tandem LASiS-GRR.

BACKGROUND

Energetically expensive oxygen reduction reactions (ORR) at the cathode have been the rate determining step and hence, a severe hindrance to efficient and clean electrochemical energy conversions in low-temperature proton exchange membrane fuel cells (PEMFCs) [1-7]. To promote the ORR activities, Pt based nanocatalysts have largely been used for most commercial applications [6, 8-10]. Yet, the cost of precious metal based catalysts added to the lack of stability and durability of Pt under the highly corrosive and acidic conditions of fuel cell operations have prompted a large volume of research in recent years geared towards the development of transition metal based alloys and/or, intermetallic materials with low Pt-loading [11-16]. Specifically, recent U.S. DRIVE fuel cell technical roadmap has established the 2020 target for the total loading of Pt group metals (PGM) to be approximately 0.125 mg/cm$^2$ electrode area for PEMFC electrocatalysts [17]. To this end, alloyed nanocatalysts have gained tremendous research interest in the past decade due to their unique geometric and/or electronic characteristics that dramatically enhance their catalytic activities, while reducing the net PGM content [18-24]. Alloying Pt with transition metals such as Co, Ni, Cu, etc., have been found to effectively shrink the lattice constant (geometric effect) and tune the d-band center (electronic effect), resulting in a moderate oxygen binding energy (eV) and consequently improved specific and mass activities for electrocatalytic ORR processes [3, 19, 20, 25-28].

Among the aforementioned Pt based nanoalloys (NAs), PtCo systems have attracted the most attention due to its relatively higher activity and stability for the ORR process [5, 29-36]. The nominal Pt:Co ratio as well as the degree of alloying in these nanocatalysts play a critical role in tuning the nanoscale crystalline structures and band structures which in turn dictate the aforementioned geometric and electronic effects responsible for tailoring their ORR catalytic activities [4, 37, 38, 30]. Conventional PtCo alloys were usually prepared by simultaneous reduction of cobalt salts (e.g., Co(NO$_3$)$_2$, CoCl$_2$) and platinum precursors (Pt (acac)$_2$, K$_2$PtCl$_4$, H$_2$PtCl$_4$) in either organic or aqueous conditions, and almost always involve the use of external and indispensable stabilizing agents (CTAB, PVP, oleylamine, etc.) [1, 37, 34]. Recently, a wide range of synthesis techniques have been developed that include impregnation [30], solvothermal method [39], tandem decomposition and chemical reduction [22], polyol method [40], reverse micelle method [41], replacement reaction [42], etc. Yet, most of those synthesis techniques involve wet chemical routes that require intricate steps and even these techniques inevitably use harsh unwanted chemicals in the form of surfactants and/or, stabilizing agents. These organic residues on the nanoparticle (NP) surface are detrimental to their interfacial catalytic properties and eventually, systematic removal of those organic encapsulations from these alloyed and/or intermetallic NPs becomes a challenging and critical step in itself for large-scale production of nanocatalysts. Besides, a fine control of the Pt:Co atomic ratios and alloying degrees for systematic synthesis of a wide range of nanocatalysts still remains elusive in most of these techniques, thereby restricting the application of these ORR catalysts to only limited environmental conditions [5, 41, 38, 40, 43].

Additionally, a few recent attempts have synthesized designer nanocomposites (NCs) made from the best of both ORR (e.g., Pt NPs) and oxygen evolution reaction (OER) catalysts (e.g., transition metal oxides) However, clean synthesis of these complex nanocatalysts in a facile, cheap, and reproducible manner still remains elusive. Even here, most synthesis techniques for metal and metal oxide NPs involve wet chemical routes that require intricate experimental steps involving indispensable chemicals such as surfactants, organic ligands, reducing agents, etc. that block their active surface catalytic sites. [30, 63, 64, 65] Many metal/metal oxide NCs made from perkovsite based oxides are complicated to synthesize and require multi-step processes with harsh chemical conditions and residues. [66, 67, 68] Finally, removal of organic encapsulation (ligands and/or surfactants) from metal/metal oxide NPs itself is a challenging and critical step in their preparation. [69]

As a consequence, compositions, systems, and methods for producing NAs and/or NCs that allow precise construction of inter-atomic structures and extent of alloying in facile, cheap, and reproducible manners are needed.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this summary does not list or suggest all possible combinations of such features.

In some embodiments, a method for producing a metal nanoalloy and/or a metal nanocomposite using tandem laser ablation synthesis in solution-galvanic replacement reaction (LASiS-GRR) is provided herein. The method may comprise disposing a first metal composition within a reaction cell, adding a quantity of a second metal composition into the reaction cell, ablating, with a laser, the first metal composition disposed in the quantity of the second metal composition within the reaction cell, and tuning one or more reaction parameter and/or one or more functional parameter during the tandem LASiS-GRR in order to tailor at least one characteristic of the metal nanoalloy and/or the metal nanocomposite.

In other embodiments, a system for producing a metal nanoalloy and/or a metal nanocomposite using tandem LASiS-GRR is provided herein. The system may comprise a reaction cell, a first metal composition disposed within the reaction cell, a quantity of a second metal composition configured to be added into the reaction cell, and a laser configured to ablate the first metal composition disposed in the quantity of the second metal composition within the reaction cell, wherein the system is configured such that one or more reaction parameter and/or one or more functional parameter is tuned during the tandem LASiS-GRR in order to tailor at least one characteristic of the metal nanoalloy and/or the metal nanocomposite.

In further embodiments, a metal heteronanostructure is provided herein. In some embodiments, the metal heteronanostructure may comprise a substantially uniform alloyed core of a first metal and at least one second metal, and a shell or matrix surrounding the substantially uniform alloyed core, the shell or matrix comprising one of the first metal and at least one second metal.

In still further embodiments, a substantially uniform nanoalloy is provided herein. The metal nanoalloy may comprise a first metal and at least one second metal, wherein the first metal is a precious metal and the second metal is a non-precious, transition metal, and wherein a degree of alloying is approximately between 40-60%.

Also provided is a catalyst composition comprising a nanocomposite and/or nanoalloy as described herein.

Accordingly, it is an object of the presently disclosed subject matter to provide new methods, systems and compositions for the production of nanoalloys such as PtCo and nanocomposites such as PtCo/CoOx. These objects and other objects are achieved in whole or in part by the presently disclosed subject matter.

An object of the presently disclosed subject matter having been stated hereinabove, and which is achieved in whole or in part by the presently disclosed subject matter, other objects will become evident as the description proceeds when taken in connection with the accompanying drawings and examples as best described hereinbelow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 depicts a schematic diagram indicating the synthesis of PtCo nanoalloys by tandem LASiS-GRR using different initial $Pt^{2+}$ concentrations and pH conditions;

FIG. 11A depicts high resolution transmission electron microscopy (HRTEM) images of the PtCo-5 sample with corresponding positions (b-d) marked to indicate lattice fringes;

FIGS. 11B-11D depict HRTEM images of the corresponding positions (b-d) in FIG. 11A, respectively;

DETAILED DESCRIPTION

Figure 1:
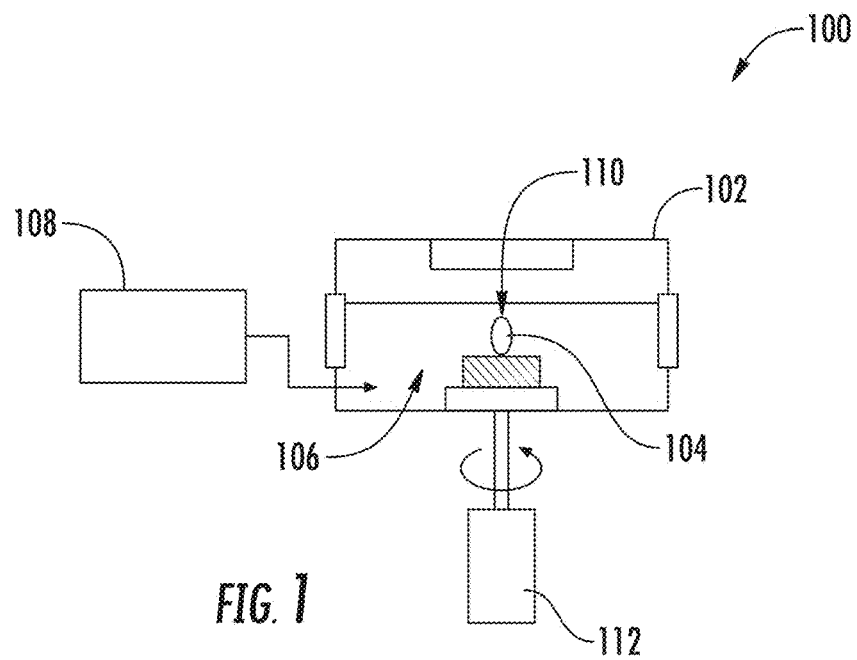
FIG. 1 depicts a schematic of a system for producing a metal nanoalloy and/or a metal nanocomposite using tandem laser ablation synthesis in solution-galvanic replacement reaction (LASiS-GRR)

Laser ablation synthesis in solution-galvanic replacement reaction (LASiS-GRR) is provided as a green synthesis technique for manufacturing nanoalloys as, for example, excellent oxygen reduction reaction (ORR) catalysts in acid electrolytes, and/or, nanocomposites as superior bifunctional catalysts for both ORR and oxygen evolution reaction (OER) in alkaline media for fuel cell applications. In some embodiments, the terms "nanoalloy" and "nanocomposite" are used herein in a manner that is consistent with how one of ordinary skill in the art of the invention would understand these terms. By way of elaboration, the term "nanoalloy" or "NA" is defined as a uniform mixture of two or multiple metals in nano-size (in some embodiments, within 100 nm) with unique crystal structure and lattice spacing different from the individual parent metal components, while the term "nanocomposite" or "NC" is defined as a multiphase material (comprised of either pure materials or compounds) with each phase in a nano-size range. The term "heteronanostructure" refers generally to a "composition" or "nanocomposition" such as, for example, a nanoalloy or a nanocomposite as described herein.

The terms "nano", "nano-sized", "nanoscale", "nanomaterial" and "nanoparticle" refer to a structure having at least one region with a dimension (e.g., length, width, diameter, etc.) of less than about 1,000 nm. In some embodiments, the dimension is smaller (e.g., less than about 500 nm, less than about 250 nm, less than about 200 nm, less than about 150 nm, less than about 125 nm, less than about 100 nm, less than about 80 nm, less than about 70 nm, less than about 60 nm, less than about 50 nm, less than about 40 nm, less than about 30 nm, less than about 20 nm, or even less than about 10 nm). In some embodiments, the dimension is between about 1 nm and about 100 nm (e.g., about 1, 2, 3, 4, 5, 10, 20, 30, 40, 50, 60, 70, 80, 90, or 100 nm).

In some embodiments, systems and methods described herein provide an improved and modified LASiS-GRR technique to synthesize pure metal NAs that exhibit excellent ORR activities in acid electrolyte solutions. More particularly, performing LASiS-GRR in tandem (i.e., simultaneously) rather than in succession or individually provides a facile, green, yet efficient route to synthesize metal NAs with tailorable sizes, compositions, and/or degrees of alloying by way of tuning one or more reaction and/or functional parameter during tandem LASiS-GRR.

In principle, LASiS involves a liquid-confined plasma plume expanding with extremely high temperatures and pressures (c.a. $10^3$ K and $10^9$ Pa respectively) [50] that thermally vaporizes a metal target and initiates ultrafast propagation of cavitation bubbles. Typically, these cavitation bubbles contain the nucleated seeding nanoparticles (NP)s that finally undergo rapid collisional quenching at the bubble-liquid interface [45, 50-54], while initiating simultaneous chemical reduction reactions with the solutions phase precursors and/or species. However, LASiS performed individually has some disadvantages, including an inability to accurately control the structure and morphology of the synthesized nanomaterial during LASiS.

Accordingly, tandem LASiS-GRR is disclosed herein in order to overcome the limitations inherent in LASiS by performing LASiS in tandem with GRR. In this manner, the inability to Accurately control the structure and morphology of the synthesized nanomaterial during LASiS is overcome via GRR at the plasma cavitation-liquid interface that is essentially initiated by the rate-limiting source production of metal target NPs via LASiS without the need for any surfactants and/or stabilizing agents that are potentially harmful for surface catalytic activities [55]. In doing so, the amount of reduced precious metal NPs that alloy with the seeding metal target NPs is tuned, thereby tailoring the composition, structure and degree of alloying in the resulting NA samples. Thus, different extents of alloying in the aforementioned NAs and in turn their catalytic properties are systematically controlled in a simple yet, elegant fashion by tuning the relative rates of one or more reaction and/or functional parameter during tandem LASiS-GRR.

Particularly, the compositions, systems, and methods disclosed herein may be used to synthesize specific metal NAs and/or NCs without external stabilizing agents. As disclosed herein, resultant metal NAs produced from tandem LASiS-GRR from a first metal composition and at least one second metal composition may exhibit substantially uniformly alloyed cores with a metal-rich shell of a few nanometers. Such a core-shell structure along with high degrees of alloying in these metal NAs may be configured with outstanding electrocatalytic ORR activities in acid electrolytes, to be discussed in more detail below, which are attributed to the efficacy of tandem LASiS-GRR route to rationally tune size distributions and/or compositional ratios and alloying degrees of the NAs and/or NCs without the use of any surfactants or reducing agents that are otherwise indispensable in chemical synthesis methods, but harmful for catalytic performances.

FIG. 1 illustrates a schematic of a system, generally designated 100, for producing a metal NA or NC using tandem LASiS-GRR. In some aspects, system 100 may include a reaction cell 102, a first metal composition, generally designated 104, comprising a non-precious, transition metal target disposed within the reaction cell 102, a second metal composition, generally designated 106, comprising a quantity of a solution of one or more precious metal salt precursor configured to be injected into the reaction cell 102, and a laser 110 configured to ablate the non-precious, transition metal target 104 disposed in the quantity of the precious metal salt solution 106 for a period of time within the reaction cell 102. In some aspects, the system 100 may further comprise an injection unit 108 and/or a motor 112, as well as, but in no way limited to, one or more of heating coil(s), a washing/decanting centrifuge unit, a dryer unit (e.g., a diffusion dryer), a thermocouple, and/or an ultrasonicator.

The reaction cell 100 may be configured as a partially enclosed space in which at least the first and second metal compositions (i.e., the non-precious transition metal target and the precious metal salt precursor) 104, 106 may be contained for control and/or tenability of one or more reaction and/or functional parameter during tandem LASiS-GRR so as to tailor specific characteristics of an NC and/or NA and hence optimize its catalytic properties. In some aspects, the reaction cell 102 may be a cell configured to allow for injections of the quantity of a solution of one or more precious metal salt precursor 106. The reaction cell 102 may be configured to enable gas and/or temperature control, which may be tunable as one or more environmental parameter during LASiS-GRR. For example, purging $N_2$ and $O_2$ from the reaction cell may result in formation of $Co(OH)_2$ and CoO respectively during LASiS on Co; while high temperature LASiS may lead to a much faster phase transfer for the produced metastable species into higher oxidation states. The reaction cell 102 may also be configured to receive a continuous supply of the quantity of the metal salt solution 106 through an injection unit 108. More particularly, a continuous supply of the quantity of metal salt 106 at a controlled speed through an injection unit 108 may enable mass production of NCs through tandem LASiS-GRR. A mounted probe ultrasonicator (not shown) may provide simultaneous ultrasonication that may quickly disperse newly injected precious metal salt solution 106 and prevent an ablated species from aggregation. As a result, a high surface to volume ratio for ORR and/or OER activities may be maintained for the products. One or more heating coil (not shown) may be provided on a bottom surface of reaction cell 102 in order to heat the quantity of the metal salt solution 106 and/or the target 104. Other functional and/or reaction parameters may also be tuned via the reaction cell 102.

The quantity of a solution of one or more precious metal salt precursor 106 may be a solution-phase metal precursor mixed with water. For example, the solution-phase metal precursor may be $K_2PtCl_4$ (>99.9%) in de-ionized water (DI-water; Purity=99.9%; Conductivity=18.2 M$\Omega$/cm at 25° C.). Different concentrations of the precious metal salt solution 106, such as 125, 250, 375, and 500 mg/l may be tuned in order to tailor at least one characteristic of the metal NA. In some aspects, the quantity of a solution of one or more precious metal salt precursor 106 may be bubbled with another element, e.g., $N_2$, for a period of time after injection into the reaction cell 102. For example, the period of time may be 30 minutes.

A non-precious, transition metal target 104 may be formed as a pellet and disposed within the reaction cell 102. For example, a Co pellet having 99.95% purity, ¼" diameter×¼" height may be utilized. The pellet 104 may undergo a period of ablation at which point a laser 110, e.g., a 1064 nm laser (330 mJ/pulse, 10 Hz) may ablate the pellet 104 and produce seeding metal NPs. The laser 110 may be configured as a pulsed or a continuous laser having different laser energy, wavelength, duration time, etc. For example, the laser 110 may be an Nd:YAG pulsed laser configured to emit 532 nm (165 mJ/pulse) and/or 1065 nm (330 mJ/pulse). Tuning the laser 110 to ablate the target 104 for a different ablation time may result in tailoring at least one characteristic of the metal NA, such as the size, morphology, shape, etc. For example, an ablation time of 4, 7, 13, and 20 minutes may be used and may be predetermined in order to achieve a specified percent reduction (e.g., 60% reduction) in the initial solution-phase metal precursor in the quantity of a solution of one or more precious metal salt precursor 106. In some aspects, the non-precious, transition metal target 104 may be rotated during ablation. For example, the target 104 may be rotated by a stepper motor 112 at a uniform speed of 0.3 rpm during ablation.

Ablation of the non-precious, transition target 104 may result in production of a colloidal solution having a specific pH value. The pH value of the colloidal solution may be adjusted to be more acidic or more alkaline. For example, the pH value of the colloidal solution may be decreased by adding acid (e.g., HCl, KOH) to the solution. Tuning the pH value in this manner may also result in tailoring at least one characteristic of the metal NA, such as the size, morphology, shape, etc.

After tandem LASiS-GRR, the metal NAs may be collected and decanted using for example, a centrifuge (not shown) mixed with a high pressure inert gas. For example, the metal NAs may be centrifuged at 4700 for 15 minutes and decanted by washing with DI-water. Afterwards, the metal NAs may be re-dispersed in either water or ethanol, and then mixed with carbon black for producing fuel cell catalysts. Thus, in some embodiments, provided are catalyst compositions comprising a nanocomposite and/or nanoalloy in accordance with the presently disclosed subject matter.

Notably, during tandem LASiS-GRR at the liquid front, the target 104 may undergo competing reactions. For example, the reactions include: (1) Reactions with the solution-phase $H^+$ ions from water; and/or (2) GRR with ions from the one or more precious metal salt precursor 106. The second reaction results in the formation of precious metal NPs that rapidly alloy with the remaining seeding NPs in the quantity of a solution of one or more precious metal salt precursor 106 to form the metal NAs. Accordingly, the aforementioned reaction pathways are systematically driven by tuning the initial precious metal salt concentrations and solution phase pH to synthesize metal NAs with controllable characteristics including, but not limited to, size, atomic ratio and alloying degrees.

Figure 2:
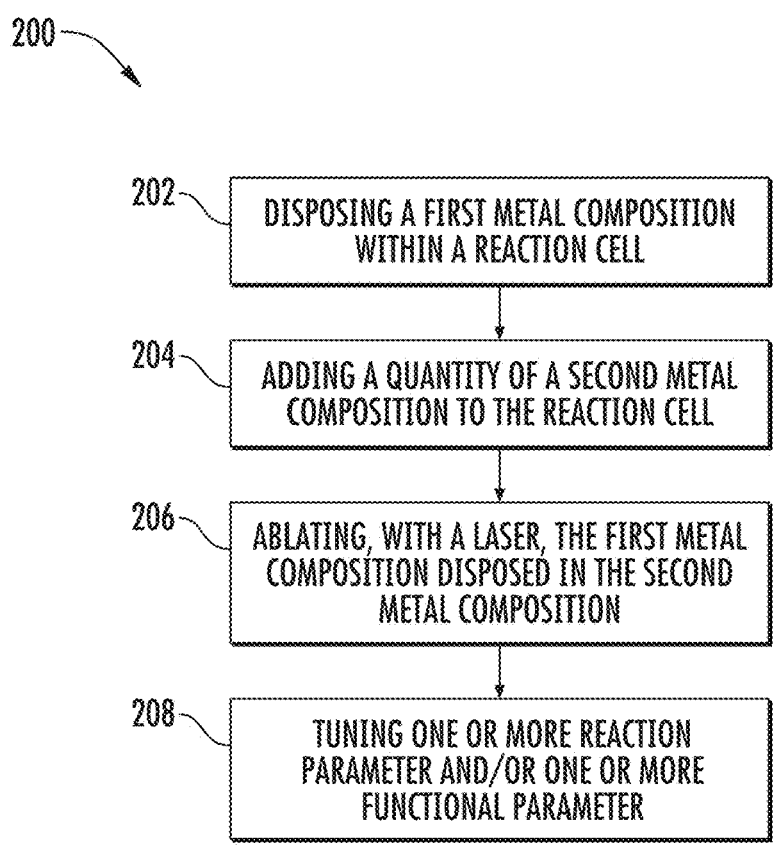
FIG. 2 depicts a flow diagram of a method for producing a metal nanoalloy and/or a metal nanocomposite using tandem LASiS-GRR.

FIG. 2 illustrates a flow diagram of a method, generally designated 200, for producing a metal NA using tandem LASiS-GRR. In a first step 202, the method comprises disposing a first metal composition within a reaction cell. For example, step 202 may comprise disposing a non-precious, transition metal as a solid metal target 104 for ablation within the reaction cell 102 as illustrated in FIG. 1.

In a second step 204, the method comprises adding a quantity of a second metal composition into the reaction cell. For example, step 204 may comprise injecting into the reaction cell 102 a quantity of a solution of one or more precious metal salt precursor 106 chosen to bear a higher redox potential than the non-precious, transition metal target 104.

In a third step 206, the method comprises ablating, with a laser, the first metal composition disposed in the quantity of the second metal composition within the reaction cell. For example, step 206 may comprise ablating with a laser 110 the non-precious, transition metal target 104 disposed in the quantity of a solution of one or more precious metal salt precursor 106 inside the reaction cell 102, while the non-precious, transition metal target 104 is continuously rotated for uniformly ablation. In some aspects, the non-precious, transition metal target 104 may be configured to be rotated by a motor 112, as illustrated in FIG. 1.

In a fourth step 208, the method comprises tuning one or more reaction parameter and/or one or more functional parameter during the tandem LASiS-GRR in order to tailor at least one characteristic of the metal NA and/or the metal NC. For example, step 208 may comprise tuning one or more laser parameter comprising laser energy (fluence) between approximately, e.g., 0.5-500 $J/cm^2$, including but not limited to 1, 5, 10, 50, 60, 100, 200, 250, 300, 400, or 500 $J/cm^2$, laser wavelength using for example, a 532 or 1064 nm laser, and a period of time the laser is configured to ablate the first metal composition; environmental parameters comprising an initial quantity of a solution of the second metal composition in the reaction cell, and a solution phase pH condition, such as but not limited to a pH between approximately 0 to 14, including but not limited to a pH of about 1, 2, 3, 4, 5, 6, 7, 8, 9, 10, 11, 12, 13 or 14; and/or a functional parameter comprising simultaneous ultra-sonication for dispersing ablated species, controlled chemical injection of the second metal composition or other chemical agents, rotation of the first metal composition for uniform ablation, and controlled temperature and environmental gas (e.g., $N_2$, $O_2$, etc.) for the reaction cell in order to tailor at least one of a size, a shape, a structure, and/or a composition of the metal NA and/or the metal NC.

In some embodiments, the presently disclosed subject matter relates to compositions including at least metal heteronanostructures, a term broad enough to encompass both a metal NA and a metal NC. In some embodiments, a metal heteronanostructure in accordance with the presently disclosed subject matter comprises a first metal and at least a second metal. In some embodiments, the metal heteronanostructure is produced using tandem LASiS-GRR. In some embodiments, the metal heteronanostructure is stable under acidic and/or alkaline conditions. In some embodiments, a metal heteronanostructure in accordance with the presently disclosed subject matter is a nanomaterial.

In some embodiments, a metal heteronanostructure in accordance with the presently disclosed subject matter has at least one characteristic configured to be tailored during the tandem LASiS-GRR by tuning one or more reaction parameter and/or one or more functional parameter during the tandem LASiS-GRR. In some embodiments, the at least one characteristic comprises a size, a shape, a structure, and/or a composition of the metal composition.

In some embodiments, the metal composition can comprise nano-sized particles that are approximately spherical. When the nano-sized particle is approximately spherical, the characteristic dimension can correspond to the diameter of the sphere. In addition to spherical shapes, the nanomaterial can be disc-shaped, plate-shaped (e.g., hexagonally plate-like), oblong, polyhedral, rod-shaped, cubic, or irregularly-shaped.

In some embodiments, the tailoring of the composition comprises a particular degree of metal alloying, such as but not limited to 40-60%. As illustrated in the Examples provided herein below, for particular specific PtCo NA compositions, the products have spherical shapes, with mean size ranging from 3-18 nm, and the degree of alloying ranging from 40-60%. By rationally tailoring of these compositions, the electrocatalytic activity of the NAs may then be optimized.

In some embodiments, the tailoring of the composition comprises providing a mean crystallite size, which can be estimated from XRD data. In some embodiments, crystallite size ranges from about 1 to 20 nm. In some embodiments, the mean crystallite size is about 1, 2, 3, 4, 5, 6, 7, 8, 9, 10, 11, 12, 13, 14, 15, 16, 17, 18, 19, or 20 nm.

For particular PtCo NA compositions, by rationally tailoring of the mean crystallite size, the electrocatalytic activity of the NAs may then be optimized.

In some embodiments, the first metal used as the target for tandem LASiS-GRR bears a lower redox potential than the redox potential of the second metal, such as a second metal used in the form of salt precursor solution. In some embodiments, the seeding metal NPs generated from LASiS on the first metal target get oxidized, while reducing the second metal salt precursor in turn during the GRR. In some embodiments of a metal heteronanostructure of the presently disclosed subject matter, the first metal comprises a non-precious, transition metal and the at least one second metal comprises at least one precious metal having a higher redox potential than the non-precious, transition metal. Notably, where the first metal comprises a metal other than a non-precious, transition metal and the at least one second metal comprises a metal other than at least one precious metal, tandem LASiS-GRR may still synthesize an NC and/or an NA as long as the second metal comprises a higher redox potential than the first metal.

Any precious metal or transition metal as would be apparent to one of ordinary skill in the art upon a review of the instant disclosure comprise can be employed in accordance with the presently disclosed subject matter. Representative precious metals include but are not limited to platinum (Pt), gold (Au), silver (Ag), copper (Cu), palladium (Pd), rhodium (Rh), ruthenium (Ru), iridium (Ir), and osmium (Os).

A representative non-precious transition metal is a 3-d transition metal. Thus, representative transition metals can include, for example, scandium (Sc), titanium (Ti), vanadium (V), chromium (Cr), manganese (Mn), iron (Fe), cobalt (Co), nickel (Ni), copper (Cu), and zinc (Zn). In some embodiments, the transition metal can be any element with a partially filled d sub-shell or which can form a cation with a partially filled d sub-shell. In some embodiments, the transition metal can be any element from the d- or f-block of the Periodic Table. Thus, in some embodiments the transition metal can be selected from Sc, Ti, V, Cr, Mn, Fe, Co, Ni, Cu, Zn, yttrium (Y), zirconium (Zr), niobium (Nb), molybdenum (Mo), technium (Tc), ruthenium (Ru), rhodium (Rh), palladium (Pd), silver (Ag), cadmium (Cd), lutetium (Lu), hafnium (Hf), tantalum (Ta), tungsten (W), rhenium (Rd), osmium (Os), iridium (Ir), platinum (Pt), gold (Au), rutherfordium (Rf), dubnium (Db), seaborgium (Sg), bohrium (Bh), hassium (Hs), copernicium (Cn), elements in the actinide series (i.e., actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr)) and elements in the lanthanide series (i.e., cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), terbium (Tb), thulium (Tm), and ytterbium (Yb)). In some embodiments, the transition metal is a non-precious transition metal such as, but not limited to, Sc, Ti, V, Cr, Mn, Fe, Co, Ni, Y, Zr, Nb, Mo, Tc, Lu, Hf, Ta, W, Rd, Rf, Db, Sg, Bh, Hs, Cn, Ac, Th, Pa, U, Np, Pu, Am, Cm, Bk, Cf, Es, Fm, Md, No, Lr, Ce, Dy, Er, Eu, Gd, Ho, La, Lu, Nd, Pr, Pm, Sm, Tb, Tm, and Yb.

The metal heteronanostructure can comprise a core region (i.e., the space between the outer dimensions of a particle of the composition) and a shell or matrix (i.e., a surface that defines the outer dimensions of a particle of the composition). In some embodiments, a metal heteronanostructure in accordance with the presently disclosed subject matter comprises a substantially uniform alloyed core of a first metal and at least one second metal; and a shell or matrix surrounding the substantially uniform alloyed core, the shell or matrix comprising one of the first metal and the at least one second metal. In some embodiments, a substantially uniform alloyed core comprises a uniform first metal to at least one second metal ratio. For example, a ratio ranging from 0-38% may be provided.

In still further embodiments, a substantially uniform nanoalloy is provided herein. The metal nanoalloy may comprise a first metal and at least one second metal. In some embodiments, the first metal is a precious metal and the second metal is a non-precious, transition metal. In some embodiments, a degree of alloying is approximately between 40-60%, such as about 40, 42, 44, 46, 48, 50, 52, 54, 56, 58 and 60%.

In some embodiments, a nanocomposite and/or nanoalloy of the presently disclosed subject matter further comprises a third metal. In some embodiments, the substantially uniform alloyed core comprises the first metal, the second metal, and the third metal; and the shell or matrix surrounding the substantially uniform alloyed core comprises one or more of the first metal, the second metal, and the third metal. In some embodiments, the third metal has a higher redox potential than the first metal, the second metal, or both the first metal and the second metal. In some embodiments, both the second and the third metal formed from the reduction of metal salt precursors have higher redox potential than the first metal. For example, for PtCuCo NA, the redox potential for the respective first, second and third metals are $Co^{2+}/Co=-0.28$ V, $[PtCl_4]^{2-}/Pt=0.755$ V, $Cu^+/Cu=0.52$ V. In some embodiments, a degree of alloying among the first, second, third or more metal is approximately between 40-60%, such as about 40, 42, 44, 46, 48, 50, 52, 54, 56, 58 and 60%.

As used herein "substantially uniform" can refer to an alloy wherein the element distribution is generally uniform for each individual alloy particle and/or throughout each particle (e.g., the second metal is uniformly distributed throughout a solid composition of the first metal). In some embodiments, the ratio of metals remains substantially the same throughout an alloy particle. In some embodiments, the percentage of non-precious transition metal varies only by about ±10%, ±9%, ±8%, ±7%, ±6%, ±5%, ±4%, ±3%, ±2%, ±1% or less between any two points in a solid particle (e.g., a nanoparticle) comprising the alloy or between any two particles of the alloy. For example, when the percentage of non-precious transition metal varies only by about ±5% between any two points in an alloy particle, one region of the particle can comprise about 10% of the non-precious transition metal and about 90% of the precious metal, while another region of the particle can comprise about 15% of the non-precious transition metal and about 85% of the precious metal.

Alternatively, in some embodiments, "substantially uniform" can refer to the alloy particles all comprise approximately the same shape or having the same size (e.g., where the largest diameter of any alloy particle in a mixture of particles varies only by about 20, 15, 10, 9, 8, 7, 6, 5, 4, 3, 2, or 1 nm from the largest diameter of any other particle in the mixture).

In some embodiments, the shell or matrix comprises an oxide of one of the first metal and the at least one second metal such that the metal heteronanostructure is a metal nanocomposite. In some embodiments, the shell or matrix surrounding the substantially uniform alloyed core comprises the precious metal or the non-precious, transition metal. In some embodiments, the substantially uniform alloyed core comprises a uniform precious metal to at least one non-precious, transition metal ratio, with the ratio ranging from 0-38%. Accordingly, the metal heteronanostructure may be formed from a precious metal that is reduced 20-40% as compared to a known composition comprising a precious metal, such as a known catalyst composition, which can provide a significant cost savings. For example, the metal heteronanostructure may comprise PtCo having a 20-40% reduction in Pt as compared to a known composition comprising Pt, such as a known Pt catalyst composition.

In some embodiments, the metal heteronanostructure is a metal NA that comprises a crystal structure having shrinkage in the lattice spacing, thereby indicating the alloy formation of two or more metals, and not the parent metals segregated. By way of elaboration and not limitation, the presently disclosed subject matter can comprise formation of binary and/or ternary NAs whose crystal structure indicates shrunken lattice spacing as compared to the lattice spacing for the parent metals, thereby establishing that the NAs formed do not comprise segregated intermetallic or pure metallic components. For instance, in the Examples presented herein below, a PtCo NA comprises lattice constant that shrinks from 3.92 Å (for pure Pt) to 3.83 Å (with 38% Co). Thus, in some embodiments, a metal NA or a metal NC in accordance with the presently disclosed subject matter can comprise a shrinkage in lattice constant ranging from approximately between 0 to 2.4%, including but not limited to about 0.4, 0.8, 1.2, 1.6, 2.0 or 2.4% shrinkage in lattice constant.

In some embodiments, a metal heteronanostructure of the presently disclosed subject matter is a binary NA that may be produced from the tandem LASiS-GRR disclosed herein and includes, but is not limited to, PtCo, PtNi, PtCu, and PdCo, while a ternary NA that may be produced from the tandem LASiS-GRR disclosed herein includes, but is not limited to, PtCuCo, PtCoMn, and PtCoNi. Likewise, a binary NC may be produced by tandem LASiS-GRR and includes an NA embedded in a nanomatrix. For example, an NA of PtCo may be embedded in CoOx to provide a binary metal NC of PtCo/CoOx, which provides for the synergic "spill-over effect" that accelerate both ORR and OER on the preferred phases, i.e., ORR on PtCo NA and OER on CoOx through symbiotic, site-specific adsorption/desorption of intermediate species, while preventing aggregation and/or dissolution of the NA in alkaline medium. More particularly, while it is not desired to be bound by any particular theory of operation, it appears that each of the sites provides refuge for the undesirable species from the other sites, thereby promoting both the reactions. A binary metal NC, such as PtCo/CoOx, may exhibit improved bifunctional catalytic properties, which may be attributed to the unique heteronanostructuring of alloyed PtCo NPs embedded in the sponge-shaped $CoO_x$ matrices which, while contributing to the enhanced ORR and OER behaviors due to the synergic "spillover" effects, prevent the PtCo NPs from aggregation and dissolution in the alkaline media. Additional binary NCs that may be produced from the tandem LASiS-GRR disclosed herein include, but are not limited to, PdCo/CoOx, Ag/ZnO, and Ag/TiOx.

EXPERIMENTAL RESULTS

A Zeiss Libra 200MC monochromated transmission electron microscope (TEM) was used with an accelerating voltage of 200 kV for regular TEM characterizations along with selected area electron diffraction (SAED) and high resolution transmission electron microscopy (HRTEM) imaging. Large-scale and small-scale elemental mappings are obtained from energy dispersive X-ray spectroscopy (EDX) and electron energy-loss spectroscopy (EELS) analysis. In-formation limitation of HRTEM image is 0.1 nm. Spatial resolution of the STEM image is approximately 0.4 nm. Resolution of EELS spectrum with monochromator is 0.1 eV measured at full width of half maximum (FWHM) of zero-loss peak in the vacuum. Inductively coupled plasma optical emission spectroscopy (ICP-OES) obtained from Perkin Elmer, OPTIMA 4300™ DV was used to measure the concentration for both Pt and Co nanoparticles (NPs). Standard cobalt dichloride solution (≤99%) and $K_2PtCl_4$ solution (>99.9%) were used for calibration. X-ray diffraction (XRD) was carried out on a Phillips X'Pert-Pro diffractometer equipped with a Cu Ka source at 40 kV and 20 mA. The mean crystal sizes of the NAs were calculated according to Scherrer equation:

$$d = \frac{0.9\lambda}{\beta \cos\theta} \qquad \text{Equation 1}$$

where d is the mean crystal size, λ is wavelength of the X-ray, β is the line broadening at FWHM, Θ is the Bragg angle.

The Co atomic fractions in the alloy (x) were evaluated using the Vegard's law, $$x = \left\lfloor \frac{a - a_0}{a_s - a_0} \right\rfloor \cdot x_s \qquad \text{Equation 2}$$

where $a_o$ and $a_s$ are the lattice parameters of Pt (0.393 nm) and $Pt_3Co$ (0.383 nm), and $x_s$ is the Co atomic fraction (0.25) in the $Pt_3Co$ catalyst. The degree of alloy, i.e., the alloyed $Co(Co_{al})$ to total Co in the catalyst ($Co_{tot}$) ratio can then be expressed by:

$$\frac{Co_{al}}{Co_{tot}} = \frac{xPt_{ICP}}{(1-x)Co_{ICP}} \qquad \text{Equation 3}$$

where $Pt_{ICP}$ and $Co_{ICP}$ are the integral atomic ratios of Pt and Co from ICP-OES measurements, respectively.

In some aspects, a rotating disk electrode (RDE) setup was bought from Pine instrument company, LLC. A conventional, three-compartment electrochemical cell comprising of a saturated double junction Ag/AgCl electrode as the reference electrode, a glassy carbon RDE with diameter of 5 mm as the working electrode, and a platinum coil as the counter electrode were used. Slightly different setups were used for testing ORR and/or OER activities for NCs and NAs.

In some aspects, for testing bifunctional ORR and/or OER activities of NCs, all electrochemistry (EC) tests were carried out at room temperature in 1.0 M KOH solution with the reference electrode calibrated in response to the RHE. 30% Pt/C from BASF was used as the standard catalyst for comparison. For ORR tests, synthesized NPs were first mixed with Vulcan XC-72 carbon black (CB) powder (particle size between approximately 20-40 nm, procured from Cabot Company) in aqueous solution with a weight ratio of 1:4 (NP:CB). After 2 hours of ultrasonication, the slurry was stirred for 24 hours and then completely dried in a vacuum at approximately 80° C. Thereafter, the catalyst ink was prepared by suspending 2 mg of the dried mixture in 0.5 mL methanol and 25 µl of 5 wt % Nafion solution (Sigma-Aldrich, density 0.874 g/mL) via 30 mins of ultrasonication. For preparing the working electrode, 6 µL of the prepared catalyst ink was coated on the RDE where the NP loading density was calculated to be 24.5 µg/cm². As for the OER tests, synthesized NPs were deposited on the GCE directly by vacuum drying at room temperature, with a deposition density calculated as 2 µg/cm² for all the catalysts. Linear sweep voltammogram (LSV) for ORR and OER were conducted on the RDE set-up by sweeping the potential from +0.3 to +1.1 V (ORR) and +1.1 to +1.7 V (OER) respectively.

In some aspects, for testing ORR activities for the NAs, 0.1 M HClO₄ solution was used as electrolyte, 20% Pt/C from BASF was used as the standard catalyst for comparison. Synthesized NPs were first mixed with Vulcan XC-72 CB powder (particle size approximately between 20-40 nm, procured from Cabot Company) in aqueous solution with a weight ratio of 1:3 (NP:CB). After 2 hours of ultrasonication, the slurry was stirred for 24 hours and then, completely dried in vacuum at 80° C. Thereafter, the catalyst ink was prepared by suspending 2 mg of the dried mixture in 1 mL ethanol and 5 µl of 5 wt % Nafion™ solution (Sigma-Aldrich, density 0.874 g/mL) via 30 min of ultrasonication. For preparing the working electrode, rotational drying method was applied wherein, 10 µL of the prepared catalyst ink was casted on the surface of the glassy carbon electrode (GCE) that was inversely placed on the RDE setup and rotated at 700 rpm for 5 min. The NP loading density was calculated to be 25 µg/cm². Cyclic voltammetry was conducted over a potential range from +0.05 V to +1.00 V at a scan rate of 50 mV/s after pre-scan the same potential range at 100 mV/s for 50 cycles. The ORR polarization curves were obtained by sweeping the potential from +0.05 to +1.02 V at a scan rate of 5 mV/s and a rotation rate of 1600 rpm. The dynamics of the electron transfer process in ORR were analyzed through the rotating disk voltammetry (RDV) at different speeds (ranging between 400 and 2200 rpm) based on the Koutecky-Levich (KL) equation:

$$\frac{1}{J} = \frac{1}{J_K} + \frac{1}{J_L} = \frac{1}{J_K} + \frac{1}{B\omega^{1/2}} \quad \text{Equation 4}$$

$$J_K = nFKC_0; \quad \text{Equation 5}$$
$$B = 0.62nFC_0D_0^{2/3}v^{-1/6}$$

where J, $J_K$ and $J_L$ are the measured, kinetic, and diffusion limiting current densities, respectively, n is the electron transfer number, F is the Faraday constant (96 485 C*mol⁻¹), Co and Do are the dissolved O₂ concentration the O₂ and the diffusion coefficient in the electrolyte respectively, n is the electrode rotation rate in rpm. Tafel plots are generated using the kinetic current $J_K$ as determined from:

$$J_K = \frac{J \cdot J_L}{J_L - J} \quad \text{Equation 6}$$

The electrochemical surface area (ECSA) was determined by the hydrogen desorption area in the CV curve between 0.05 and 0.4 V vs. RHE based on the following equation:

$$ECSA = \frac{Q_H}{m \times q_H} \quad \text{Equation 7}$$

where $Q_H$ is the charge for hydrogen desorption, m is the loading amount of metal in the electrode, and $q_H$ is the charge required for monolayer desorption of hydrogen on Pt (210 µC/cm²).

Example 1—Synthesis of Binary Nanoalloys 1.1—Different Pt Salt Concentrations

The PtCo NA samples of PtCo-1, PtCo-2, PtCo-3, and PtCo-4, as synthesized by LASiS-GRR for various K₂PtCl₄ concentrations and ablation times are depicted in the TEM images in FIGS. 3A-3D along with the corresponding SAED patterns (inset). Notably, the scale bar in the SAED patterns is 5 (1/nm).

Figure 3A:
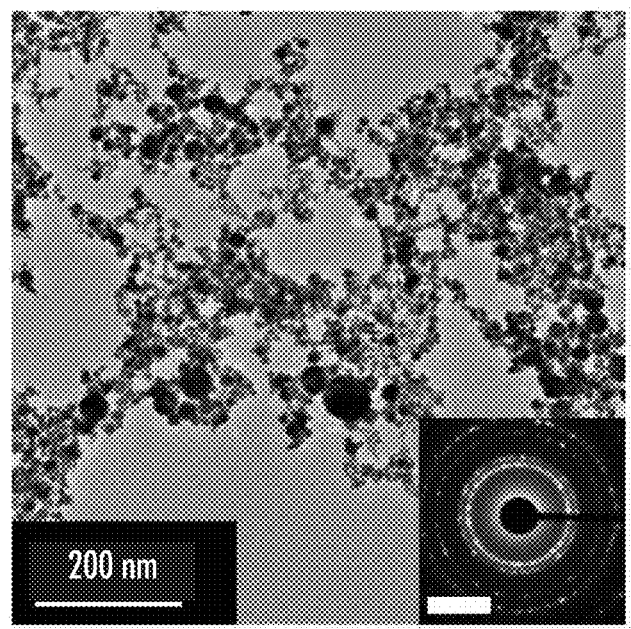
FIGS. 3A-3D depict transmission electron microscope (TEM) images with selected area electron diffraction (SAED) images inset of four different PtCo nanoalloy samples PtCo-1, PtCo-2, PtCo-3, PtCo-4, respectively, as synthesized by tandem LASiS-GRR for various $K_2PtCl_4$ concentrations and ablation times.
Figure 3B:
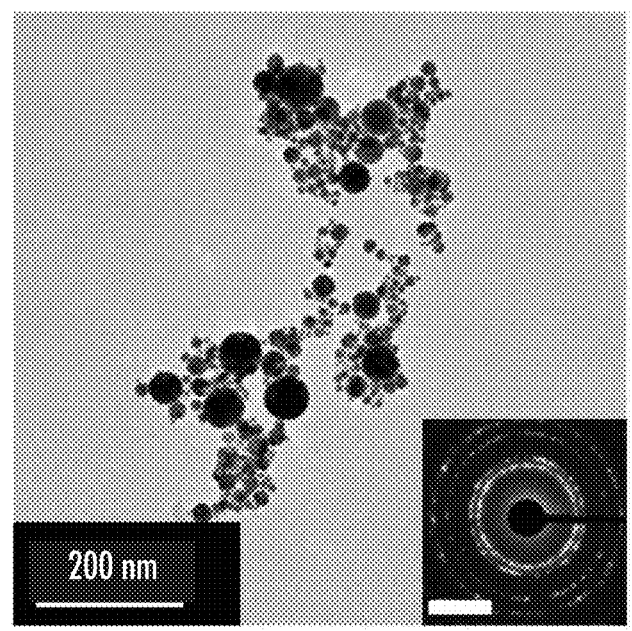
Figure 3C:
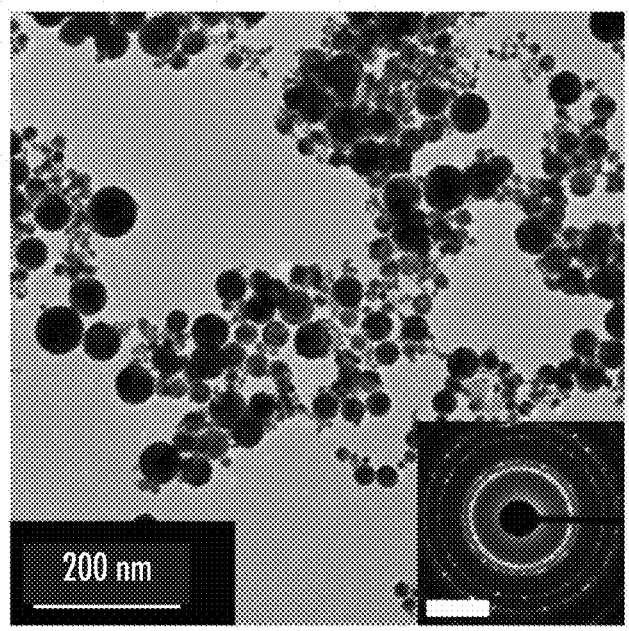
Figure 3D:
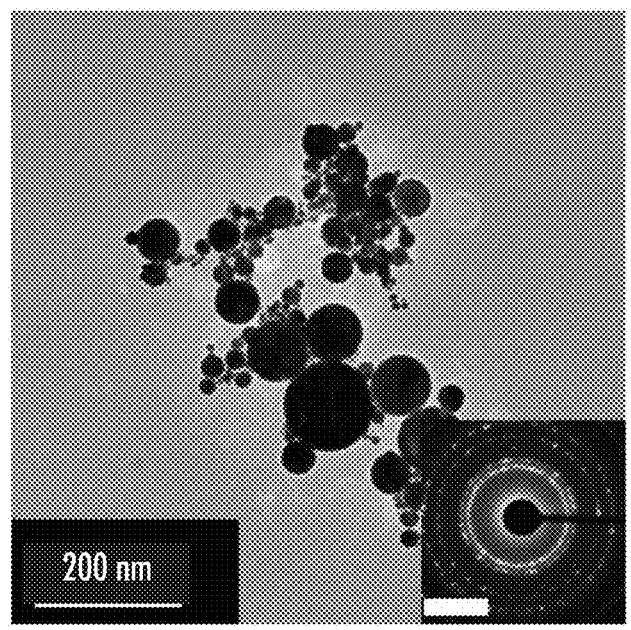

FIG. 3A illustrates PtCo-1 synthesized at a K₂PtCl₄ concentration of 125 mg/l with a respective ablation time of 4 minutes. FIG. 3B illustrates PtCo-2 synthesized at a K₂PtCl₄ concentration of 250 mg/l with a respective ablation time of 7 minutes. FIG. 3C illustrates PtCo-3 synthesized at a K₂PtCl₄ concentration of 375 mg/l with a respective ablation time of 13 minutes. FIG. 3D illustrates PtCo-4 synthesized at a K₂PtCl₄ concentration of 500 mg/l with a respective ablation time of 20 minutes.

In some aspects, experiments were performed using differently synthesized NA samples of PtCo-1, PtCo-2, PtCo-3, and PtCo-4. In each of the differently synthesized NA samples, it was determined that the initial products from the LASiS-GRR synthesis were found to be alloyed PtCo NPs embedded in sponge shaped $CoO_x$ matrices. In some aspects, post-treatment of the as-synthesized PtCo/$CoO_x$ NC suspensions with HCl acid solutions at pH2 for 20 hours led to the complete removal of all $CoO_x$ matrices leaving behind the pure spherical PtCo NAs. These spherical PtCo NAs are found to exhibit clean PtCo characteristic diffraction rings as seen from SAED patterns in FIGS. 5A-H. The particles are largely found to be spherical due to the surface atom reconstruction induced by laser irradiation [57]. TEM images in FIGS. 3A-3D also illustrate a systematic increase in the average particle sizes between the samples PtCo-1 and PtCo-4. Detailed mean crystallite sizes, as estimated from XRD data, are found to be approximately 3.16, 4.7, 9.00 and 10.06 nm for PtCo-1, PtCo-2, PtCo-3, and PtCo-4 samples, respectively (Table 1).

TABLE 1

| | K₂PtCl₄ C (mg/l) | Co ratio % (ICP-OES) | 2θ (111) | Crystallite size (nm) | a (Å) | x | Degree of alloying (%) |
|---|---|---|---|---|---|---|---|
| pH 3 | 250 | 6.4 | 39.81 | 17.98 | 3.919 | 0.03 | 44.77 |
| pH 7 | 125 | 20.6 | 40.2 | 3.16 | 3.882 | 0.12 | 53.33 |
| | 250 | 22.1 | 40.29 | 4.7 | 3.874 | 0.14 | 58.01 |
| | 375 | 19.9 | 40.13 | 9 | 3.889 | 0.1 | 46.57 |
| | 500 | 15.5 | 40.05 | 10.06 | 3.896 | 0.09 | 51.7 |
| pH 11 | 250 | 38.1 | 40.85 | 4.15 | 3.828 | 0.26 | 55.96 |

Figure 4:
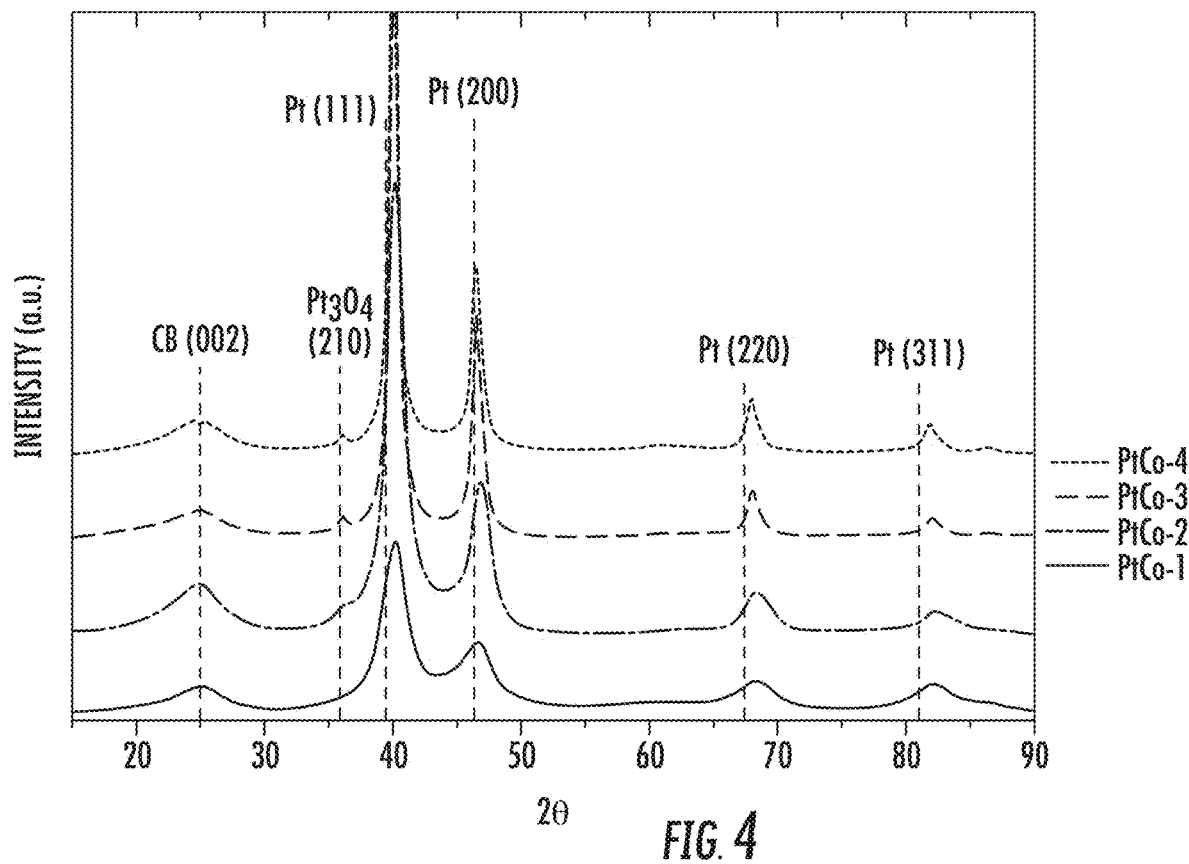
FIG. 4 depicts a graphical comparison of x-ray diffraction (XRD) patterns for different PtCo nanoalloy samples PtCo-1, PtCo-2, PtCo-3, PtCo-4, respectively, as synthesized by tandem LASiS-GRR for various $K_2PtCl_4$ concentrations and ablation times.

FIG. 4 illustrates a comparison of XRD patterns for various PtCo NAs synthesized at different initial K₂PtCl₄ concentrations and ablation times. Notably, the black dashed lines in FIG. 4 mark the standard peak positions for the respective labeled species. Mean crystallite sizes are calculated from the FWHM of the PtCo (111) peaks in the XRD patterns by applying the Scherrer equation (Equation 1). The augmentation of mean particle sizes with higher initial [$Pt^{2+}$] is due to the larger degree of coalescence and/or Ostwald ripening among the seeding PtCo NPs due to faster reduction rates of the $K_2PtCl_4$ salt by the seeding Co NPs [56]. The alloying of Co into Pt is demonstrated by the clear shift of PtCo characteristic peaks to higher angles in the XRD patterns in FIG. 4, when compared to the corresponding 2Θ values for pure Pt peaks. Specifically, the Pt (111) peak shifts from 39.8° for pure Pt to 40.20°, 40.29°, 40.13°, and 40.05° for PtCo-1, PtCo-2, PtCo-3 and PtCo-4 NAs, respectively, is in accordance with the evolution of Co atomic ratios (%) of 20.6, 22.1, 19.9, and 15.5 in the respective alloys, as calculated from ICP-OES measurements (shown in Table 1). Table 1 also summarizes the values of Co atomic fractions in the alloys (x) and the ratio of alloyed Co (forming $Pt_3Co$) to total Co ($Co_{al}/Co_{tot}$), as calculated from Vegard's law (Equation 2) and ICP-OES measurement (Equation 3). These calculations reveal the alloying degrees to vary from approximately 44% to approximately 58% for the aforementioned respective PtCo NAs synthesized. Notably, it was found during experimentation that surface facets of a specific PtCo-2 particle are dominated by the PtCo (111) that is well-known for its lower oxygen binding energy and hence, higher ORR activity [30, 58, 59].

Figure 5A:
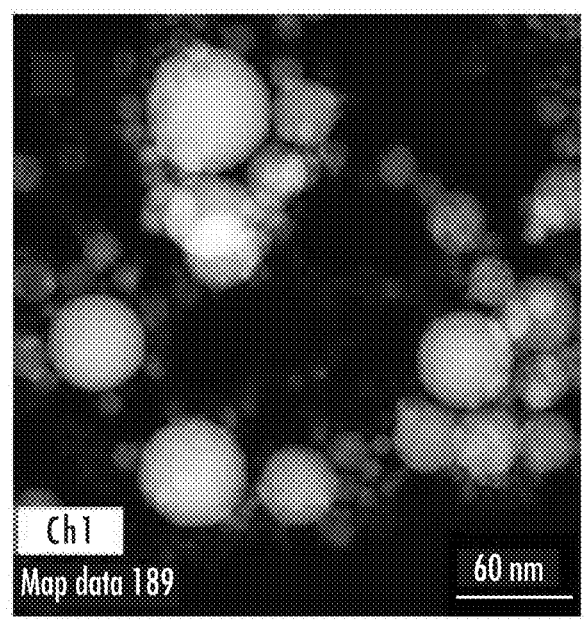
FIG. 5A depicts an energy dispersive x-ray spectroscopy (EDX) elemental mapping result for a PtCo-2 sample as synthesized by tandem LASiS-GRR.
Figure 5B:
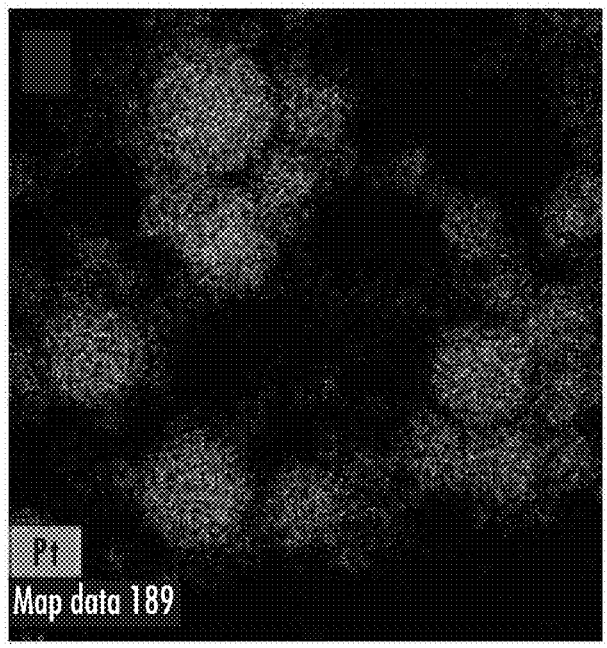
FIGS. 5B-5C depict EDX elemental mapping results for Pt and Co, respectively, in the PtCo-2 sample of FIG. 5A.
Figure 5C:
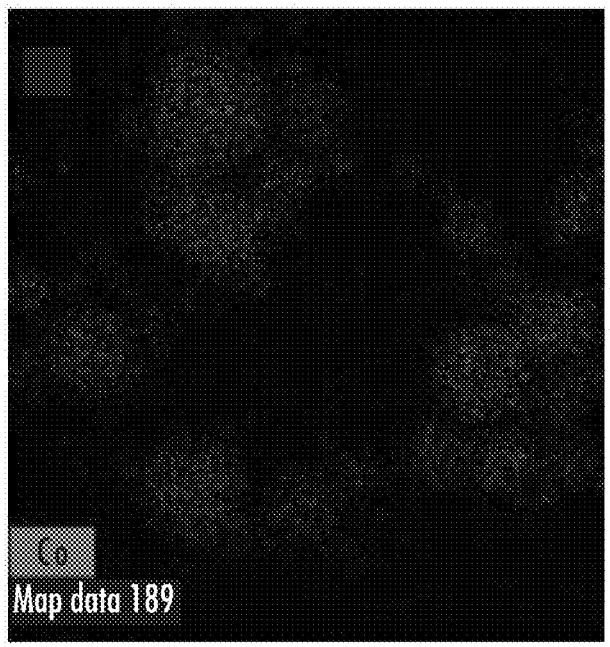
Figure 5D:
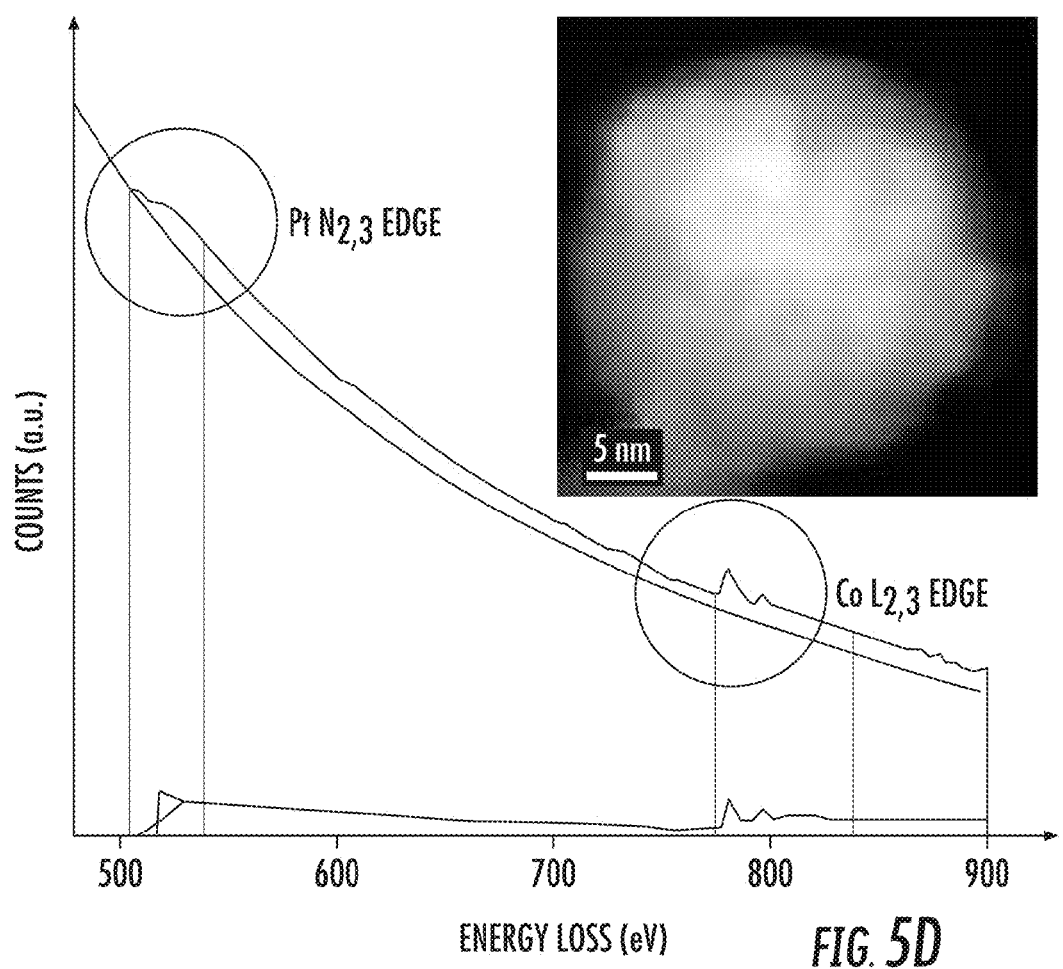
FIG. 5D depicts an electron energy-loss spectroscopy (EELs) analysis elemental mapping result for a PtCo-2 sample (inset) as synthesized by tandem LASiS-GRR.
Figure 5E:
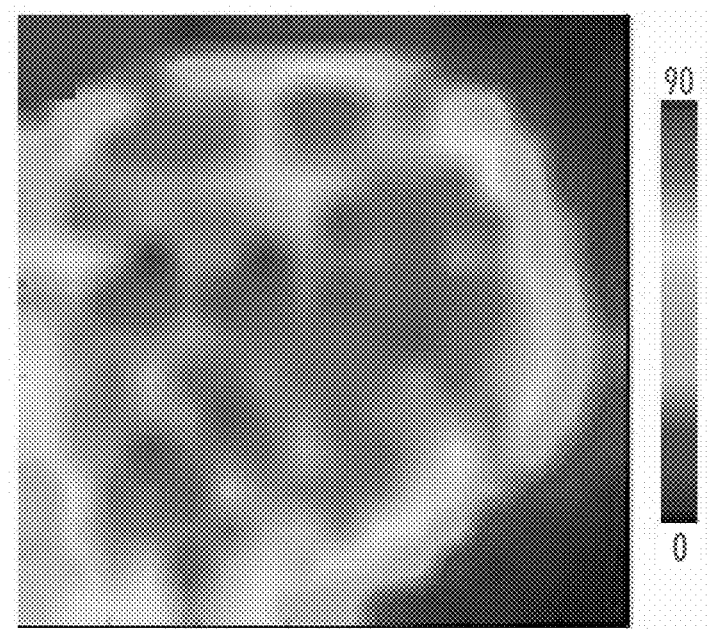
FIGS. 5E-5F depict EELs analysis elemental mapping results for Pt and Co, respectively, in the PtCo-2 sample of FIG. 5D.
Figure 5F:
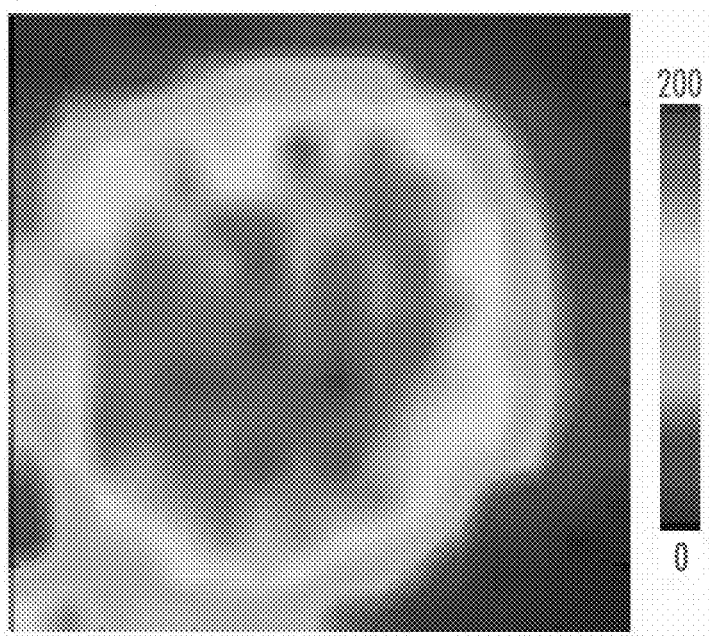
Figure 5G:
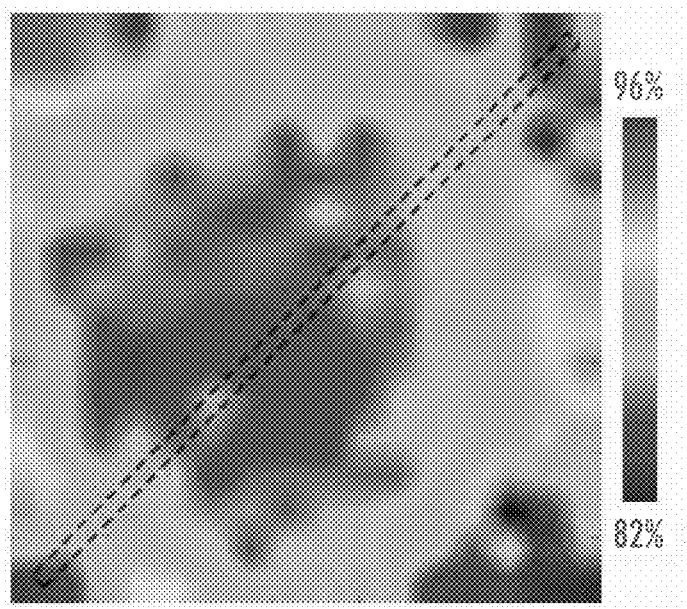
FIG. 5G depicts an EELs analysis elemental mapping result illustrating the Pt/Co atomic ratio for the PtCo-2 sample from FIGS. 5E-5F.
Figure 5H:
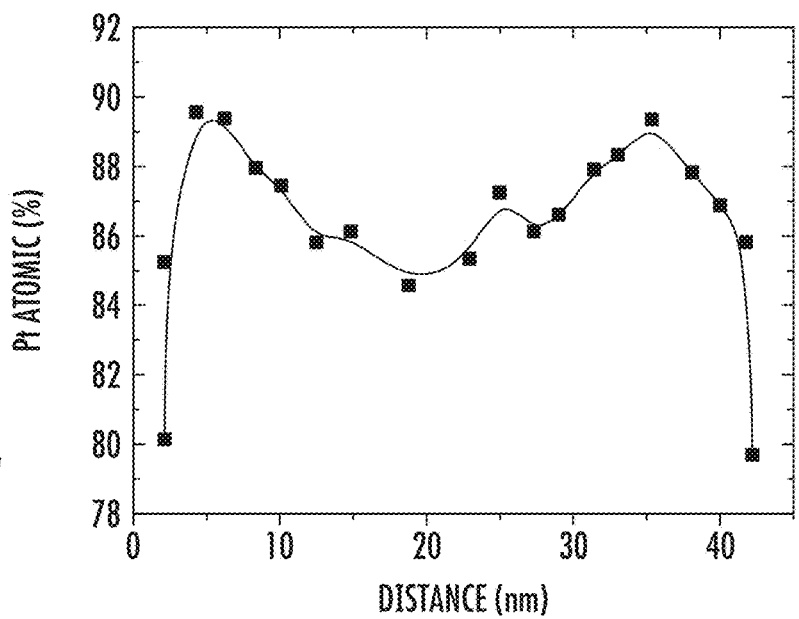
FIG. 5H depicts a graphical representation of a Pt atomic ratio (%) distribution across the line scan across the dashed line illustrated in FIG. 5G.

In an effort to further investigate the elemental distributions within the NAs from large-scale as well as detailed elemental mappings respectively, EDX and EELS measurements for the PtCo-2 sample are illustrated in FIGS. 5A-5H. The EDX mapping results in FIGS. 5A-5C illustrate that both Pt and Co are uniformly distributed in all the NPs. FIG. 5D illustrates a representative EELS spectrum taken from a single NP (shown in the inset), where the two groups of peaks with onsets located at approximately 519 and 779 eV are ascribed to the Pt—$N_{2,3}$ and the Co-$L_{2,3}$ edges respectively. The corresponding Pt and Co EELS mapping for this particle are exhibited in FIGS. 5E-5F, where the Pt distribution area (FIG. 5E) is found to be slightly larger than that for Co (FIG. 5F). For better comparison, the Pt:Co ratio mapping along with a representative line scan across the particle is shown in FIG. 5G, and the corresponding Pt atomic (%) distribution across this line scan is shown in FIG. 5H. These results reveal a thin Pt-rich layer (i.e., a few nanometers) as the particle shell wherein the Co (%) increases gradually towards inner layers. In contrast, the center of the NP bears a relatively uniform but lower Pt:Co ratio (e.g., Pt:Co is approximately 4.5:1). Here it needs to be mentioned that in spite of the higher accuracy of the EELS technique, the inclusion of other signals (e.g., O—K edge at 532 eV) and random noises in the broad Pt—$N_{23}$ peak from EELS data can contribute to the slightly higher value of the Pt:Co ratios as calculated from EELS measurements, when compared to that from EDX/ICP-OES quantifications.

1.2—Different pH Conditions

Figure 6:
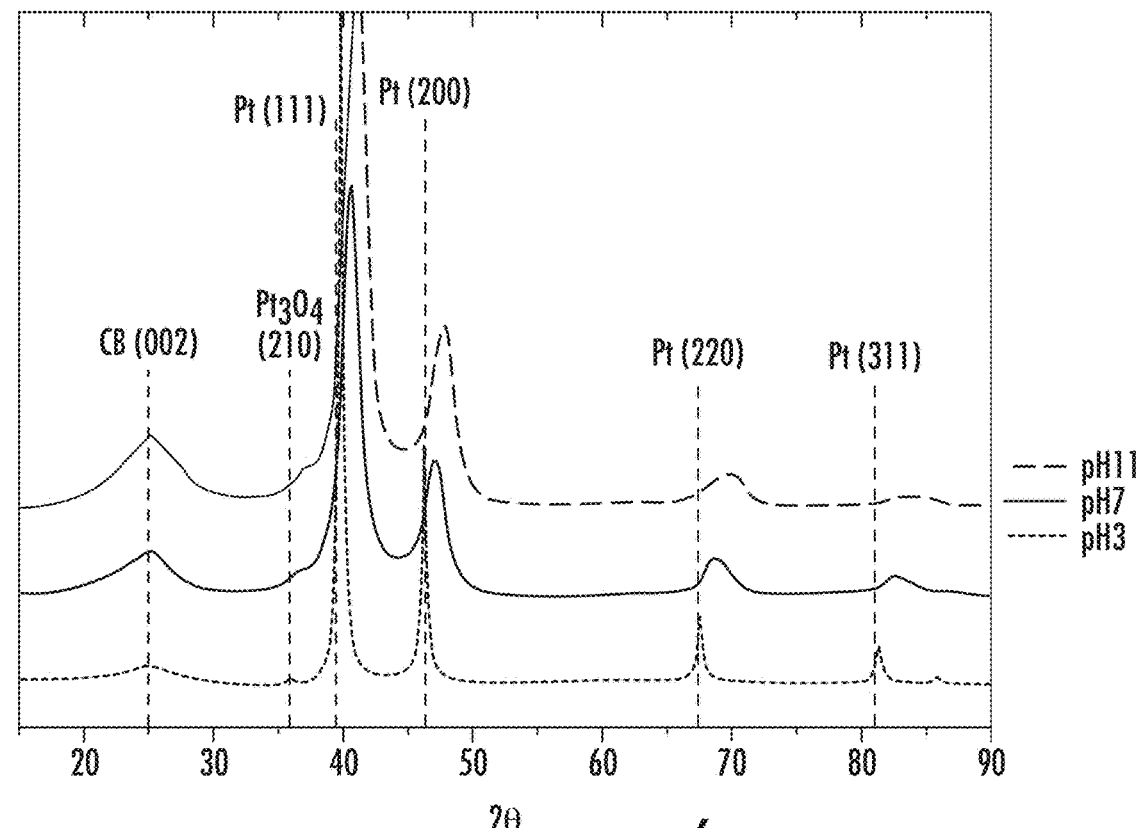
FIG. 6 depicts a graphical comparison of x-ray diffraction (XRD) patterns for different PtCo nanoalloy samples PtCo-1, PtCo-2, PtCo-3, PtCo-4, respectively, as synthesized by tandem LASiS-GRR for various PH conditions and same initial $K_2PtCl_4$ concentrations and ablation times.

For investigating the impact of the solution phase [$H^+$] on the structure and composition of the resultant NAs, similar experiments were carried out at pH3 and pH11 conditions respectively (with initial [$K_2PtCl_4$] of 250 mg/l, and ablation time of 7 min) followed by HCl treatment at pH2 conditions. The PtCo NAs synthesized at pH3 show a much larger mean crystallite size (e.g., approximately 17.98 nm) as compared to those at pH11 condition (e.g., approximately 4.15 nm). The EDX mappings and spectra also indicate that Co molar ratio in the NA products rises up with the solution phase pH (namely from pH3, pH7, pH11), as discussed in details in the supporting information along with corresponding TEM images in Table 1. It needs to be mentioned that under pH11 conditions, the $Pt^{2+}$ gets reduced to $Pt(OH)_2$ that eventually precipitates as $PtCl_2$ thereby reducing both Pt formation and agglomeration. In this case, addition of saturated NaCl solution followed by centrifugation for two times helped remove the unwanted $PtCl_2$ salts. The ICP-OES results also support the EDX data wherein the three Co molar ratios for pH3, pH7 and pH11 cases are found to be 6.4%, 22.1% and 38.1% respectively (Table 1). Furthermore, FIG. 6 illustrates XRD patterns for PtCo NAs at different pH conditions with same initial $K_2PtCl_4$ concentration and ablation time (250 mg/l and 7 min), where the dash lines mark the standard peak positions for each species. In FIG. 6, the XRD profiles indicate negligible shift in 2θ value (39.81°) for the characteristic PtCo (111) peak in the pH3 sample as compared to the remarkable positive shift (40.85°) in 2θ values for the PtCo alloy formed at pH11, which is much higher than those for the PtCo-2 sample (40.29°) as well as for standard $Pt_3Co$ (40.53°) alloys. In such a case $Pt_1Co_1$ alloy (41.4°) with tetragonal crystalline structure might have been partially formed. The aforementioned results for different and yet, directed alloying under different pH conditions are achieved by controlling the relative concentrations of $Pt^{2+}$, Co and $H^+$ in the system. Specifically, in acid condition, majority of the Co NPs undergo direct oxidation by solution phase [$H^+$], which results in fewer amounts of Co available for $Pt^{2+}$ reduction and even less available for alloying with Pt. Conversely, at pH11 condition, direct oxidation of Co is to a great extent hindered due to the extremely low [$H^+$] in solution. As a consequence, large amount of Co take part in GRR with $Pt^{2+}$ and in turn alloying with Pt, thereby leading to a much higher $Co_{al}$ in the final products.

Figure 7A:
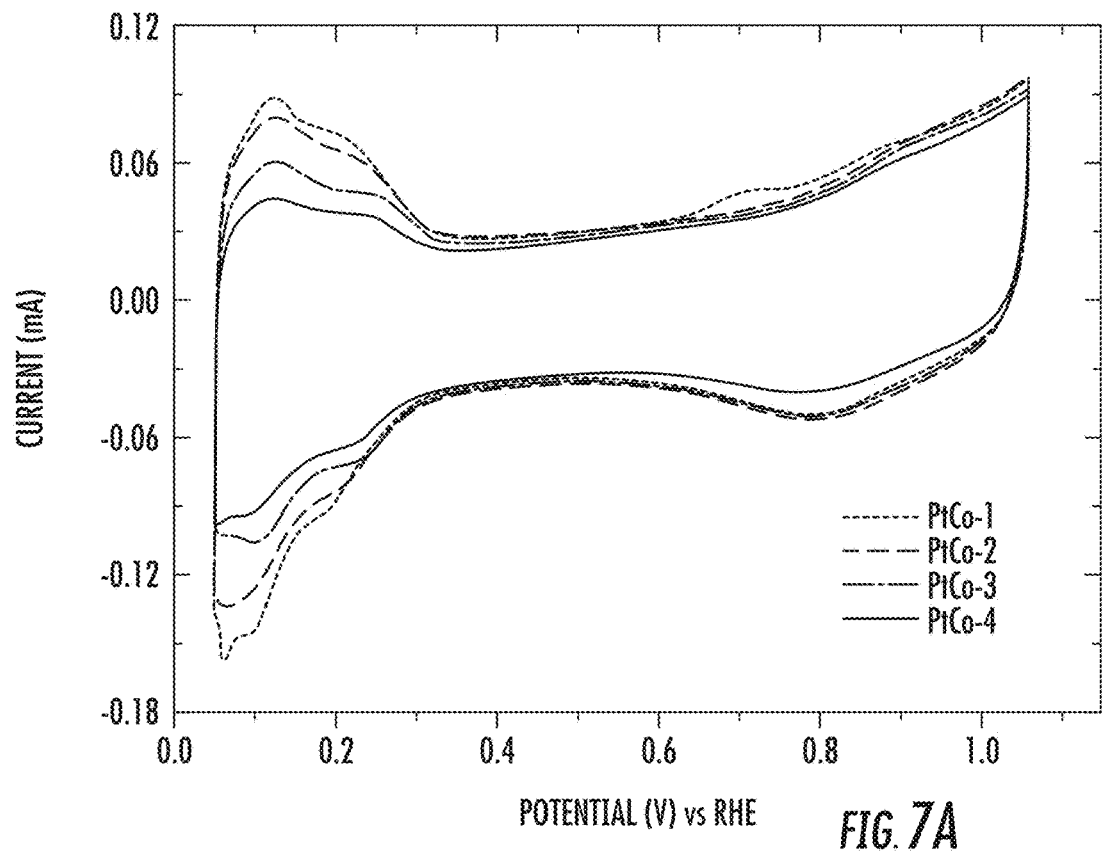
FIG. 7A depicts cyclic voltammetry curves at a scan rate of 50 mV/s for different PtCo nanoalloy samples PtCo-1, PtCo-2, PtCo-3, PtCo-4, respectively, as synthesized by tandem LASiS-GRR.
Figure 7B:
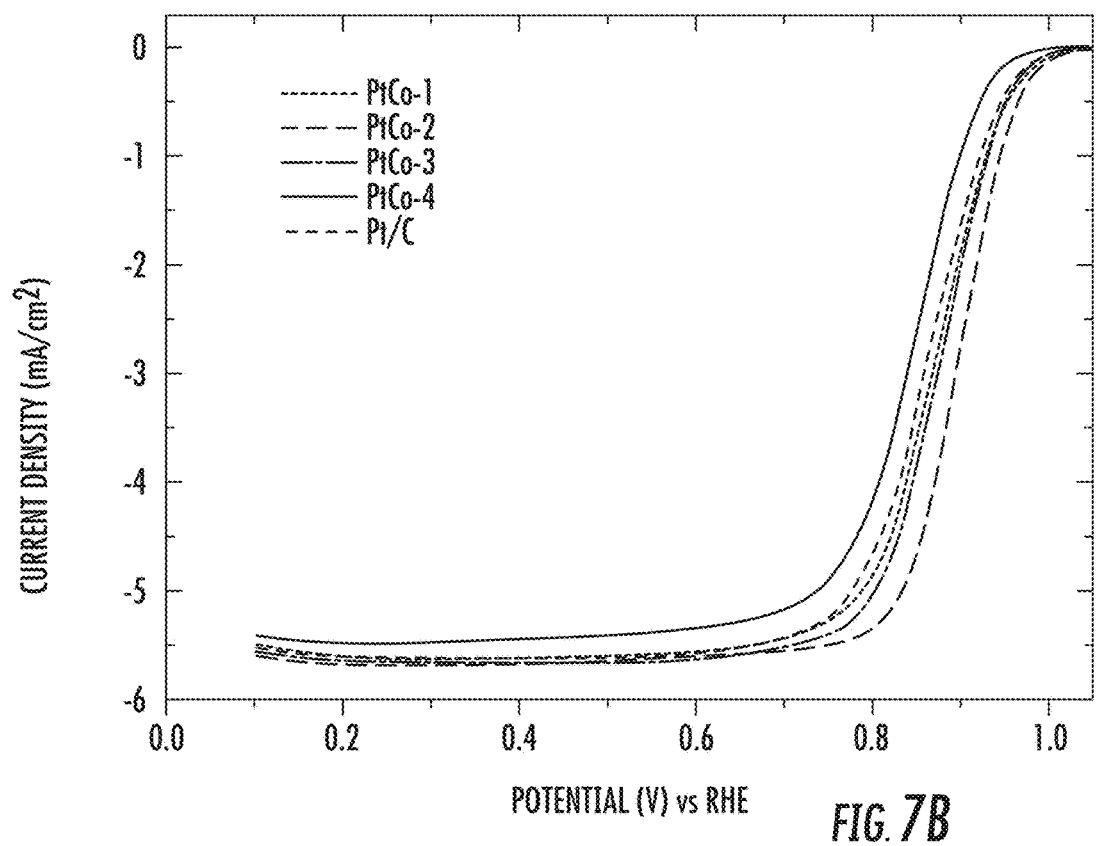
FIG. 7B depicts linear sweep voltammagrams for oxygen reduction reactions (ORR) polarization curves in 0.1M $HClO_4$ electrolyte saturated with dissolved $O_2$ at 1600 rpm and scan rate of 5 mV/s for different PtCo nanoalloy samples PtCo-1, PtCo-2, PtCo-3, PtCo-4, respectively, as synthesized by tandem LASiS-GRR.

The ORR catalytic activities for the PtCo NAs synthesized with various initial [$Pt^{2+}$], as investigated with RDE measurements in 0.1 M $HClO_4$ electrolyte solutions, are summarized in FIGS. 7A-7F. Cyclic voltammetry (CV) scans were conducted from 0.05 to 1.02 V vs. RHE at a scan rate of 50 mV/s. The ECSA calculated from the integration of the hydrogen evolution area in the CV curve indicate a gradual decrease from PtCo-1 to PtCo-4 (i.e., 30.92, 24.25, 18.31 and 14.55 $m^2$/g respectively), as shown in FIG. 7A and Table 1. This is mainly attributed to the decreasing surface to volume ratios with increasing particle sizes of the PtCo NAs resulting from LASiS-GRR with higher initial [$Pt^{2+}$]. FIG. 7B illustrates linear sweep voltammograms for the ORR polarization curves scanned in $O_2$-saturated 0.1 M $HClO_4$ electrolyte for the PtCo catalysts under study. The half-wave potential values in FIG. 7B indicate that most of the as-synthesized NA samples, i.e., PtCo-1, PtCo-2 and PtCo-3, outperform the catalytic activities of commercial Pt/C. The best ORR performance is noted for PtCo-2 sample with a 32 mV positive shift in the half-wave potential as compared to the Pt/C sample. This is mainly due to higher Co ratios with good alloying degree (58.01%) in the PtCo-2 sample that shrinks the lattice constant and lowers d-band center which in turn reduces the oxygen binding energy. Added to this, the small particle sizes (mean crystallite size of 4.7 nm in Table 1) with moderate coalescence in PtCo-2 promote catalytic activities due to higher surface to volume ratios. In contrast, the PtCo-4 alloy exhibits the lowest activity, which can be ascribed to its lowest Co ratio (15.5%), poor alloying (51.7%) and largest size (approximately 10 nm) as seen from Table 1. Interestingly, the PtCo-1 sample with smallest mean sizes (approximately 3 nm) and slightly lower alloying degree (53.33%) than PtCo-2 (58%), exhibits less activity. This could be primarily attributed to the excess agglomeration in PtCo-1 (see FIG. 5A). Besides, the diffusion-limited current at high overpotential regions (+0.1 to +0.80 V vs. RHE) reaches approximately 5.6 mA/cm² for all samples, thereby indicating minimal formation of $H_2O_2$ during the ORR process as well as good charge transfer rates. It is noted that this diffusion-limited current value agrees extremely well with those reported for commercial Pt/C and other peer research works [16, 60]. The dynamics of the electron transfer process during ORR were analyzed using the KL equation in rotating disk voltammetry (RDV) measurements carried out at different rotation rates (400 to 2200 rpm), as indicated in the experimental section.

Figure 7C:
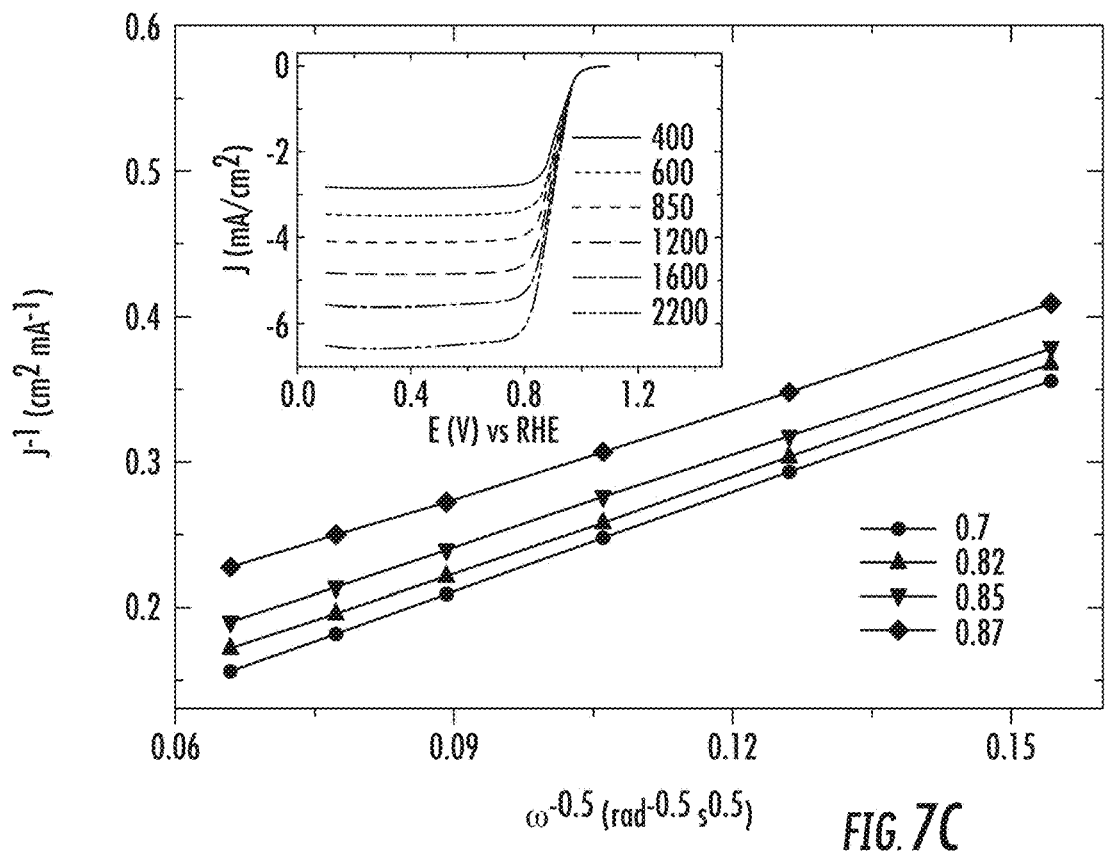
FIG. 7C depicts Koutecky-Levich plots from rotating disk voltammogram (RDV) data (inset) for a PtCo-2 sample at different potentials (0.70-0.87 V) indicating a four electron transport process for ORR.
Figure 7D:
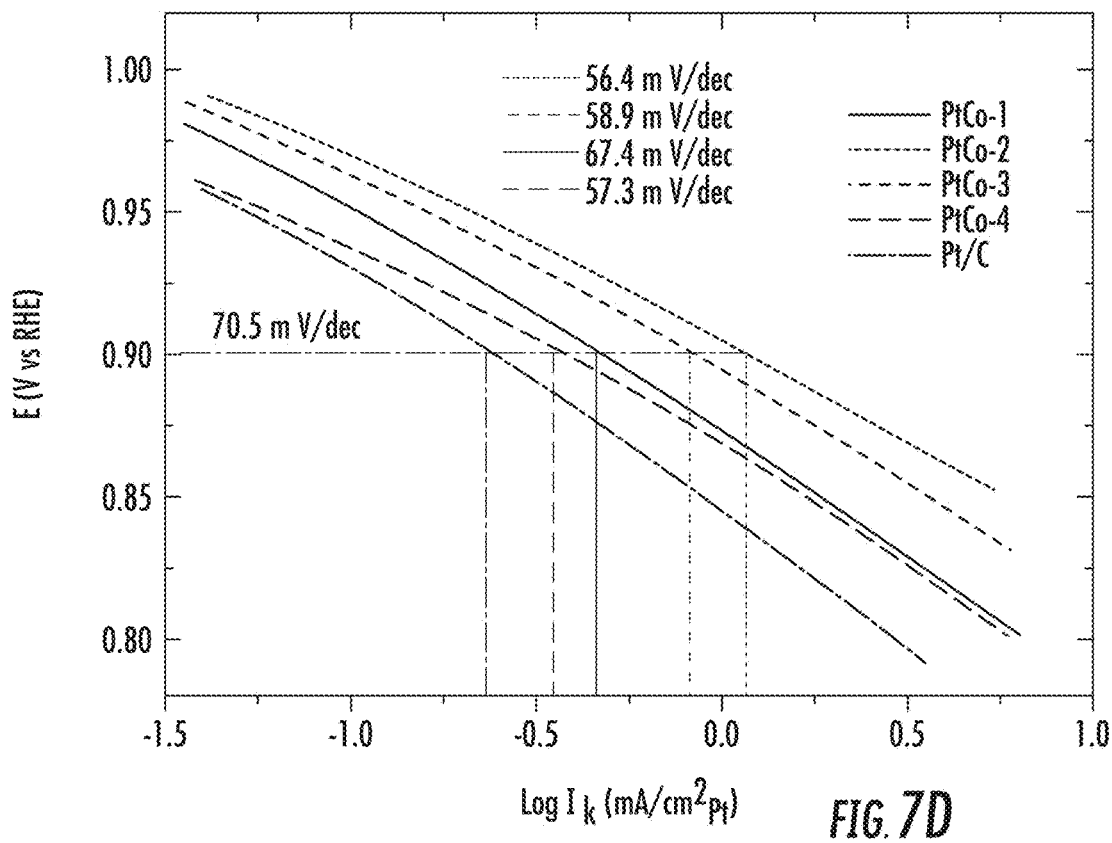
FIG. 7D depicts Tafel plots for different PtCo nanoalloy samples PtCo-1, PtCo-2, PtCo-3, PtCo-4, respectively, as synthesized by tandem LASiS-GRR as well as Pt/C.
Figure 7E:
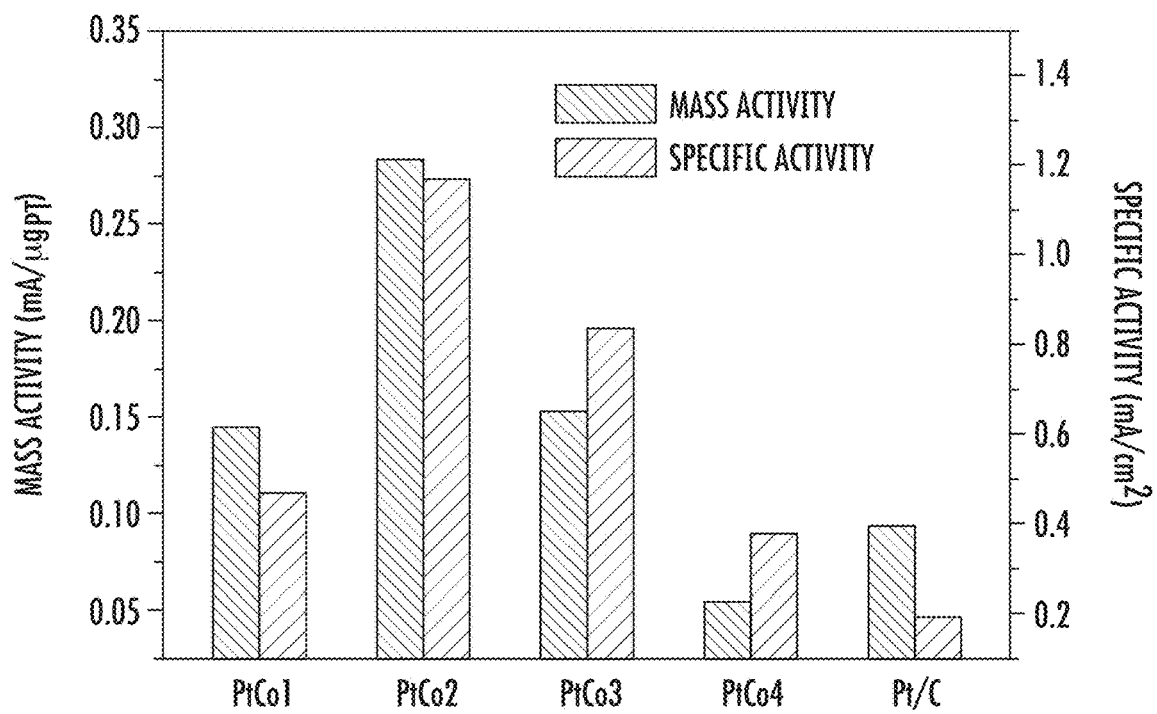
FIG. 7E depicts a graphical representation of a comparison of mass activity and specific activity at 0.9 V vs. reversible hydrogen electrode (RHE) for different PtCo nanoalloy samples PtCo-1, PtCo-2, PtCo-3, PtCo-4, respectively, as synthesized by tandem LASiS-GRR, as well as Pt/C.
Figure 7F:
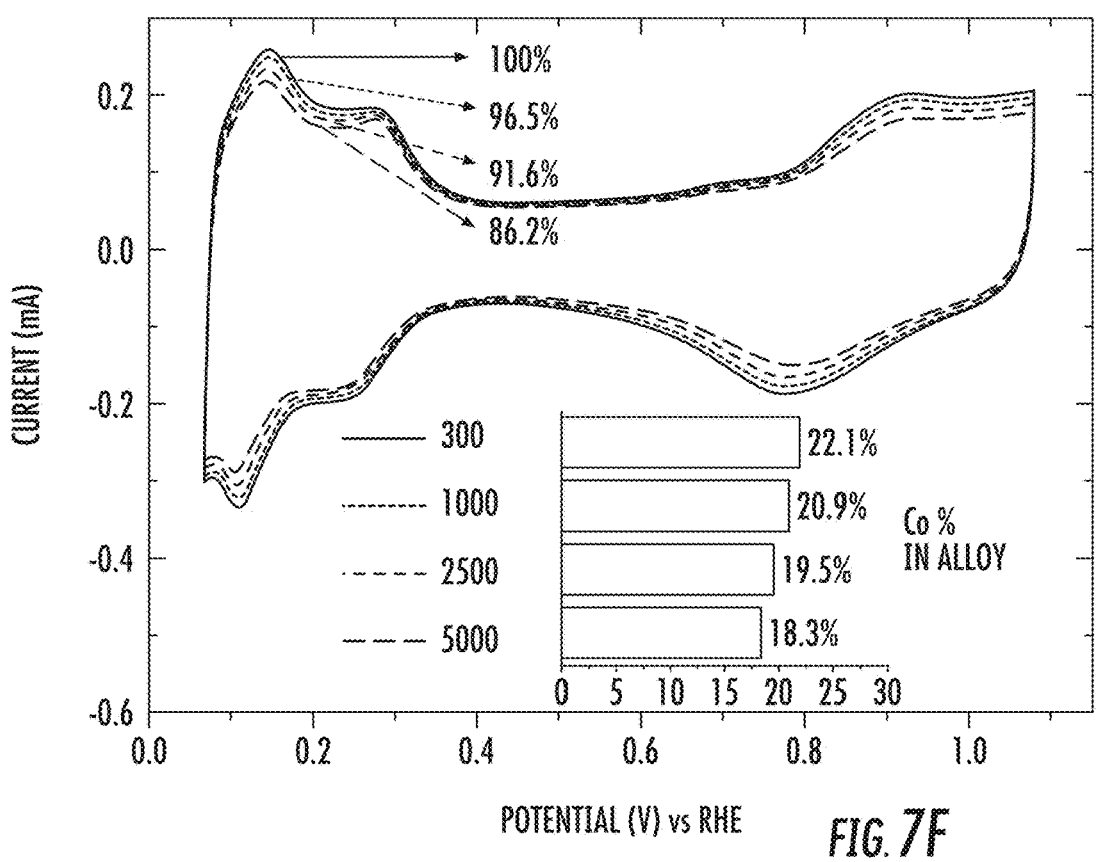
FIG. 7F depicts cyclic voltammetry curves indicating the % electrochemical surface area (ECSA) values and Co ratio (%) in an alloy after various numbers of potential cycles at a scan rate of 100 mV/s.

FIG. 7C illustrates the slopes of the KL plots generated from the RDV curves (inset) for the PtCo-2 at different potentials in the range of 0.70-0.87 V. The slopes estimate the number of transferred electrons (n) to be approximately 4.0, thereby indicating an ideal four-electron transport process for ORR. FIG. 7D illustrates the Tafel plots extracted from the ORR polarization curves in the mixed kinetic and/or diffusion regions (low overpotential regions). The calculated Tafel slopes for the PtCo samples are in the range from 56.4 to 67.4 mV/dec, which are lower than the corresponding values for commercial Pt/C (70.5 mV/dec), indicating better charge carrier mobility. Besides, upon comparing the specific activities (SA) for each of the samples at 0.9 V vs. RHE potential on the Tafel plots in FIG. 7D, all the PtCo samples are found to indicate higher SA values than the Pt/C sample. The detailed mass activity (MA) and SA values at 0.9 V vs. RHE are shown in FIG. 7E and Table 1. The PtCo-2 sample is found to indicate the best catalytic activity with the MA and SA values of 0.28 mA/μg$_{Pt}$ and 1.18 mA/cm², respectively, thereby indicating about a three and six-fold increase over the corresponding values for Pt/C (0.09 mA/μg$_{Pt}$ and 0.19 mA/cm²). The outstanding ORR activities for the PtCo NAs is attributed to the uniform NAs with the Pt-rich shell, as evident from the EELS ratio mapping in FIGS. 5G-H. Added to this, the absence of any additional chemical including reducing agent/surfactant/stabilization agent during the LASiS-GRR synthesis process eliminates the possibilities of deteriorating the active surface area, thereby benefiting the catalytic performance. Finally, stability tests were conducted for the PtCo-2 sample by scanning CV at the same range as earlier CV tests for 5000 cycles at 100 mV/s. The results shown in FIG. 7F reveal an approximately 14% decrease in ECSA (from 100% (black) to 86.2% (green) case) after 5000 cycles, while the Co$_{al}$ also diminishes from 22.1% to 18.3%. This is ascribed to the dissolution of catalysts in the acid electrolyte, which is a well-known phenomenon for Pt or other metal based ORR catalysts as also observed in earlier works [4, 11, 22, 30].

Figure 8A:
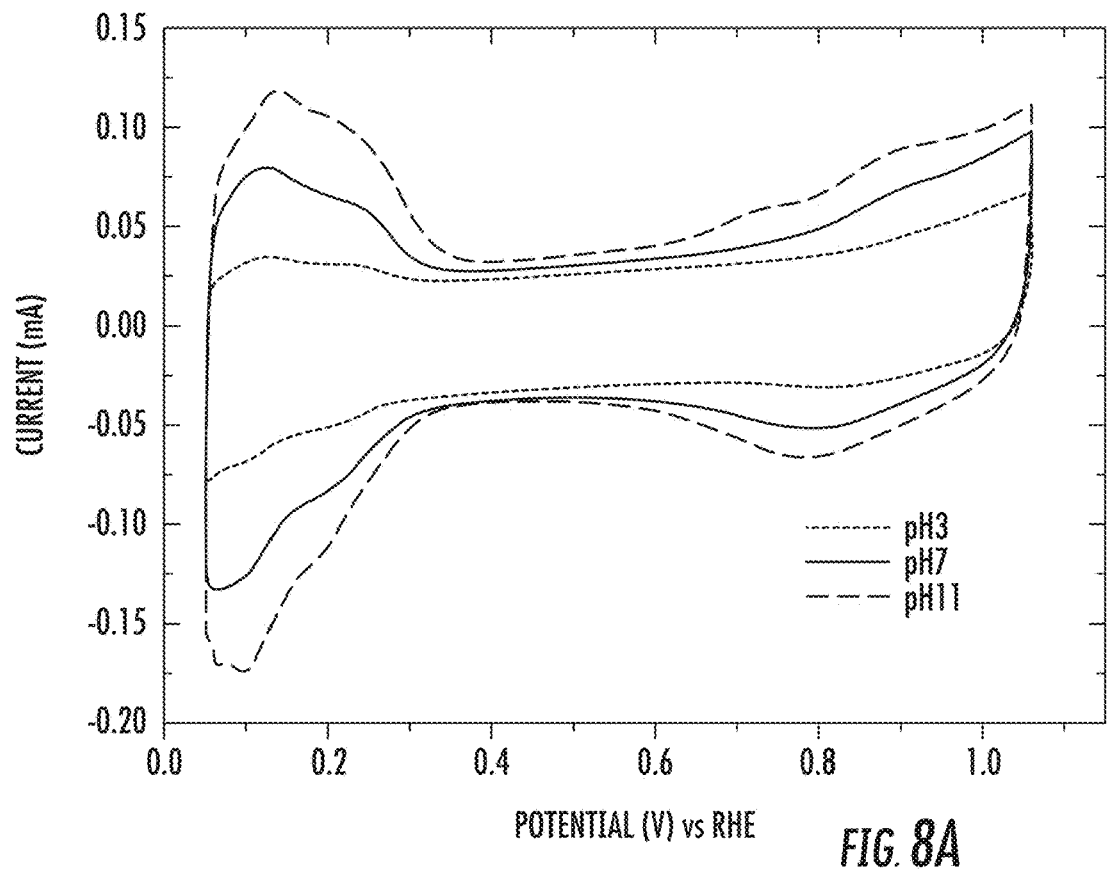
FIG. 8A depicts cyclic voltametry curves at a scan rate of 50 mV/S for different PtCo nanoalloy samples synthesized by tandem LASiS-GRR at different pH conditions.
Figure 8B:
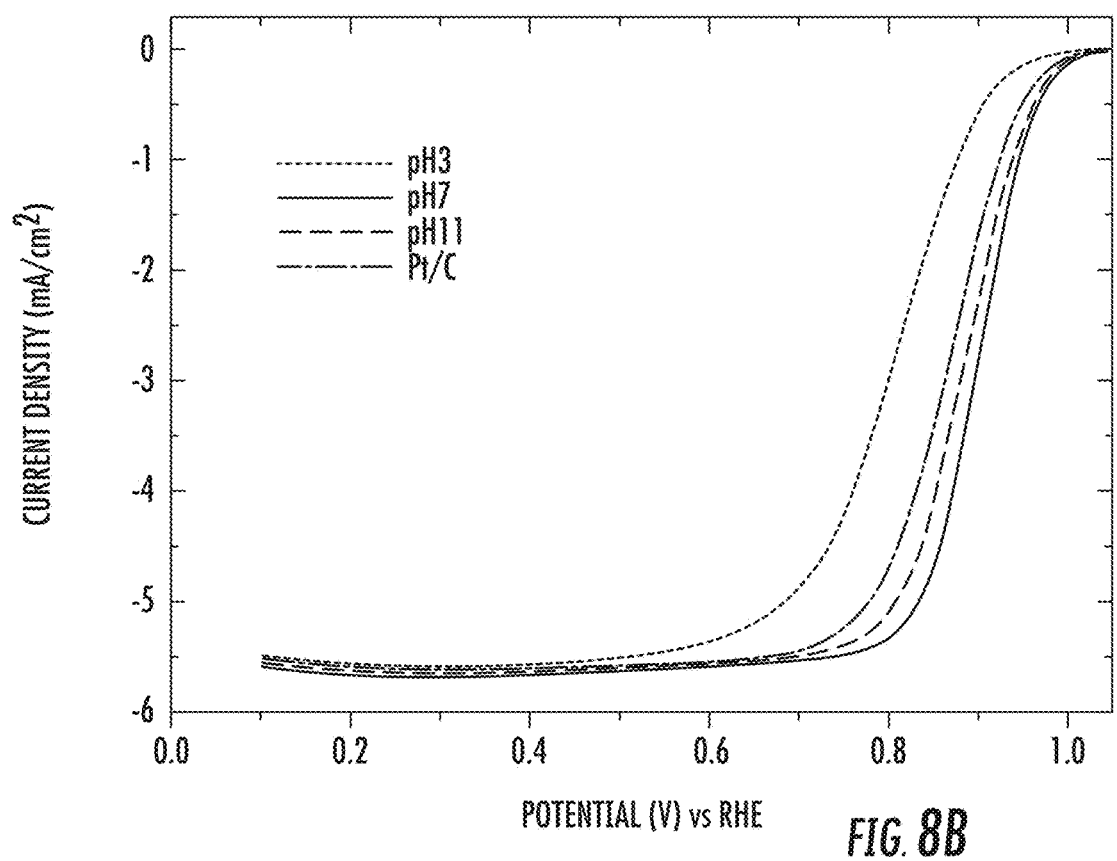
FIG. 8B depicts linear sweep voltammograms for ORR analysis in 0.1 M $HClO_4$ electrolyte saturated with dissolved $O_2$ at 1600 rpm and scan rate of 5 mV/s for different PtCo nanoalloy samples synthesized by tandem LASiS-GRR at different pH conditions.
Figure 8C:
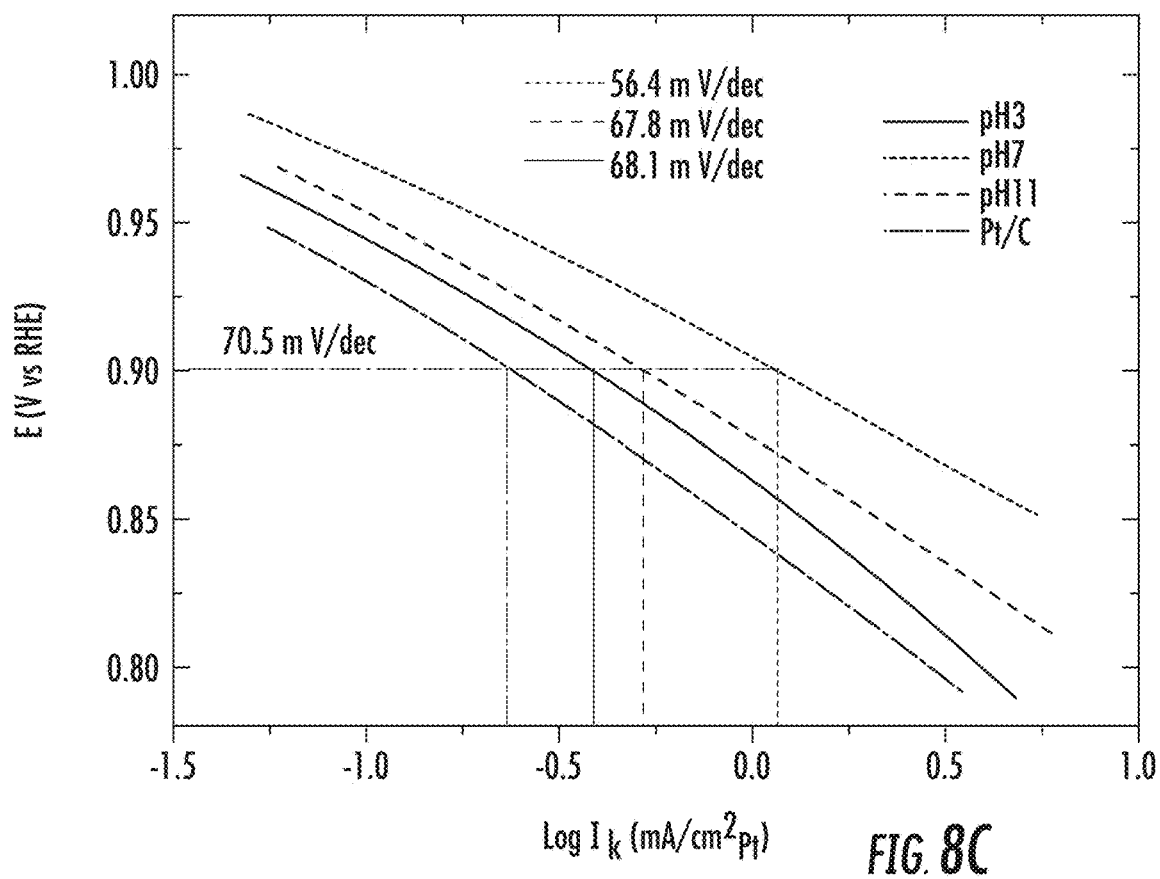
FIG. 8C depicts a Tafel plot corresponding to FIG. 8B.
Figure 8D:
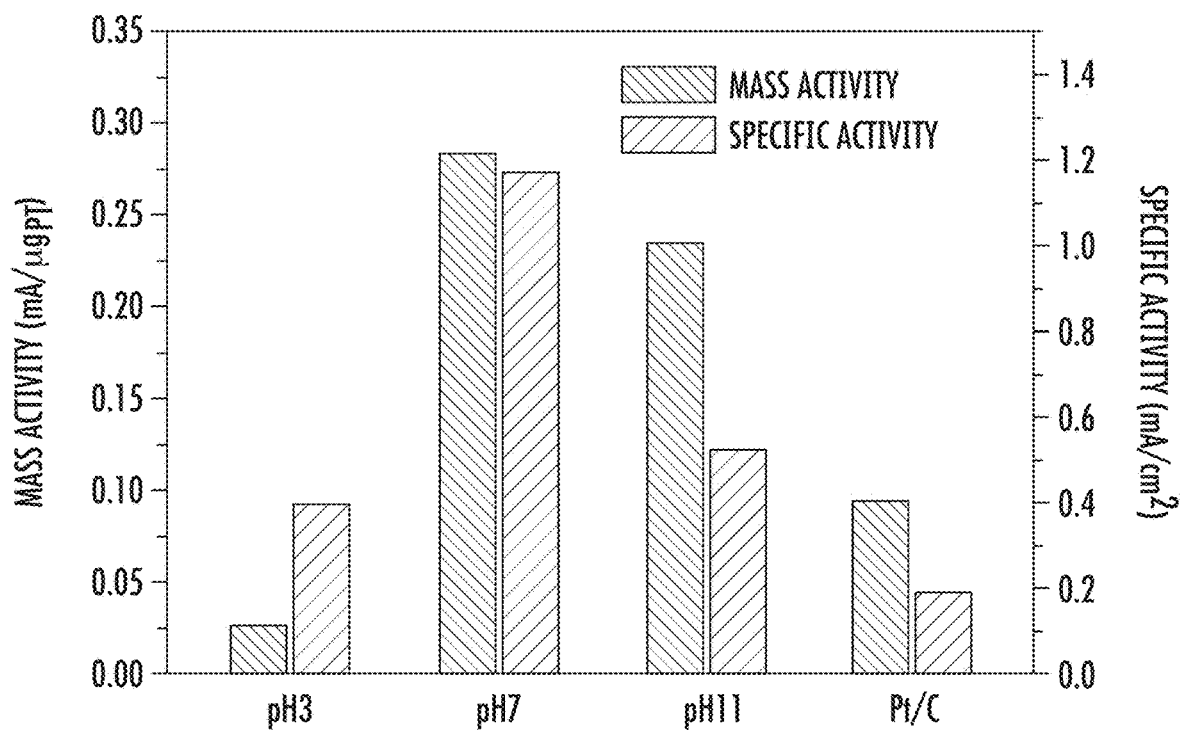
FIG. 8D depicts a comparison of mass activity and specific activity at 0.9 V vs. RHE.

The electrochemistry results for the PtCo NAs synthesized at different pH conditions (referred to as pH3, pH7 and pH11 samples) are summarized in FIGS. 8A-D. The pH11 sample exhibits a much higher ECSA (44.50 m²/g) than the pH7 or PtCo-2 (24.25 m²/g) and pH3 sample (6.67 m²/g) as calculated from the hydrogen adsorption peaks in the CV curves (FIG. 8A). This is easily attributed to the smaller crystallite sizes (approximately 4.15 nm from Table 1) for the pH11 sample as compared to both the pH7 (approximately 4.70 nm) and pH3 (approximately 17.98 nm) samples. For comparing the ORR activities, electrochemistry tests and plots similar to the ones carried out for PtCo-2 samples at pH7 condition are presented in FIGS. 8A-D. These measurements include ORR polarization curves (FIG. 8B), Tafel plots (FIG. 8C), and MA/SA comparisons (FIG. 8D). The pH3 sample exhibits the poorest activity as compared to all the other samples, which can be ascribed to its larger crystallite sizes and extremely low Co$_{al}$ (see Table 1). Here the interesting observation is that the pH11 sample, even with higher Co$_{al}$ (approximately 38.1%) and smaller crystallite sizes (approximately 4.15 nm), exhibit slightly less ORR activities in regards to the half-wave potential (approximately 875 V vs. RHE), MA (approximately 0.24 A/mg), and SA (approximately 0.53 mA/cm²) when compare to the corresponding values for PtCo-2 (namely, 899 V vs. RHE, 0.28 A/mg and 1.18 mA/cm²). Nevertheless, it needs to be noted that these values are still remarkably better than those for commercial Pt/C (namely, 867 V vs. RHE, 0.09 A/mg and 0.19 mA/cm², respectively).

FIG. 9 illustrates a schematic of a system, generally designated 900, similar to system 100 illustrated in FIG. 1, that is configured to synthesize PtCo NAs via tandem LASiS-GRR using different initial Pt²⁺ concentrations and pH conditions. In system 900, a metal target 902 is ablated by a laser 904 to produce seeding Co NPs which expand with a cavitation bubble 906 and react with either Pt²⁺, H⁺, or reduced Pt (alloying process) at a bubble-liquid interface 908 during collisional quenching. Based on the different Pt²⁺ concentration (low, medium, high) and pH conditions (acid, neutral, alkaline), different degrees of alloying for Co$_{al}$ may be obtained. The formation of PtCo NAs may occur in a reaction cell (e.g., 102, FIG. 1) using a pulsed laser similar to that which is illustrated in FIG. 1. In an $O_2$-free solution, the laser (e.g., an Nd:YAG pulsed laser) 904 produces seeding metal NPs within the cavitation bubble 906 that undergo reactions. For example, the following reactions at the bubble-liquid interface 908 may occur during collisional quenching:

1. Galvanic replacement reaction (GRR) with $K_2PtCl_4$ based on the respective redox potentials for Co/Co²⁺ (−0.28 V vs. SHE) and. [PtCl$_4$]²⁻/Pt (0.755 V vs. SHE):

[PtCl$_4$]²⁻+Co=Pt+Co²⁺            Reaction 1

2. Oxidation by H⁺ ions driven by pH:

Co+2H⁺=Co²⁺+H$_2$            Reaction 2

3. Alloying with reduced Pt from Reaction 1:

Co+Pt=PtCo (alloy)            Reaction 3

At neutral conditions (pH=7), with same Co production rate from the rate limiting steps of LASiS, the initial [PtCl$_4$]²⁻ plays a crucial role in driving the rate determining steps of Reactions 1 through 3 to finally control the nanostructures and compositions. Specifically, when the initial [PtCl$_4$]²⁻ is low, the reduction rate of Pt through GRR (Reaction 1) is much slower than the direct oxidation of Co by H⁺ (Reaction 2), therefore the alloying rate between reduced Pt and Co (Reaction 3) is also slow. Conversely, high initial [PtCl$_4$]²⁻ leads to a much faster Reaction 1 than the other two reactions, therefore leaving few Co to alloy with large amount of reduced Pt and hindering the alloying process. To this end, an optimal amount of initial [PtCl$_4$]²⁻ is expected to produce the largest alloyed Co (Co$_{al}$).

Meanwhile, the Pt—Co alloying process is also controlled by tuning the solution phase [H⁺] or pH conditions. Specifically, in acid conditions (low pH), an extremely low Co$_{al}$ is expected since majority of the seeding Co NPs go through Reaction 2 leaving few Co for Reaction 3, which is similar to the case with low [PtCl$_4$]²⁻ at neutral condition. Conversely, in alkaline conditions (high pH) with medium [PtCl$_4$]²⁻, abundant Co are present for Reaction 3, in which case the highest Co$_{al}$ is obtained.

Consequently, the modified tandem LASiS-GRR technique is configured to synthesize metal NAs and NCs with unique nanostructures as well as at least one tailorable characteristic including sizes, Pt:Co ratios, and/or degrees of alloying. For example, the LASiS-GRR technique reports NAs having crystallite sizes of approximately 4.70 nm and approximately 58% degree of alloying (approximately 22% reduction in Pt atomic content) exhibit superior ORR activities in acid electrolyte solutions as compared to the corresponding activities for standard Pt/C catalysts. Such activities are attributed to the unique capabilities of tandem LASiS-GRR to synthesize the aforementioned NAs with controlled sizes and uniform elemental distributions. Specifically, detailed structural characterizations of the NAs from EDX and EELS ratio mappings indicate a thin layer of Pt-rich shell on an alloyed core with relatively uniform Pt:Co ratio. The rational tuning of such structure-property relations are achieved by systematically controlling the reaction and functional parameters (e.g., initial Pt salt concentrations, ablation times and solution phase pH conditions) during tandem LASiS-GRR. Advantageously, the ability of seeding NPs generated by the rate limiting step of LASiS to drive the simple redox chemistry in the rate controlling step of GRR allows directed tailoring of sizes, structures, alloying, and compositions in the final NCs and/or NAs. Accordingly, when operated in tandem, reaction pathways emerging from high-energy liquid-confined plasma can be regulated to create heteronanostructures with metastable structures and phases without the use of any external chemical agents/surfactants.

Figure 10A:
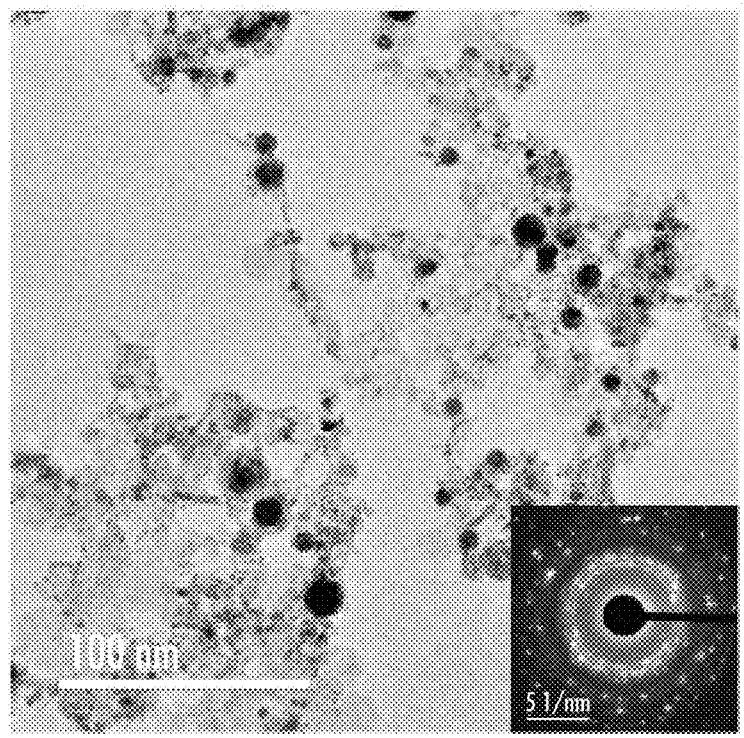
FIGS. 10A-10D depict TEM images with SAED images inset of four different PtCo nanocomposite samples PtCo-5, PtCo-6, PtCo-7, PtCo-8, respectively, as synthesized by tandem LASiS-GRR for various $K_2PtCl_4$ concentrations.
Figure 10B:
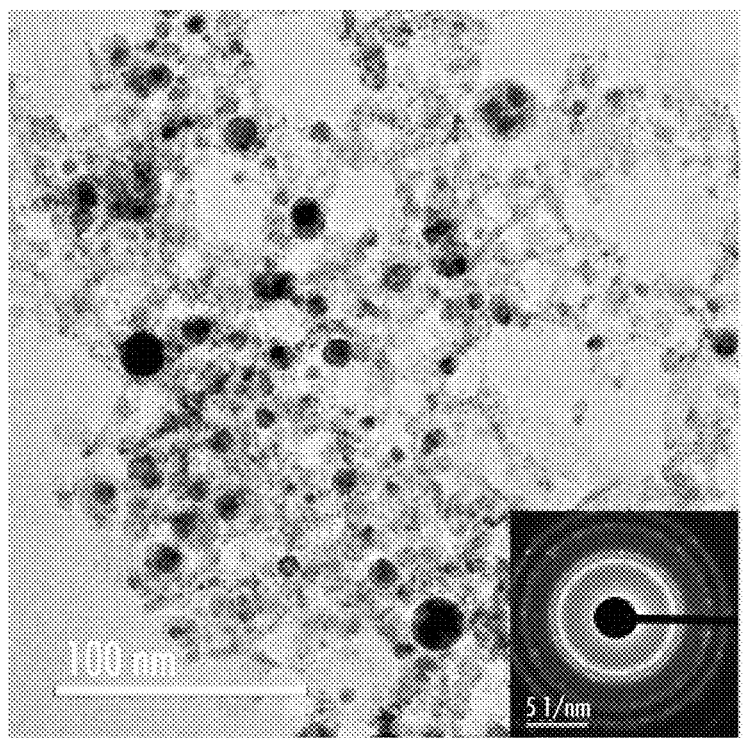
Figure 10C:
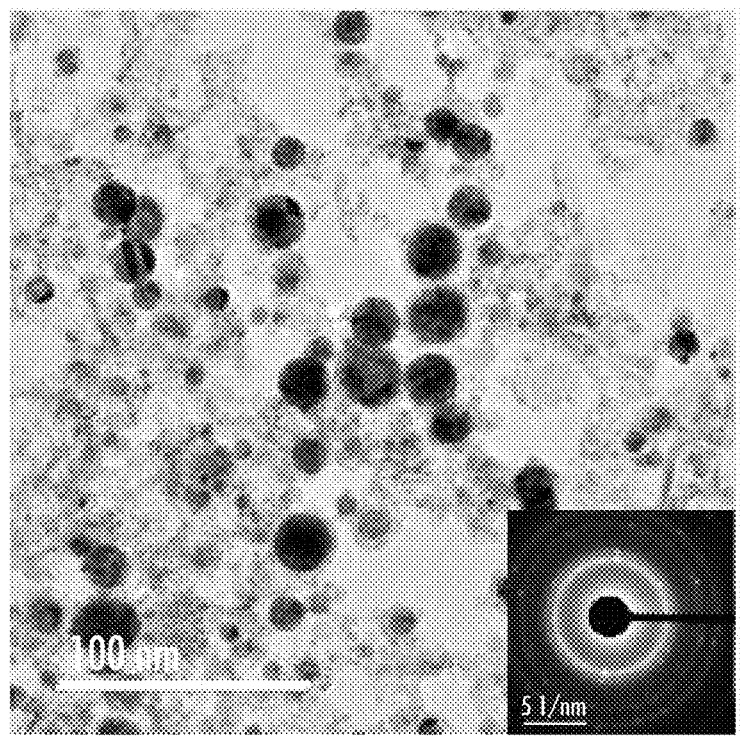
Figure 10D:
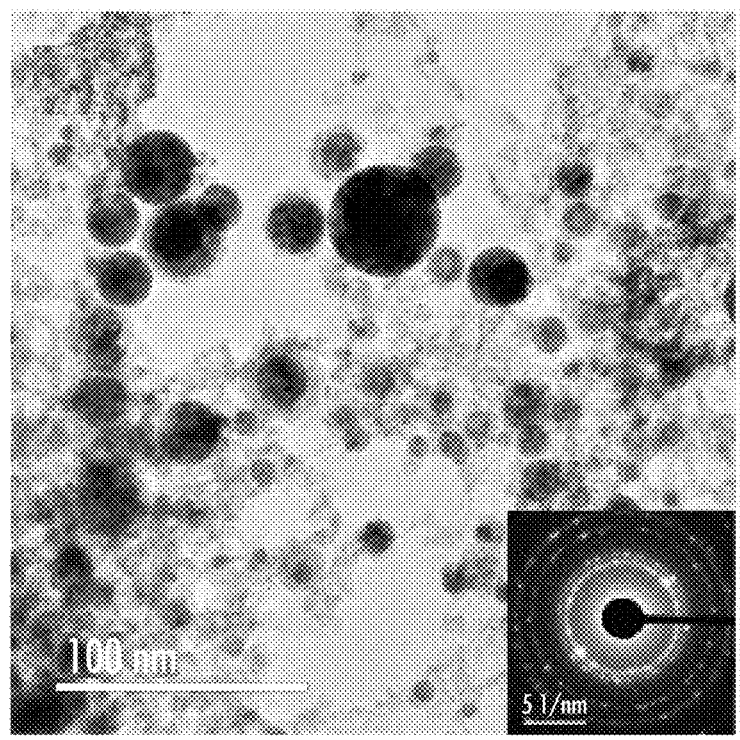

Example 2—Synthesis of Nanocomposites 2.1—PtCo/$CoO_x$ Nanocomposites: Bifunctional Electrocatalysts ORR and OER Four different NC colloidal samples of PtCo-5, PtCo-6, PtCo-7, and PtCo-8, each having a different initial $K_2PtCl_4$ concentration initially produced through LASiS are depicted in TEM images in FIGS. 10A-10D. For example, FIG. 10A illustrates PtCo-5 synthesized at a $K_2PtCl_4$ concentration of 25 mg/l. FIG. 10B illustrates PtCo-6 synthesized at a $K_2PtCl_4$ concentration of 60 mg/l. FIG. 10C illustrates PtCo-7 synthesized at a $K_2PtCl_4$ concentration of 120 mg/l. FIG. 10D illustrates PtCo-8 synthesized at a $K_2PtCl_4$ concentration of 250 mg/l. The corresponding Pt and Co NP concentrations in each of the samples, as revealed from ICP-OES measurements, are summarized in Table 2.

TABLE 2

|  | Initial $K_2PtCl_4$ Conc. (mg/l) | Pt Conc. (mg/l) | Co Conc. (mg/l) | Molar Pt/Co ratio |
| --- | --- | --- | --- | --- |
| PtCo-5 | 25 | 7.3 | 20 | 1:9 |
| PtCo-6 | 60 | 19 | 23 | 1:4 |
| PtCo-7 | 120 | 42 | 25 | 1:2 |
| PtCo-8 | 250 | 81 | 25 | 1:1 |

The results indicate that approximately 60-70% of the precursor Pt salt is transformed into Pt NPs upon ablation at 60 J/cm² fluence for 30 min. The Pt:Co molar ratios were calculated to be approximately between 1:9, 1:4, 1:2 and 1:1 for PtCo-5 to PtCo-8, respectively. In some aspects, any unreacted residual $K_2PtCl_4$ as well as any excess KCl formed was washed away during the centrifugation step. For example, two types of exemplary nanostructures can be found in each of the samples; namely individual spherical NPs (darker contrast) embedded in a large amount of highly porous "sponge-shaped" nanostructures (lighter contrast). These structures are expected to be $CoO_x$ (lighter) and Pt and/or PtCo intermetallic (darker) NPs respectively, where the different contrasts in the transmitted electron intensities are due to their different mass to charge ratios.

Figure 10E:
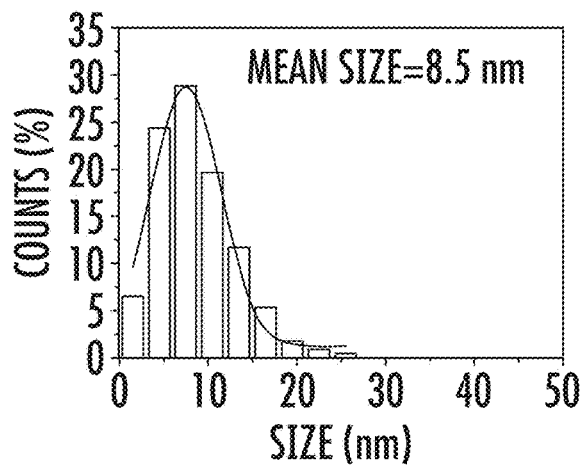
FIGS. 10E-10H depict size distributions for darker spherical Pt-based NPs corresponding to the PtCo nanocomposite samples in FIGS. 10A-10D, respectively.
Figure 10F:
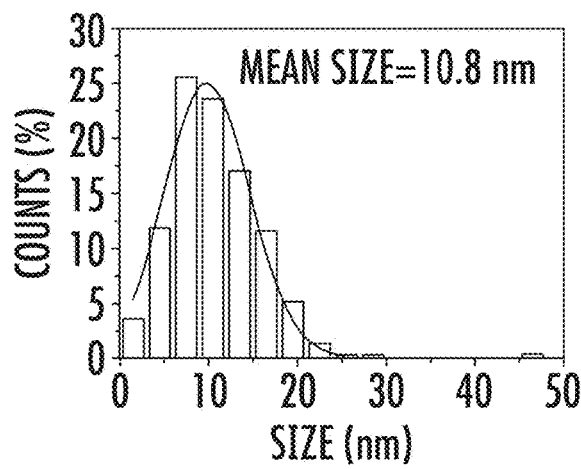
Figure 10G:
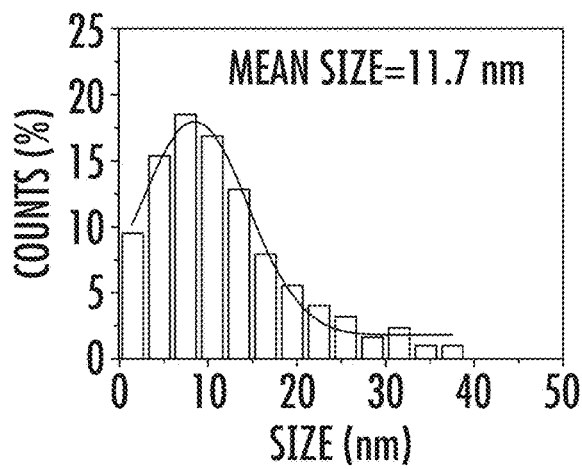
Figure 10H:
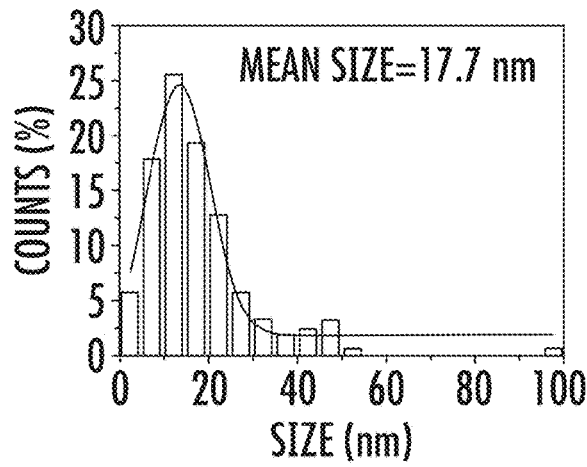

In some aspects, FIGS. 10E-10H illustrate size distributions for the darker spherical Pt-based NPs (which are later revealed to be PtCo NAs). For example, FIG. 10E illustrates that PtCo-5 comprises a mean size of approximately 8.5 nm with a Pt:Co atomic ratio of 1:9. FIG. 10F illustrates that PtCo-6 comprises a mean size of approximately 10.8 nm with a Pt:Co atomic ratio of 1:4. FIG. 10G illustrates that PtCo-7 comprises a mean size of approximately 11.7 nm with a Pt:Co atomic ratio of 1:2. FIG. 10H illustrates that PtCo-8 comprises a mean size of approximately 17.7 nm with a Pt:Co atomic ratio of 1:1. Thus, FIGS. 10E-10H illustrate that mean sizes of dark colored PtCo alloyed NPs increase from approximately 8.5 nm to 17.7 nm with an increase of the Pt:Co ratios for PtCo/$CoO_x$ NCs synthesized by tandem LASiS-GRR. This is ascribed to an enhanced coalescence due to increased concentrations of Pt NPs.

Notably, LASiS on Co in the presence of $K_2PtCl_4$ salt solution, when exposed to the identical ageing process, results in both $Co_3O_4$ and CoO nanostructures coexisting in the final products, in contrast to what has been previously known in the art that initially formed metastable CoO upon three days of ageing underwent complete oxidization into $Co_3O_4$ by the solution phase $O_2$ and $H^+$. This may be due to the highly non-equilibrium processes where the seeding Co NPs emerging from the cavitation bubble undergo ultra-fast quenching and reactions with the solution phase metal salt ions at the liquid front. Thus, during ablation in the aqueous solution with $K_2PtCl_4$ salts, a large portion of Co is converted to CoO through GRR rather than direct oxidation. The relatively higher stability of these CoO NPs could possibly be due to this inherently different formation mechanism. As a result, it is difficult for the CoO NPs to further get oxidized into $Co_3O_4$ or the oxidation rate is much slower.

In some aspects, FIGS. 11A-11D provide HRTEM images of the PtCo-5 sample with corresponding positions (i.e., B-D) marked that indicate the lattice fringes. In FIG. 11A, the area marked 'B' corresponds to Pt (111) (d=2.26 Å) illustrated in FIG. 11B, the area marked 'C' corresponds to $Co_3O_4$ (220) (d=2.86 Å) illustrated in FIG. 11C, and the area marked 'D' corresponds to CoO (200)(d=2.13 Å) illustrated in FIG. 11D. Lastly, control experiments were also carried out for laser irradiation on the $K_2PtCl_4$ solution only (without any Co target), in which case no Pt NPs are formed, which confirmed that the formation of Pt NPs is largely due to the GRR.

Figure 12A:
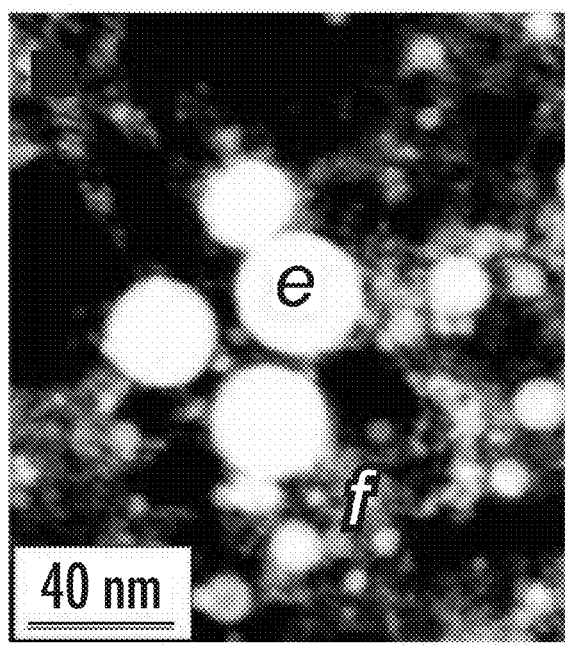
FIG. 12A depicts a high-angle annular dark-field (HAADF) image for the PtCo-7 sample.
Figure 12B:
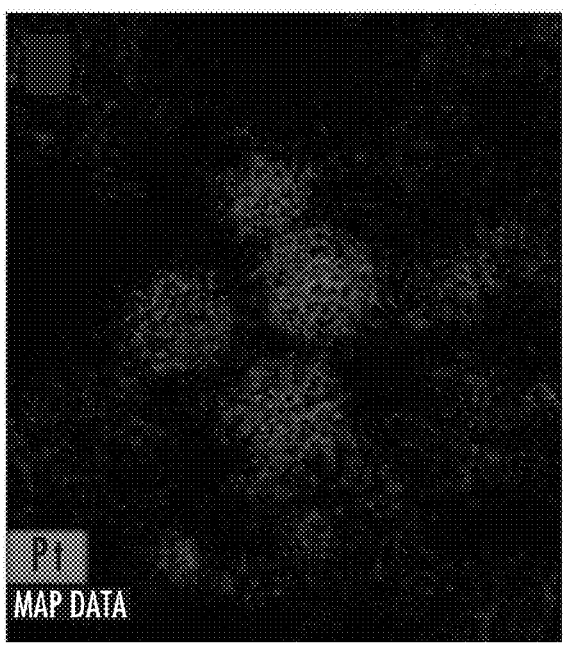
FIGS. 12B-12D depict corresponding elemental mappings for Pt, Co and O, respectively, of the PtCo-7 sample of FIG. 12A.
Figure 12C:
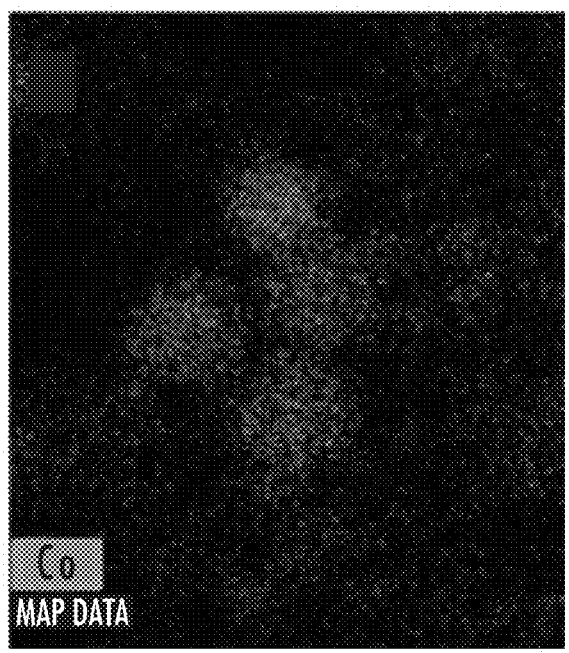
Figure 12D:
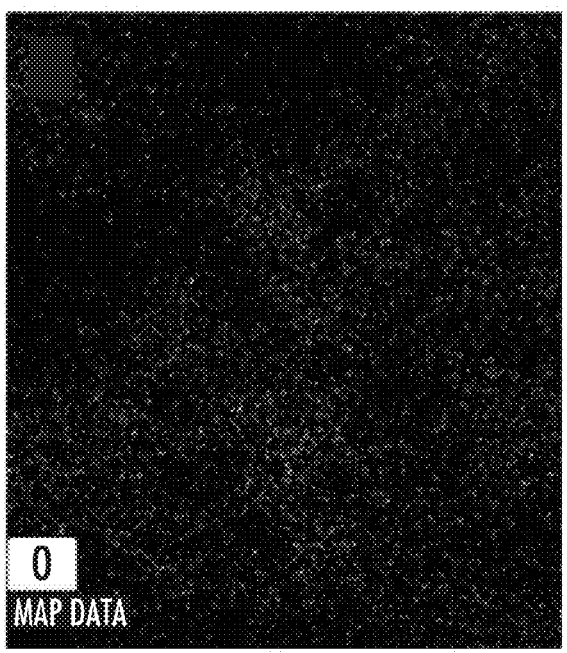
Figure 12E:
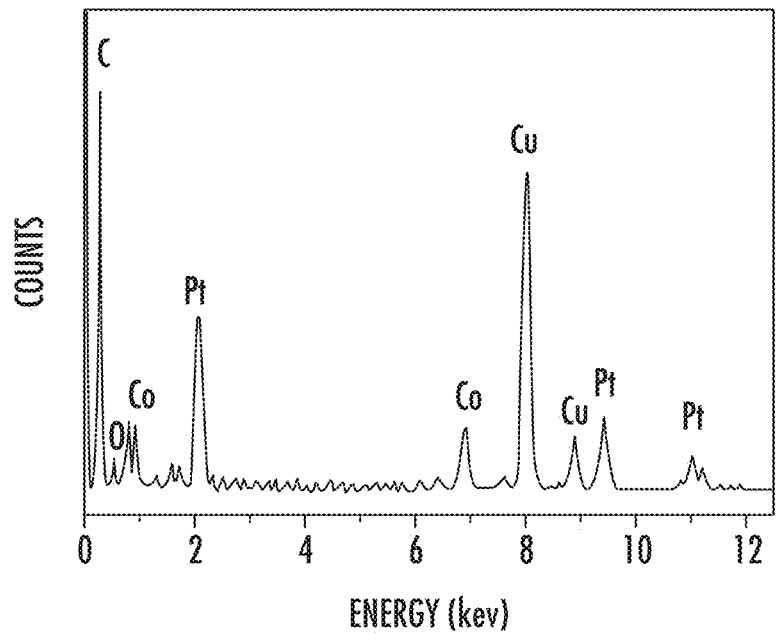
FIGS. 12E-12F depict graphical representations of spectra e, f, respectively, illustrated in FIG. 12A.
Figure 12F:
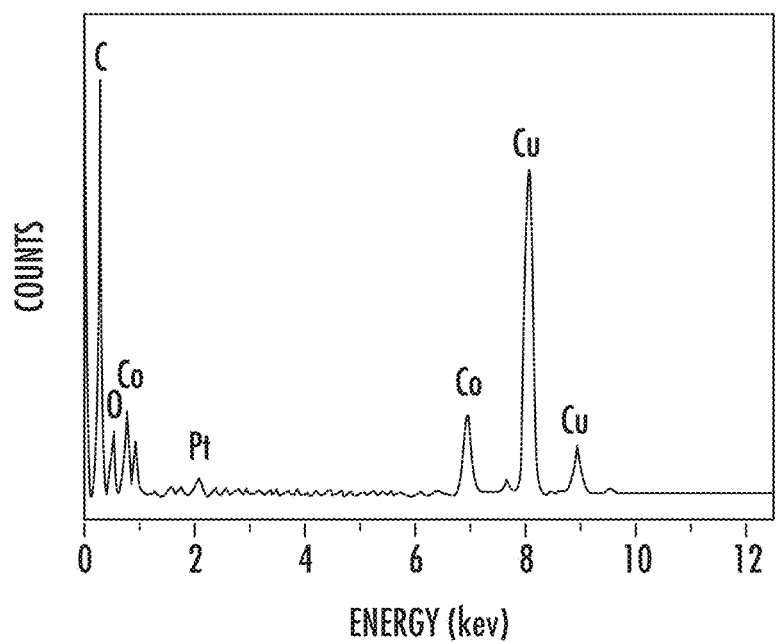

In order to further investigate the elemental composition and distribution in the products, EDX tests were carried out for the STEM mode images. The results from the high-angle annular dark-field (HAADF) image, as illustrated in FIGS. 12A-12D specifically for the PtCo-7 sample, reveal the corresponding elemental mappings for Pt, Co and O (FIGS. 12B-12D, respectively). These images show that Pt is mainly distributed in the bright spherical NPs in the HAADF image (i.e., the four large NPs at the center). In contrast, Co is mostly distributed in the background gray areas although its presence is strongly noted inside the brighter NPs (see FIG. 12C), while O is found to be uniformly distributed in the whole image. Furthermore, detailed EDX spectra in FIG. 12E-12F, which correspond to the areas marked e and f respectively in FIG. 12A indicate strong Pt and Co peaks along with weak O peak inside the bright spherical particle (FIG. 12E). In comparison, FIG. 12F illustrates negligible Pt peak along with a relatively strong O peak in the background areas. It is noted here that the Cu and C signals in the spectra are from the TEM carbon film with copper grids. The absence of any other detectable elements in the EDX data indicates that all the residual chemicals such as $K_2PtCl_4$ and KCl have been washed away by the centrifuging process. The aforementioned results for the elemental mappings of Pt, Co and O in FIGS. 12B-12D, along with the EDX spectral intensities in FIGS. 12E-12F, clearly suggest the formation of PtCo NA inside the bright spherical NPs (marked as the areas e in FIG. 12A). This also validates the earlier assumption that the as-synthesized NCs are made of PtCo NA (the brighter NPs) embedded in the $CoO/Co_3O_4$ matrices.

Figure 13:
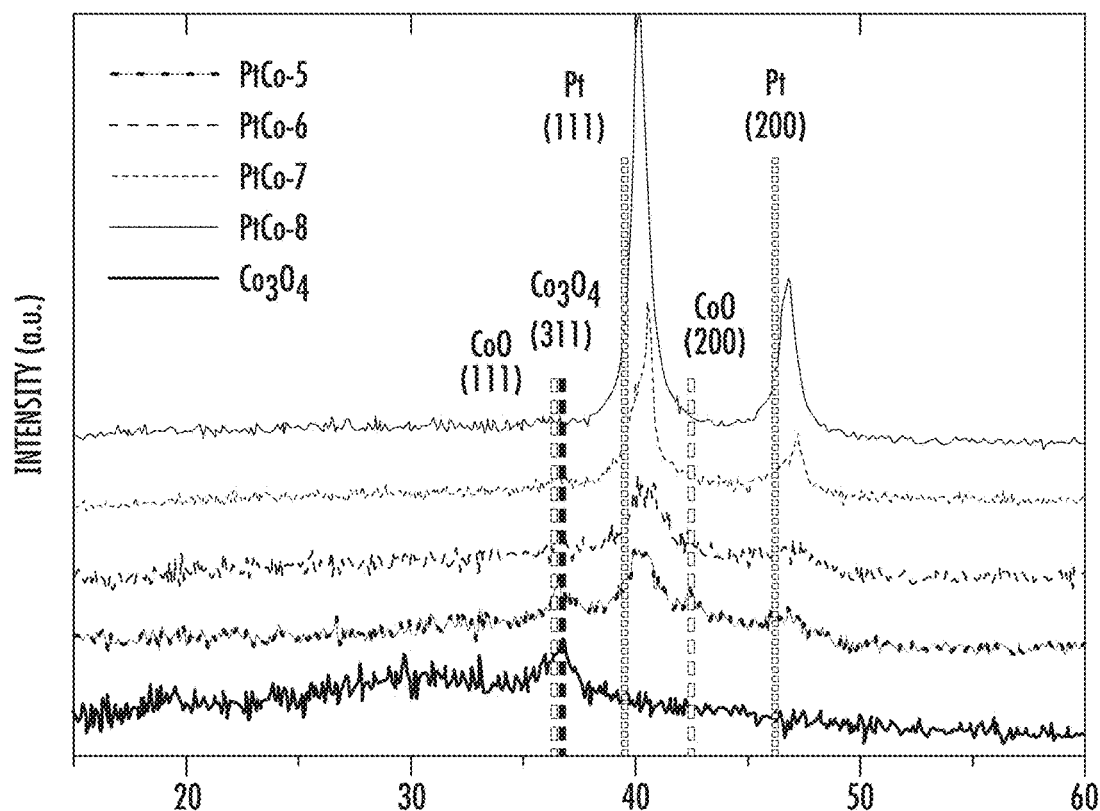
FIG. 13 depicts XRD data for $PtCo/CoO_x$ NCs dispersed in carbon black (CB)

To corroborate the abovementioned results, FIG. 13 summarizes the XRD data for all the $PtCo/CoO_x$ NCs dispersed in CB, where the sample from LASiS on Co (without the $K_2PtCl_4$ salt) displays the distinct $Co_3O_4$ (311) peak (PDF-#42-1467) at $2\theta=36.9°$, but does not show any characteristic peak for CoO (PDF-#43-1004). In contrast, the PtCo-5 sample indicates a CoO (200) peak at $2\theta=42.4°$ along with a minor peak at $2\theta=\sim36.6°$ which is assigned as an overlapped peak of CoO (111) ($2\theta=36.5°$) and $Co_3O_4$ (311) ($2\theta=36.9°$). These results further confirm the SAED data in FIG. 10D that the CoO gets partially conserved in the $PtCo/CoO_x$ NCs that do not undergo further oxidation during the ageing process. Meanwhile, two distinct characteristic peaks are also observed for this sample at $2\theta=40.2°$ and $2\theta=46.7°$ that are assigned to the (111) and (200) peaks for PtCo alloy. Here, one needs to note that the 2θ values for standard Pt are 39.8° (111) and 46.2° (200) (PDF-#04-0802). The shift of these peaks to higher angles is attributed to the Pt alloying with Co that result in a shrunken lattice constant calculated to be approximately 3.88 Å as compared to 3.92 Å for standard Pt. Besides, FIG. 13 also reveals that the alloyed PtCo peaks quickly become dominant with the increase of Pt:Co ratio. Specifically, for the case of PtCo-7 and PtCo-8 (Pt—Co ratio equals to 1:2 and 1:1), the $CoO_x$ peaks are barely discernable, which is ascribed to the much higher crystallinity and hence, the diffraction pattern intensity for Pt alloyed with Co as compared to that for $CoO_x$. It needs to be noted here that this phenomenon is also supported by the previous SAED patterns in the insets of FIGS. 10A-D. The alloyed Pt:Co ratios from PtCo-5 to PtCo-8 are estimated to be 8.6:1, 6.7:1 and 4.6:1 and 11.5:1, respectively according to the Vegard's law (Equation 2), as summarized in Table 3.

TABLE 3

| Sample | 2θ (°) | Lattice constant (Å) | Pt:Co |
|---|---|---|---|
| PtCo-1 | 40.2 | 3.88 | 8.6:1 |
| PtCo-2 | 40.3 | 3.87 | 6.7:1 |
| PtCo-3 | 40.5 | 3.85 | 4.6:1 |
| PtCo-4 | 40.1 | 3.89 | 11.5:1 |

In some aspects, the seeding Co NPs from the cavitation bubble (see, e.g., 906, FIG. 9) go through two competing reactions, namely, either GRR with $[PtCl_4]^{2+}$ or oxidation by solution phase $O_2$ and $H^+$. When the initial $K_2PtCl_4$ concentration is low, a large portion of Co will react with solution phase $O_2/H^+$, thereby leaving few available seeding Co NPs to alloy with Pt formed via GRR mediated reduction by Co. Hence, the Co:Pt ratio in the PtCo alloys rises at first with increasing initial $K_2PtCl_4$ concentrations in the solution. However, beyond a critical value, further increase of $Pt^{2+}$ ion concentrations leads to oxidation of Co atoms in the initially formed PtCo alloy. Such a de-alloying process may reduce an amount of alloyed Co in the PtCo NAs.

In some aspects, catalytic activities for both pure $Co_3O_4$ NPs and $PtCo/Co_3O_4$ NCs were tested with the aid of an RDE measurement in $O_2$-saturated 1 M KOH solution, as shown in FIGS. 14A-14E. In order to overcome the electronic conductivity limitations and increase the catalytic surface area for ORR experiments, all the synthesized NCs were dispersed in CB (Vulcan XC-72R, weight ratio NP:CB=1:4). Notably, LSV on pure $Co_3O_4$ NPs generated from high fluence (HF, 60 $J/cm^2$) and low fluence (LF, 1 $J/cm^2$) LASiS has resulted in half-wave potentials and diffusion limiting currents for HF $CO_3O_4$ samples that are better than those for LF $Co_3O_4$ samples (i.e., 770 mV and 3.25 $mA/cm^2$ vs. 740 mV and 2.75 $mA/cm^2$ for HF vs. LF samples respectively). This is attributed to the uniform sizes and spherical shapes of HF $Co_3O_4$ NPs obtained from the explosive boiling mechanism of LASiS at high laser energy. Hence, the choice for all catalytic studies presented herein are for the $Co_3O_4$ and $PtCo/CoO_x$ samples synthesized at HF (60 $J/cm^2$) conditions.

Figure 14A:
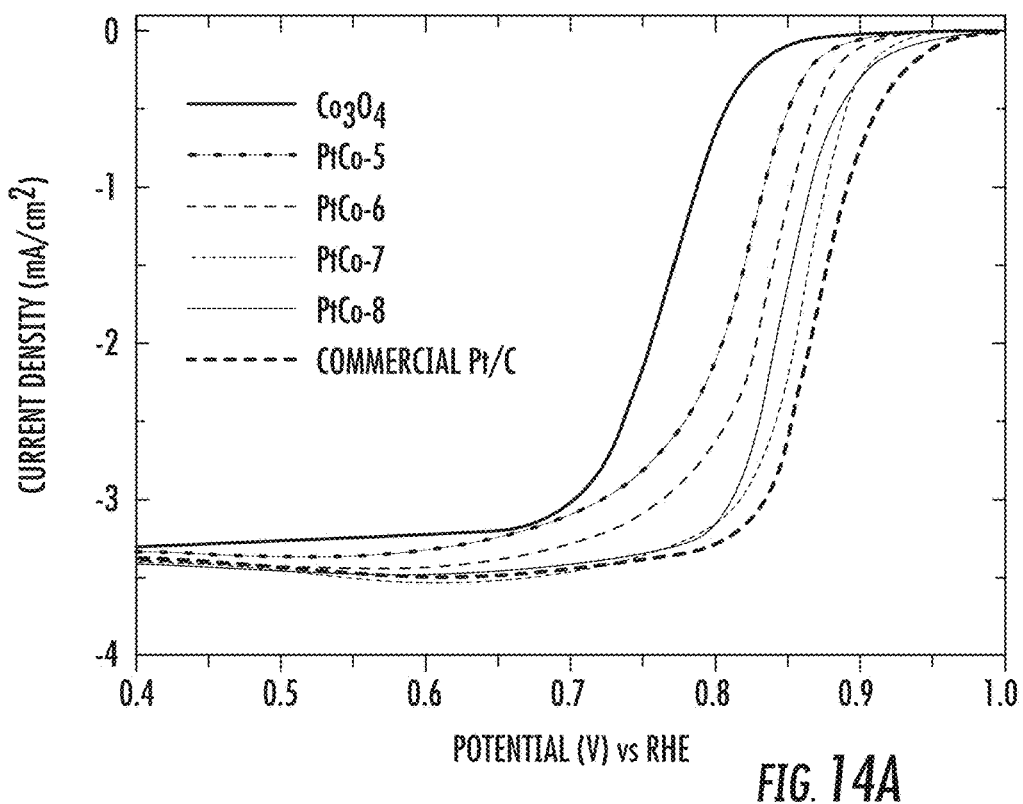
FIG. 14A depicts a graphical representation of ORR catalytic performance for each of the catalyst samples under study through the linear sweep voltammogram (LSV) test.
Figure 14B:
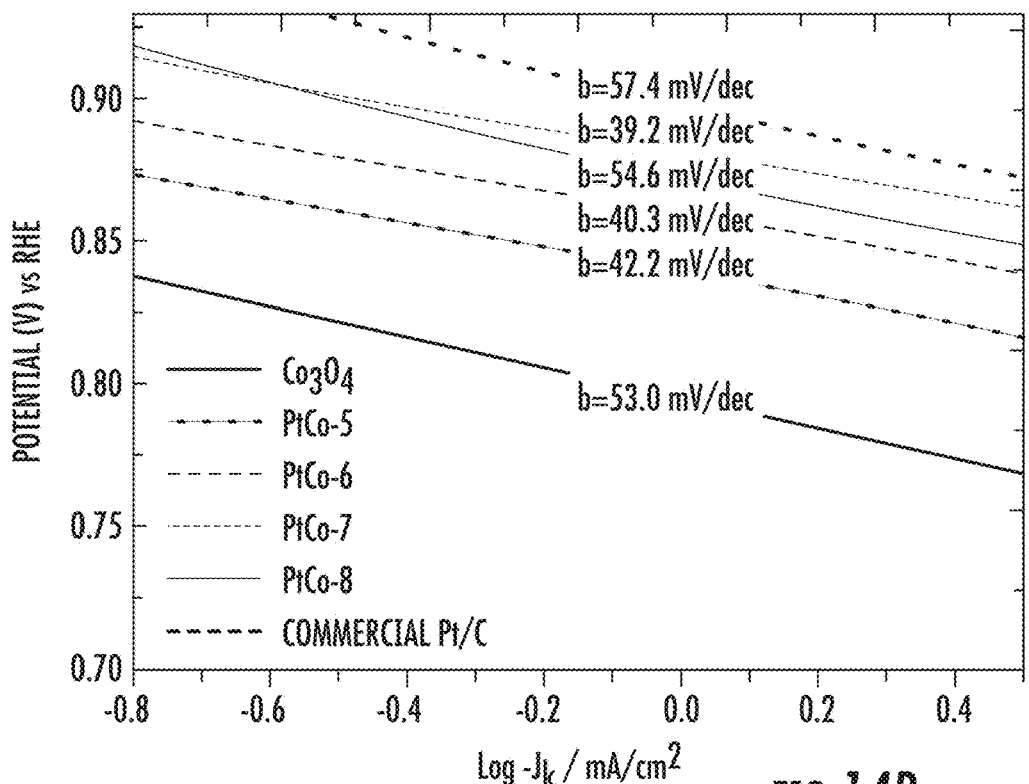
FIG. 14B depicts a graphical representation of a comparison of the Tafel plots for the samples generated from FIG. 14A over low overpotential regions.

In some aspects, the clean, one-step synthesis process for LASiS may be used in generating NPs devoid of any additional chemicals (surfactants, reducing agents, etc.) that can retard or poison their catalytic activities. FIG. 14A compares the ORR catalytic performance for each of the catalyst samples under study through the LSV test. The results indicate a remarkable improvement for the ORR activities with the increase of Pt to Co ratio from 1:9 (PtCo-5) to 1:2 (PtCo-7). Specifically, the half-wave potential for the PtCo-7 sample is improved to 860 mV, which is almost comparable to the corresponding values for standard Pt/C samples (870 mV). The ORR overpotential for this sample is calculated to be 370 mV based on the standard potential for reduction of oxygen to water being 1.23 V. However, as the Pt:Co ratio further increases to 1:1 for PtCo-8, the half-wave potential slightly reduces to 850 mV, with the overpotential calculated to be 380 mV. Besides, FIG. 14B compares the Tafel plots for the abovementioned samples generated from FIG. 14A over the low overpotential regions. The measured Tafel slope values are 53.0, 42.2, 40.3, 39.2 and 54.6 mV/dec respectively as compared to approximately 66.2 mV/dec for standard Pt/C samples thereby indicating higher charge transfer coefficients for the as-synthesized catalysts.

Figure 14C:
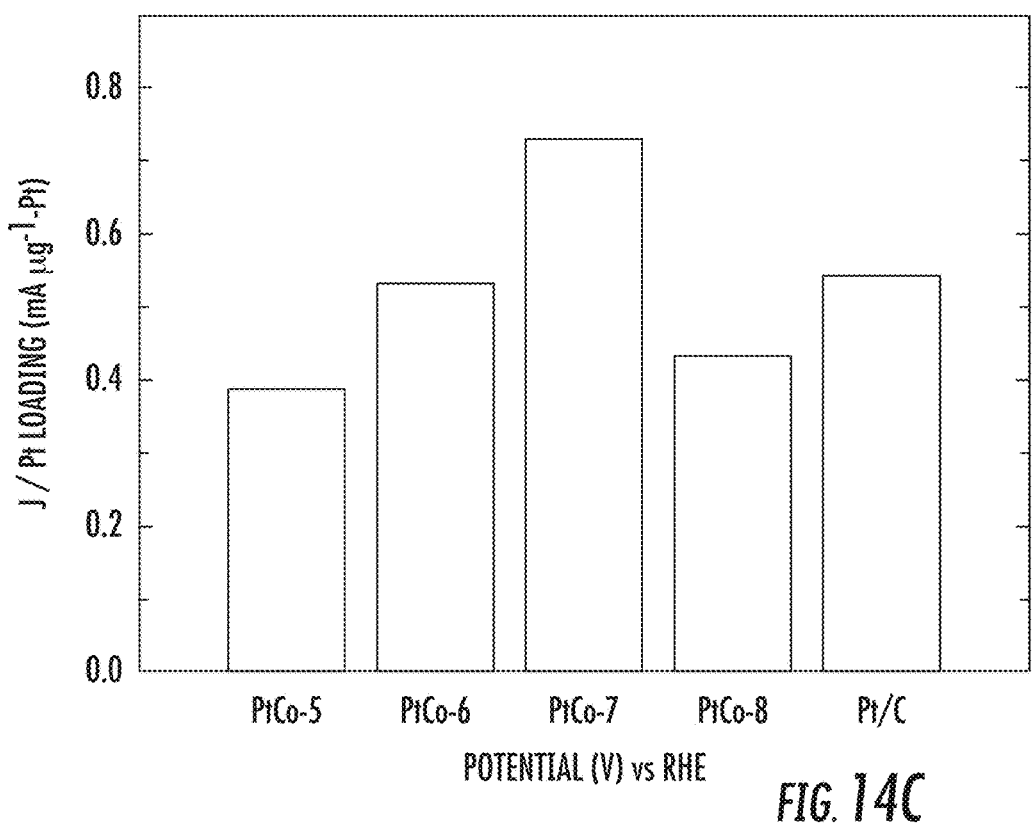
FIG. 14C depicts a graphical representation of a comparison of mass activities per unit Pt loading amount at 0.85 V vs. RHE for the $PtCo/CoO_x$ NCs studied.

FIG. 14C further compares the mass activities per unit Pt loading amount at 0.85 V vs. RHE for the $PtCo/CoO_x$ NCs studied. The results indicate a much higher mass activity for PtCo-7 sample (0.73 $mA\,\mu g^{-1}$ Pt) than the commercial Pt/C (0.54 $mA\,\mu g^{-1}$ Pt). The other three samples (PtCo-5, PtCo-6 and PtCo-8) demonstrate lower but comparable mass activities, although the PtCo-8 sample with an increased amount of Pt indicates a marked drop in the ORR activity. The excellent ORR activities for these materials are mainly attributed to the following reasons. Firstly, the formation of alloyed PtCo nanostructures shrinks the Pt lattice constants and decreases the effective sites for $OH^-$ adsorption. Added to that, it enhances the Pt—O bonding due to higher 5d orbital vacancies in its electronic structure that promotes the donation of π electrons from $O_2$ to Pt. [30,70] Hence, the sites on the PtCo alloy NPs (known for their ORR activities) preferentially promote both $O_2$ adsorption and $OH^-$ desorption, both of which benefit the ORR efficiency. Secondly, the NC of the metal-transition metal oxide (NM-TMO) system further benefits the ORR process by providing a synergic "spill-over" effect. [71,69] Specifically, the $OH^-$ reduced from $O_2$ is readily desorbed from the active PtCo sites and transferred to the sponge-shaped $CoO_x$ sites which are less active according to their respective M-O bonding strength and intermolecular affinities. Thus, the best ORR activity is promoted by the PtCo-7 catalyst with optimal Pt content (33.3 molar %, 62.3 wt. %) that leads to higher degree of Pt—Co alloy formation (confirmed by FIG. 13 and Table 3) with more lattice shrinkage and appropriate sizes (mean size=11.7 nm), as well as by the balanced PtCo to $CoO_x$ ratio that potentially maximizes the synergic "spill-over" effects.

Figure 14D:
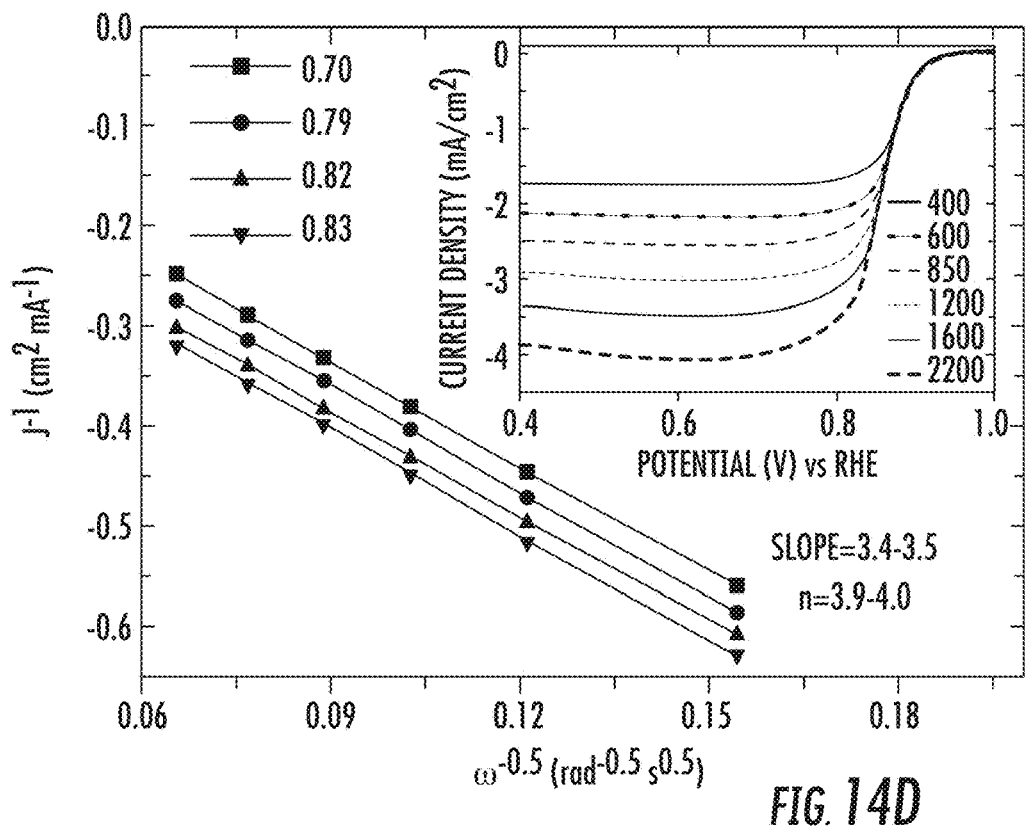
FIG. 14D depicts a graphical representation of slopes for the KL plots generated from rotation-rate dependent current-potential curves (inset in FIG. 14D) for the PtCo-7 NCs in the range of 0.70-0.83 V.

In some aspects, dynamics of the electron transfer process during ORR activities of the aforementioned catalysts are analyzed using the KL equation (Equation 4) for RDV measurements carried out at different speeds. For example, FIG. 14D illustrates slopes for the KL plots generated from rotation-rate dependent current-potential curves (inset in FIG. 14D) for the PtCo-7 NCs in the range of 0.70-0.83 V. The slopes estimate the number of electrons transferred (n) to be 3.9-4.0, thereby indicating an ideal four-electron transport process for the ORR activity. In some aspects, for example, a corresponding electron transfer number for each of PtCo-5, PtCo-6 and PtCo-8 NCs is 3.8-4.0.

Figure 14E:
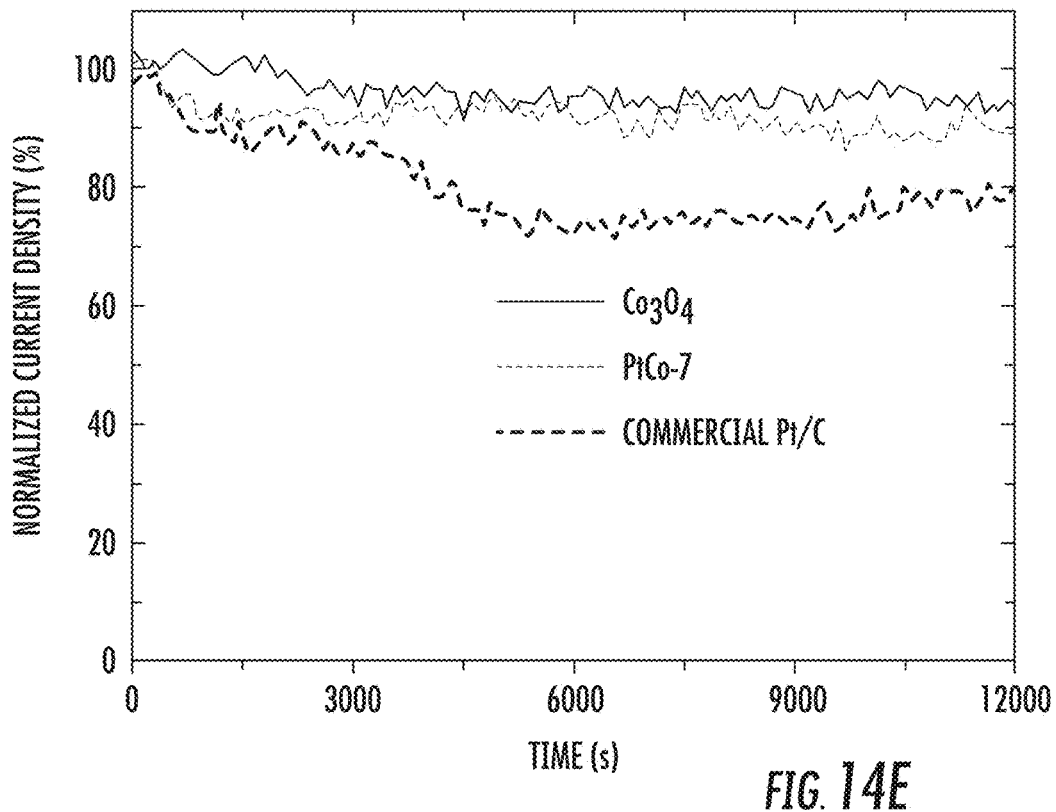
FIG. 14E depicts a graphical representation of a comparison of normalized current density (%) at the corresponding half-wave potentials for the $Co_3O_4$, PtCo-7, and standard Pt/C samples.

In addition to the good ORR catalytic activities, chronoamperometric (CA) measurements also reveal excellent stabilities for the PtCo-7 NC samples. FIG. 14E compares the normalized current density (%) at the corresponding half-wave potentials for the $Co_3O_4$, PtCo-7, and standard Pt/C samples. As can be seen from the results, the ORR current densities decay by less than 15% over 12000 s of continuous operation for both the $CO_3O_4$ and PtCo-7 samples. In contrast, the standard Pt/C sample indicates approximately a 28% current density reduction over the same period of time. The decay in the catalytic activities of standard Pt/C samples is attributed to its surface oxidation as well as particle dissolution and aggregation in the alkaline electrolyte [72], which hardly occur for the metal oxides ($Co_3O_4$/COO). In fact, in the case of the PtCo/$CoO_x$ NCs, the existence of the sponge-shaped $CoO_x$ serves as a matrix material that protects the PtCo alloyed NPs from aggregation or dissolution. Meanwhile, the alloyed PtCo structure also helps to slow down the oxidation of Pt due to the much higher electron negativity of Co.

Figure 15A:
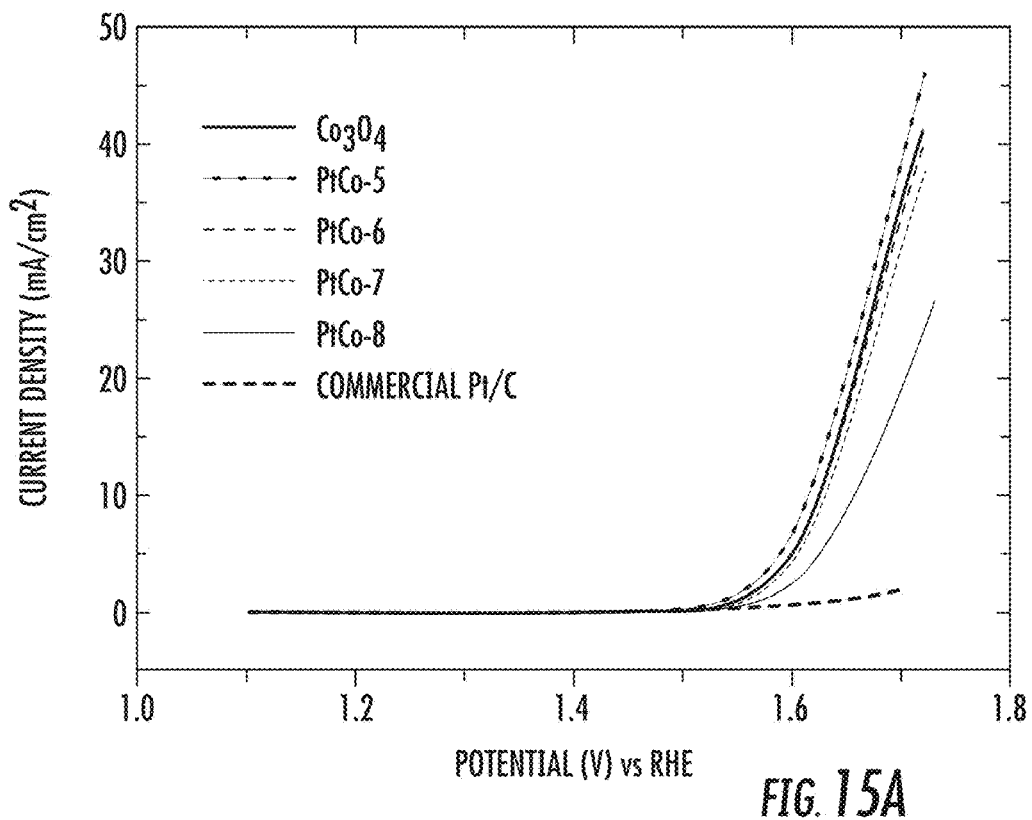
FIGS. 15A-15B depict graphical representations of OER catalytic activities for PtCo-5, PtCo-6, PtCo-7, and PtCo-8 compared against pure $Co_3O_4$ and standard Pt/C samples.
Figure 15B:
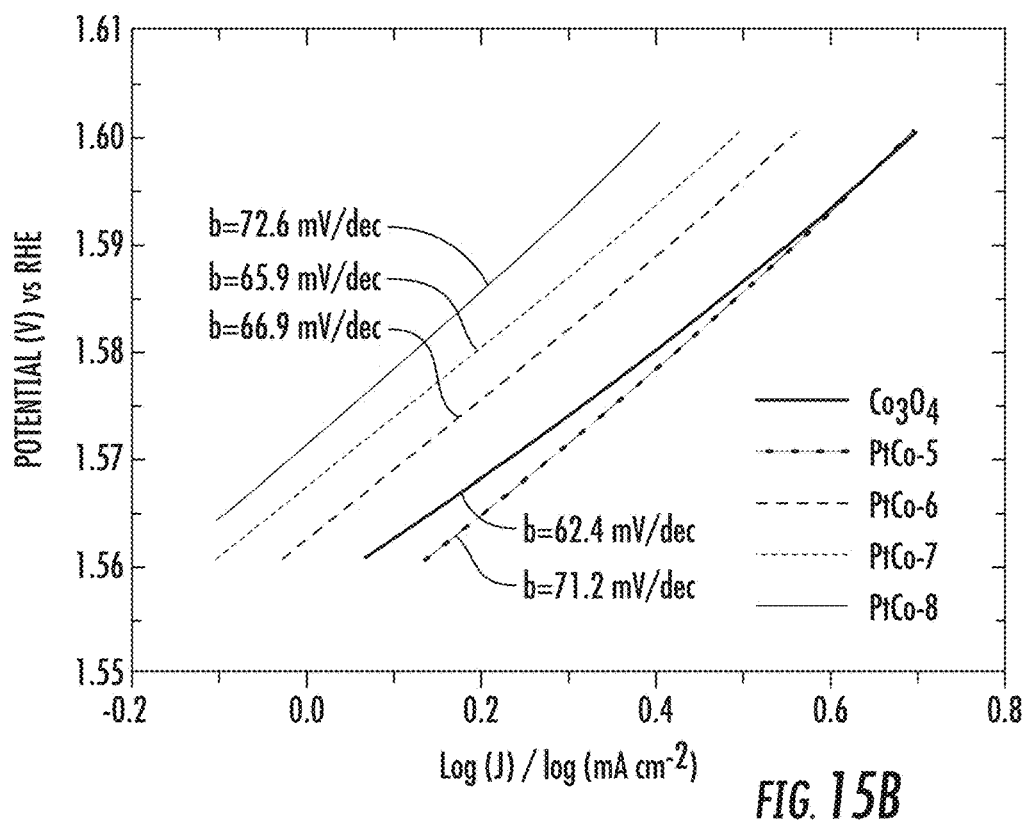
Figure 15C:
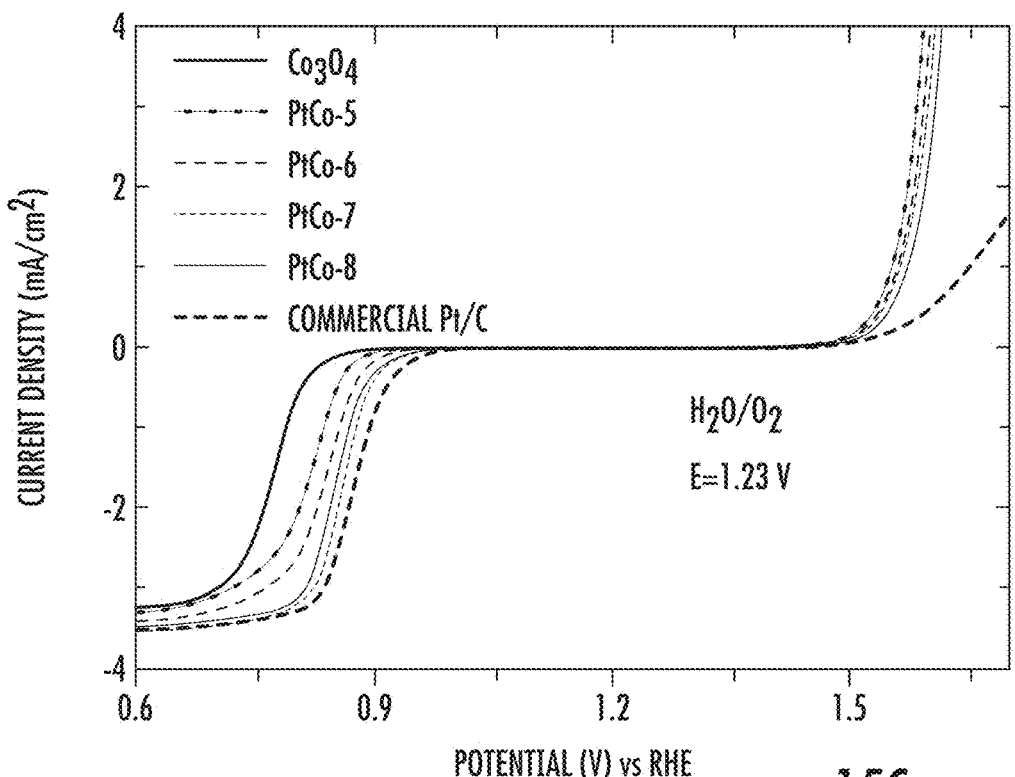
FIGS. 15C-15D depict graphical representations of combined overpotentials for PtCo-5, PtCo-6, PtCo-7, and PtCo-8 compared against pure $Co_3O_4$ and standard Pt/C samples.
Figure 15D:
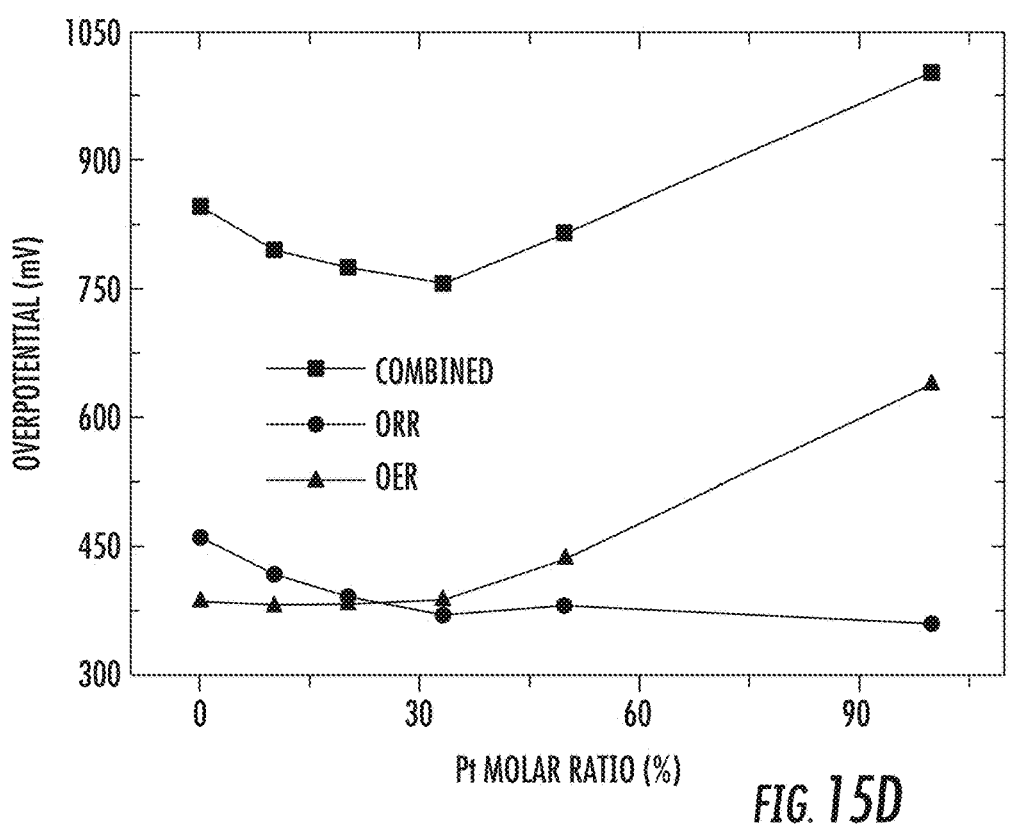

In some aspects, the OER catalytic activities for the PtCo NC samples were investigated by comparing with the results for pure $Co_3O_4$ and standard Pt/C samples, as illustrated in FIGS. 15A-15B. For comparing the OER overpotentials, all potential measurements were carried out with 10 mA/cm² as the metrics due to its relevance to solar fuel characterizations [62]. The results reveal that, with an overpotential of 385 mV (FIG. 15A) and a measured Tafel slope of 62.4 mV/dec, the LASiS generated $Co_3O_4$ itself is comparable or, even better than other reported OER catalysts. [62, 66, 67, 68, 73, 74] As expected, the standard Pt/C sample shows the worst OER activities (with an overpotential of approximately 640 mV). As also mentioned earlier, the high OER activity for $Co_3O_4$ NPs is attributed to the clean synthesis route of LASiS that produces the sponge-like nanostructures with enhanced surface area that do not have any surface contamination from unwanted chemicals during the preparation. Notably, the most significant observation from FIG. 15A is that the PtCo-5 sample exhibits an even smaller OER overpotential (380 mV) than the $Co_3O_4$ sample that is typically well-known for OER activities. In fact, the overpotentials for PtCo-6 and PtCo-7 are also comparable (i.e., approximately 385 and 386 mV respectively), indicating that these PtCo/$CoO_x$ NCs exhibit good OER catalytic activities, as well. Here, it may also be noted that the PtCo-8 sample displays a relatively poorer activity (i.e., an overpotential of approximately 435 mV) that could be possibly due to the scarcity of $CoO_x$ in the NC catalyst. It is also noted here that Tafel slopes for the PtCo NCs are slightly larger (approximately 71-72 mV/dec for PtCo-5 and PtCo-8 whereas, approximately 66-67 mV/dec for PtCo-6 and 7) as compared to those for pure $Co_3O_4$ (approximately 62.4 mV/dec) as seen from FIG. 15B. The enhanced OER performance can also be attributed to the aforementioned synergic "spillover" effect for specific NM-TMO systems, where the produced $O_2$ is desorbed from active $CoO_x$ surfaces and transferred to relatively inert PtCo NA sites with higher $O_2$ affinity. The combined overpotentials for PtCo-5 to PtCo-8 are calculated to be 795, 775, 756, and 815 mV, respectively, which remarkably outperform the overpotentials for either $Co_3O_4$ or the commercial Pt/C (i.e., 845 mV for $CO_3O_4$ and 1000 mV for commercial Pt/C), as shown in FIGS. 15C-15D. These results indicate that the synthesized PtCo NCs exhibit superior bifunctional catalytic performances for both ORR and OER processes, especially for the PtCo-7 sample with an optimal Pt amount (33.3 molar %, 62.3 wt.

Figure 16:
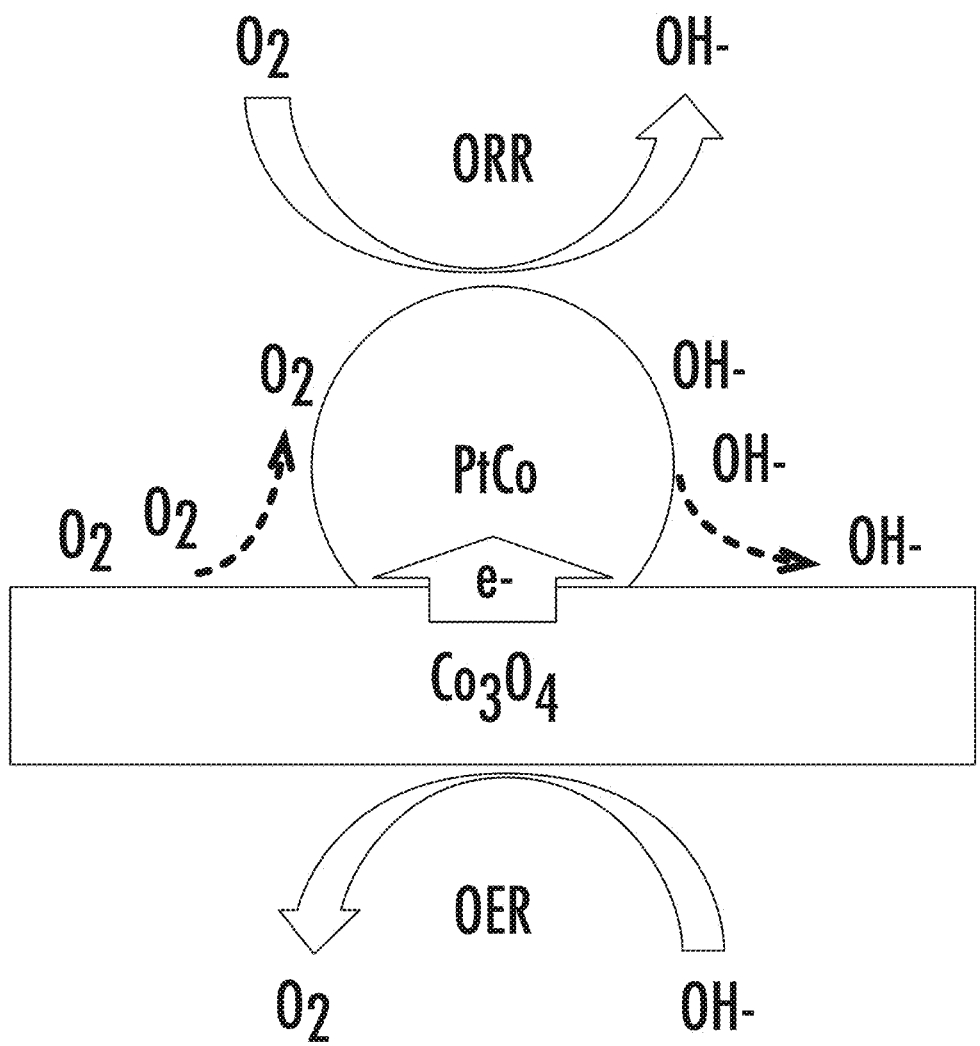
FIG. 16 depicts a schematic illustrating the synergic "spill-over" effects responsible for the site-specific adsorption/desorption of the desired species to promote bifunctional catalytic performances in NCs produced using tandem LASiS-GRR.

For better understanding, a schematic in FIG. 16 illustrates the detailed mechanistic picture behind the synergic "spill-over" effects responsible for the site-specific adsorption/desorption of the desired species to promote the bifunctional catalytic performances in the aforementioned NCs. For both ORR and OER, the PtCo sites and $CoO_x$ matrices provide synergic support for each other wherein each of the sites provides refuge for the undesirable species from the other sites, thereby promoting both the reactions. Overall, the excellent bifunctional catalytic properties of the PtCo/$CoO_x$ NCs may be attributed to the unique heteronanostructuring of alloyed PtCo NPs embedded in the sponge-shaped $CoO_x$ matrices which, while contributing to the enhanced ORR and OER behaviors due to the synergic "spillover" effects, prevent the PtCo NPs from aggregation and dissolution in the alkaline media.

2.2—Synthesis of Ag Embedded ZnO/$TiO_2$ as Plasmonic Enhanced Materials

For the synthesis of Ag embedded ZnO/$TiO_2$ NCs, 5 mg of $AgNO_3$ was first dissolved in 40 ml of water, then transferred into the LASiS cell through the injection unit, bubbled with $N_2$ for 30 min. The Zn/Ti pellet was then ablated in those $O_2$-free $AgNO_3$ solutions using a laser, such as for example, an unfocused 1064 nm laser (330 mJ/pulse, 10 Hz) for 10 min. Alternatively, a laser having different configurations may be utilized. For synthesizing core-shell $TiO_2$/Ag NPs, right after ablation, the pH of the produced colloidal solution was adjusted to 2 by adding $HNO_3$ (1M) followed by aging in darkness for 24 hours and centrifuging at 4700 rpm for 15 min, finally decanted after washing with DI-water for two times.

Figure 17A:
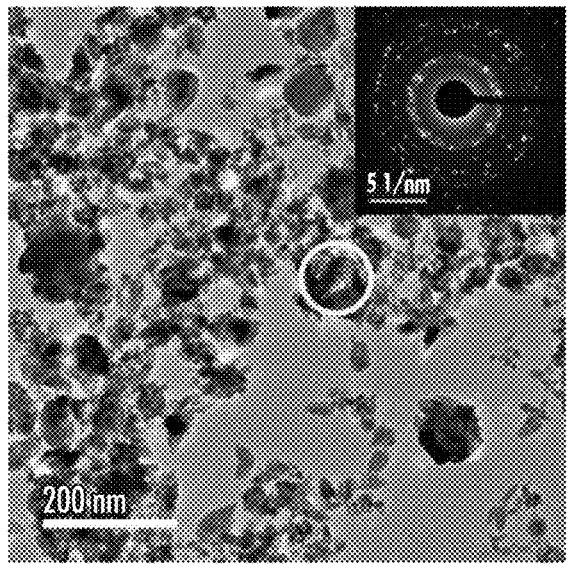
FIGS. 17A-17D depict TEM images of nanostructures formed in the products of LASiS and the resulting lattice planes.
Figure 17B:
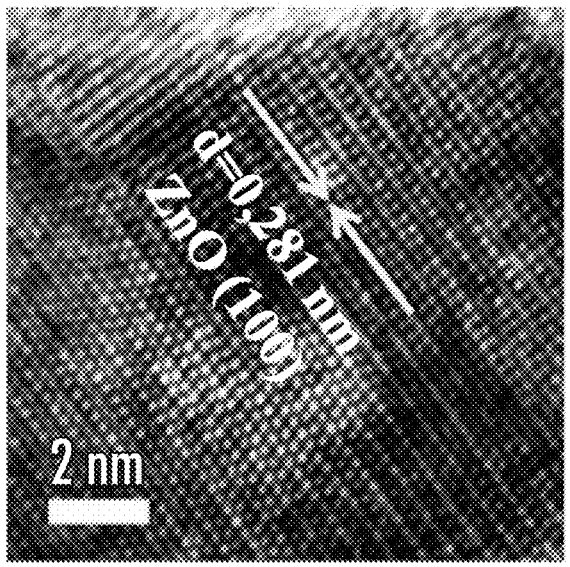
Figure 17C:
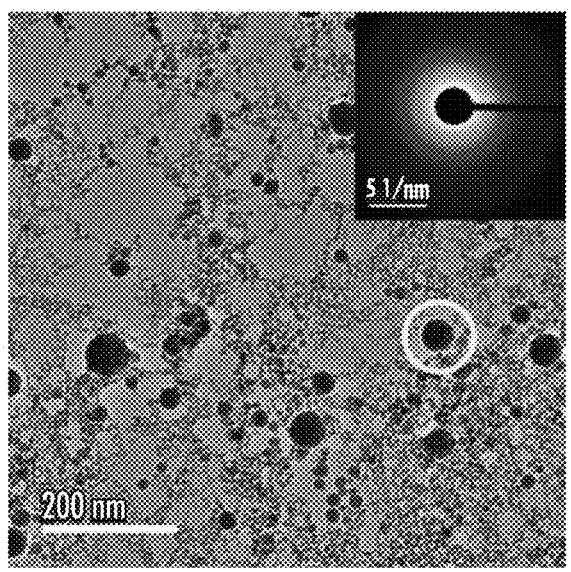
Figure 17D:
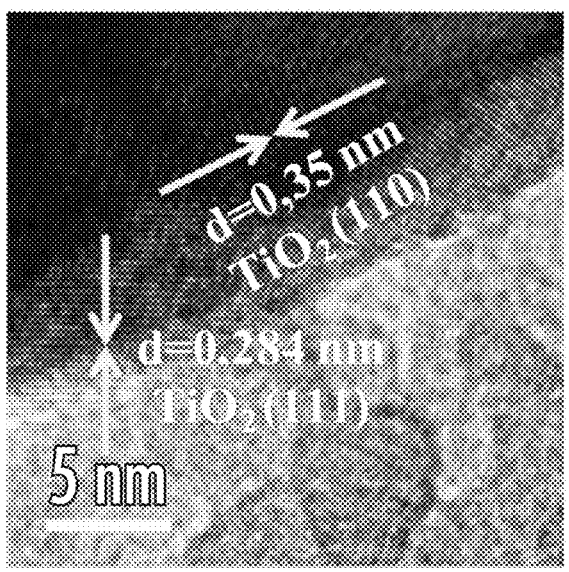

UV-Vis absorption measurement (Make: Biotek, Model: Synergy H1) was scanned over the wavelength range of 300 nm to 900 nm at a scan rate of 2 nm/step. The direct products from LASiS on Zn and Ti in water were determined as ZnO NPs, as well as a mixed state of $TiO_x$ NPs, respectively. For example, FIGS. 17A-17D illustrate TEM images of produced ZnO NPs with irregular shapes and some degree of aggregation. In FIG. 17A, the chemical composition (oxidation state) is determined by the SAED pattern in the inset along with the HRTEM image in FIG. 17B that reveals the ZnO (100) lattice plane with the d-spacing of 0.281 nm. Conversely, in FIG. 17C, two types of nanostructures are formed in the products of LASiS on Ti; namely, a large portion of amorphous dendritic structure along with randomly embedded spherical NPs, which are later determined as Srilankite type $TiO_2$ through the identification of its d-spacing in SAED and HRTEM (reveals the (111) and (110) facets with d spacing of 0.35 nm and 0.284 nm respectively).

In some aspects, after acid wash using 10 mM $HNO_3$ for three hours, the amorphous $TiO_x$ were completely gone, leaving only the spherical Srilankite type $TiO_2$. This acid-tolerant property provides great potential to be applied as sensor materials or catalysts in some harsh environment conditions.

Figure 18A:
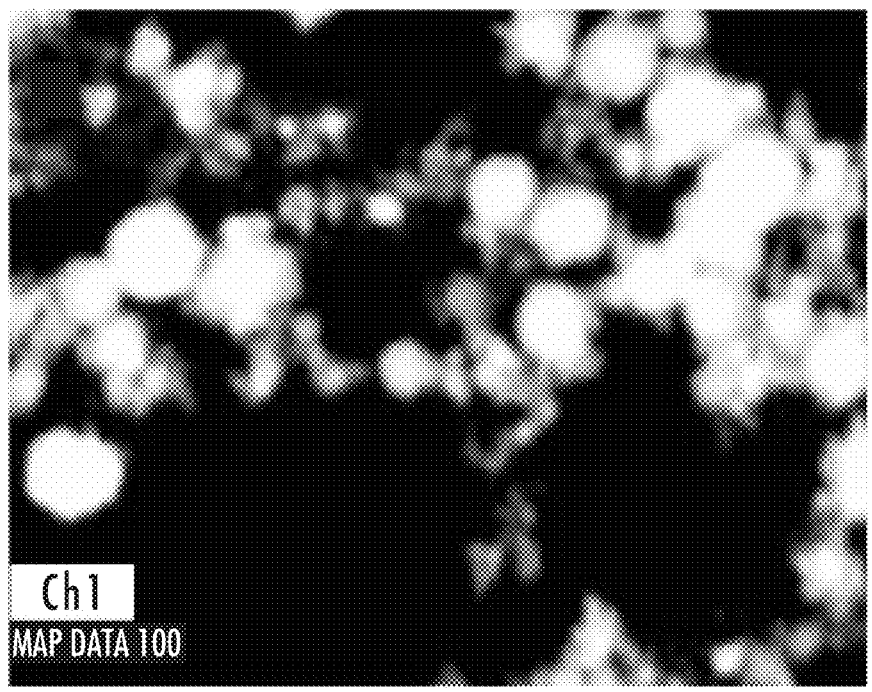
FIG. 18A depicts a HAADF image of the sample synthesized via LASiS on Zn in $AgNO_3$.
Figure 18B:
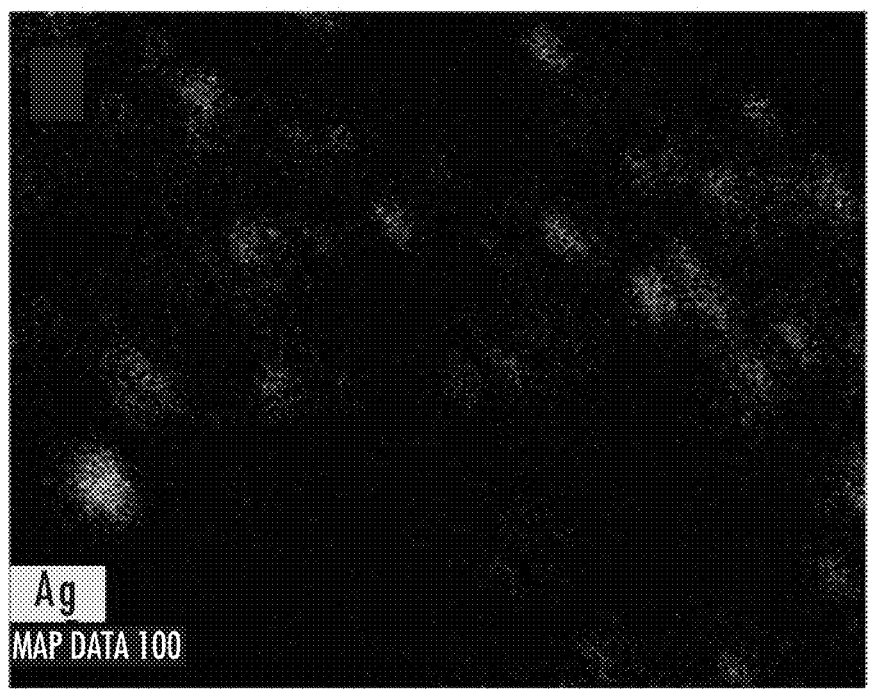
FIGS. 18B-18D depict the corresponding Ag, Zn and O elemental mappings, respectively, of the sample in FIG. 18A.
Figure 18C:
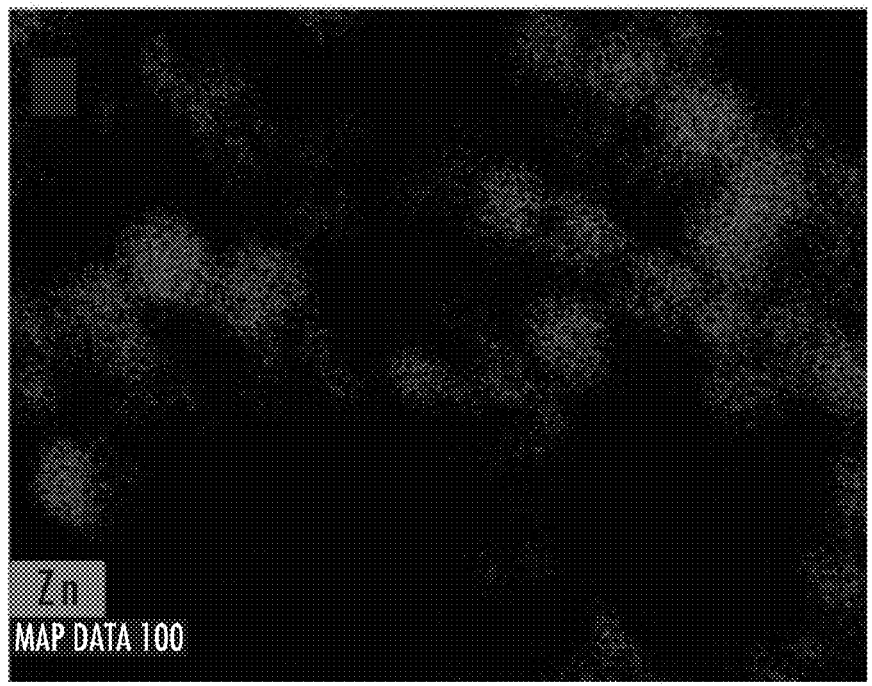
Figure 18D:
Figure 19A:
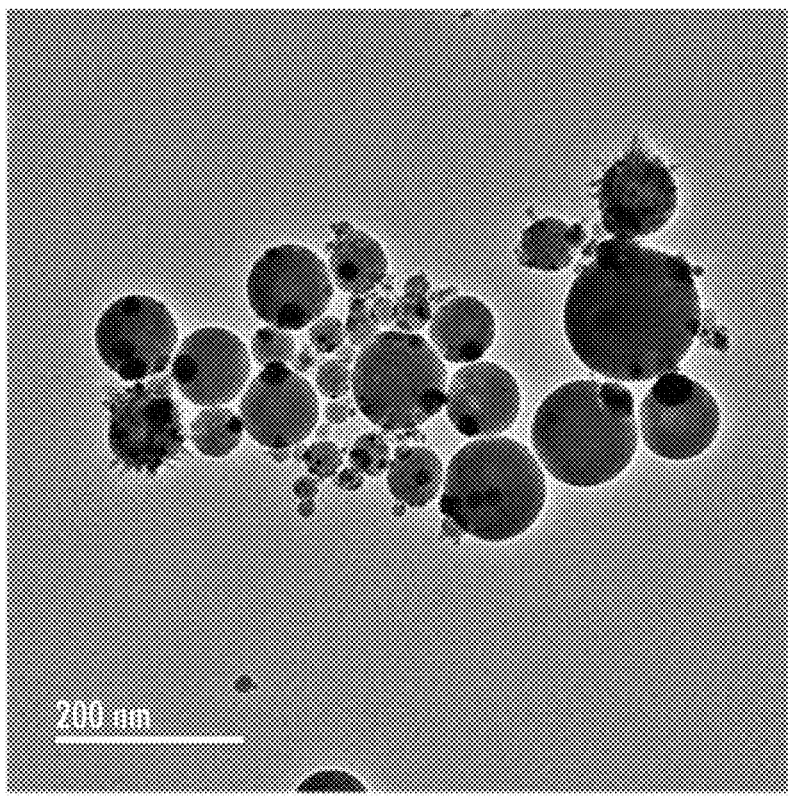
FIG. 19A depicts a HAADF image of the sample synthesized via LASiS on Ti in $AgNO_3$ after an $HNO_3$ wash.
Figure 19B:
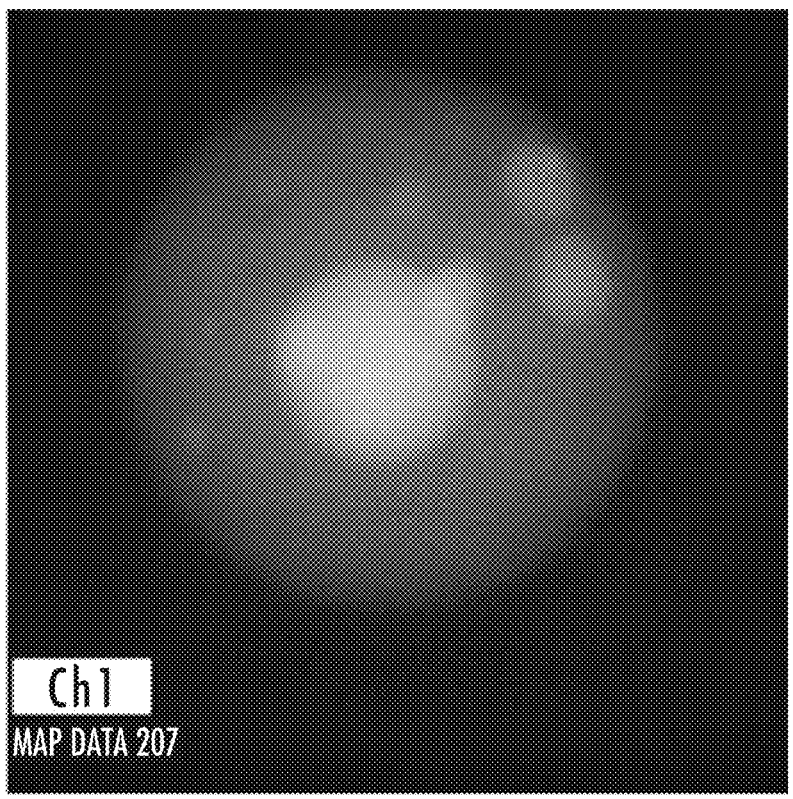
FIGS. 19B-19C depict an enlarged HAADF image and elemental mapping of FIG. 19A, respectively.
Figure 19C:
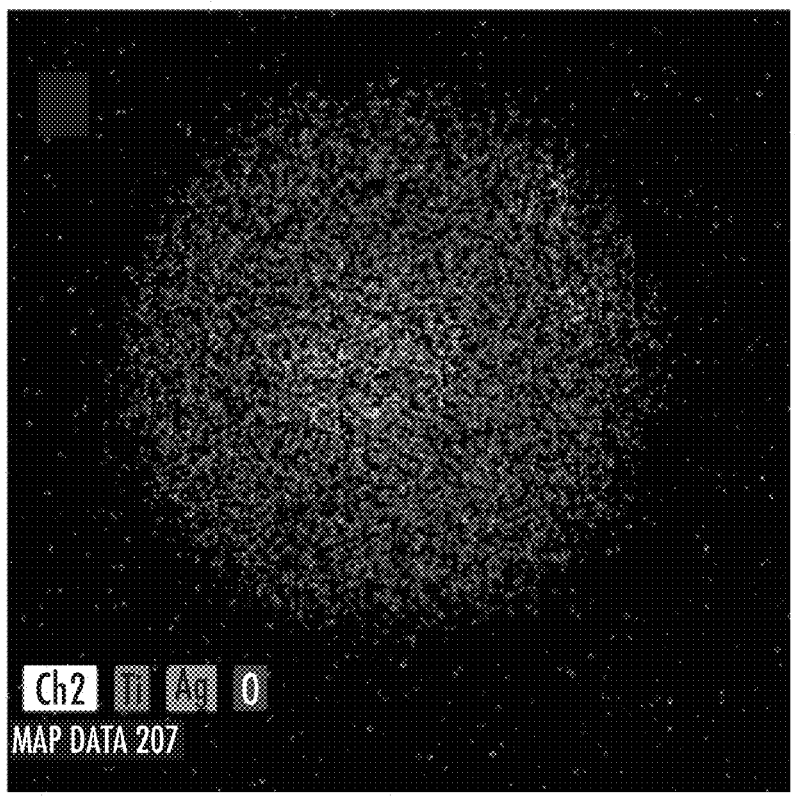
Figure 19D:
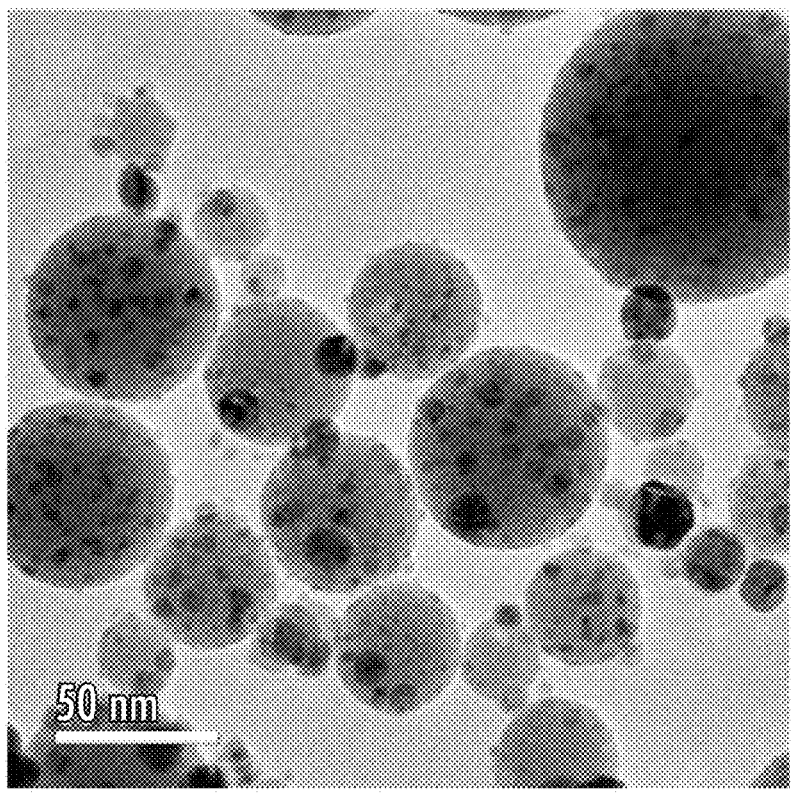
FIG. 19D depicts the sample illustrated in FIG. 19A after re-irradiation (RI) treatment.
Figure 19E:
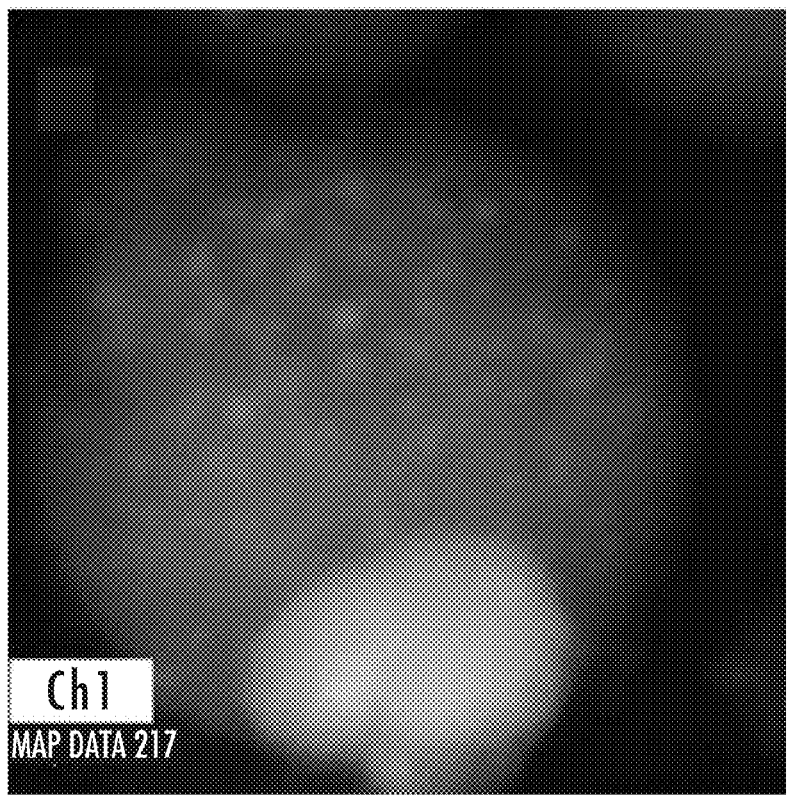
FIGS. 19E-19F depict an enlarged HAADF image and an EDX mapping of FIG. 19D, respectively.
Figure 19F:
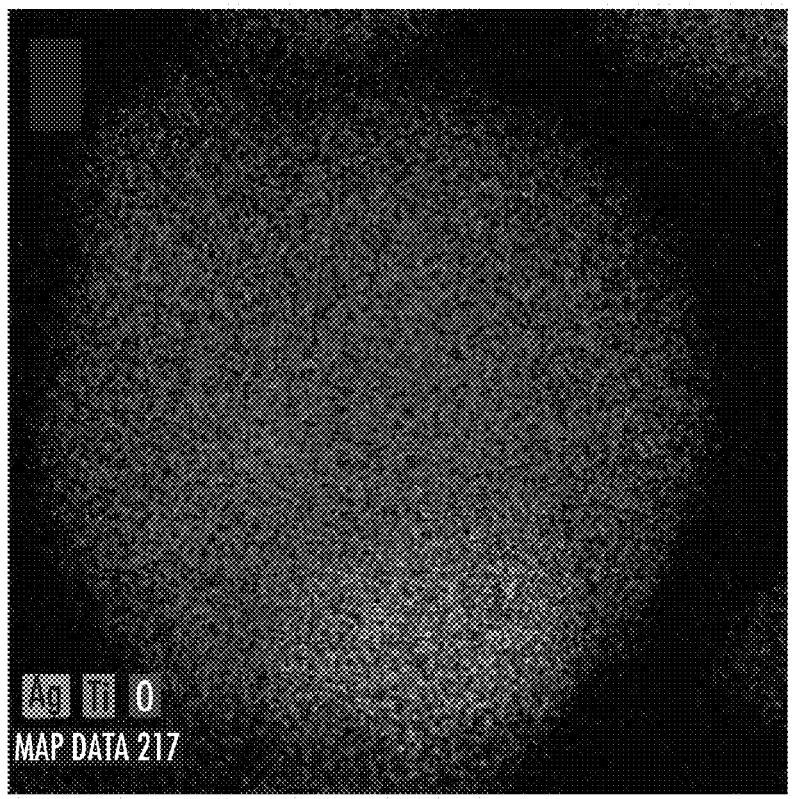

FIG. 18A illustrates a HAADF image of the sample synthesized via LASiS on Zn in $AgNO_3$, while FIGS. 18B-D illustrate the corresponding Ag, Zn and O EDX mappings, respectively. By carrying out tandem LASiS-GRR of Zn and Ti in $AgNO_3$ solution, the Ag NPs are embedded into the ZnO and $TiO_x$ matrices, respectively. This is also illustrated in FIGS. 19A-19F, where FIG. 19A illustrates a HAADF image of the sample synthesized via LASiS on Ti in $AgNO_3$ after an $HNO_3$ wash. FIGS. 19B-19C illustrate an enlarged HAADF image and EDX mapping of FIG. 19A, respectively. FIG. 19D illustrates the sample illustrated in FIG. 19A after re-irradiation (RI) treatment. FIGS. 19E-F illustrate an enlarged HAADF image and an EDX mapping of FIG. 19D, respectively.

Figure 20A:
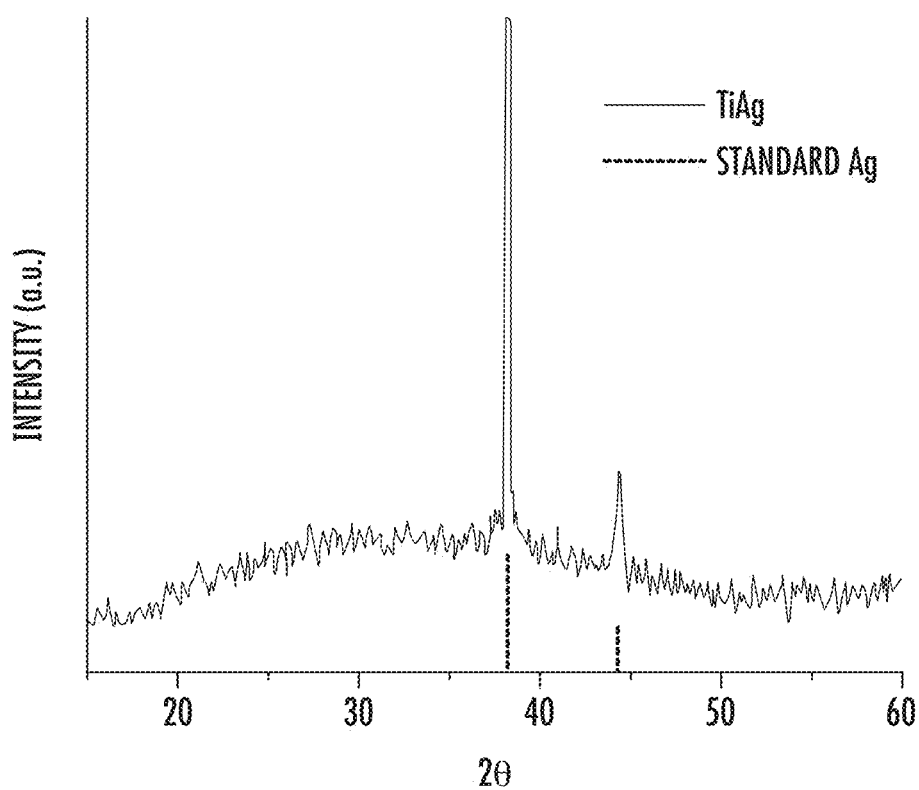
FIG. 20A depicts an XRD profile comparing TiAg against standard Ag.
Figure 20B:
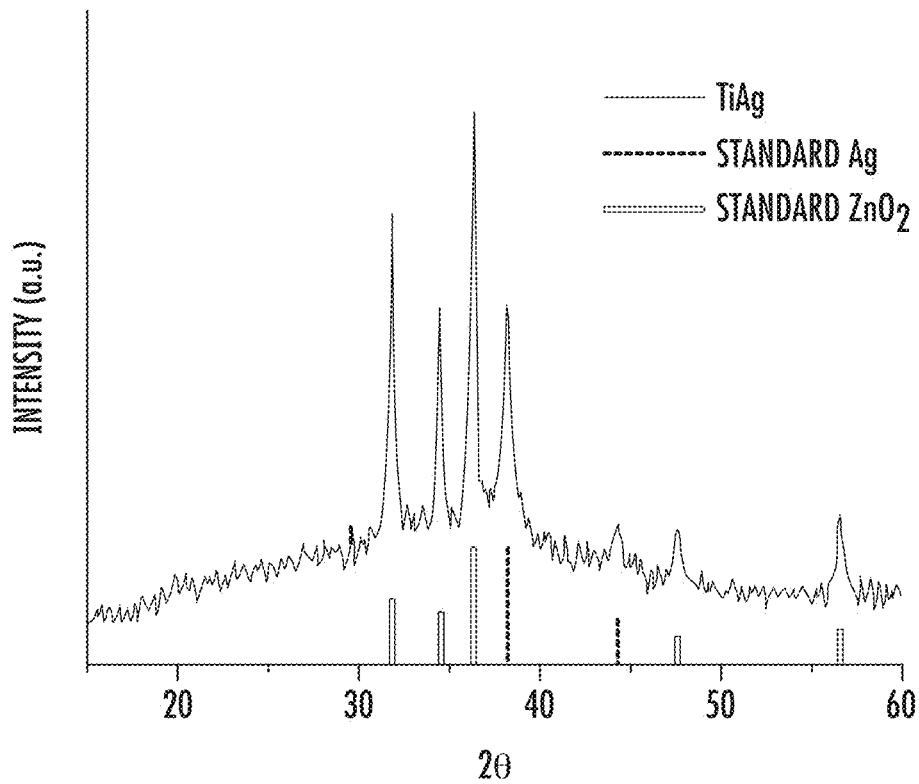
FIG. 20B depicts an XRD profile comparing ZnAg against standard Ag and standard $ZnO_2$.

In some aspects, for example, for the Zn target, Ag is uniformly embedded inside the ZnO matrices, as dictated by FIG. 18B. By comparison, for LASiS on Ti, as mentioned earlier, it forms a mixture of amorphous $TiO_x$ and spherical srilankite type $TiO_2$ NCs. For tandem LASiS-GRR on Ti with $AgNO_3$, an acid wash may be performed immediately after, and which ends up forming core-shell Ag/srilankite $TiO_2$ NPs. These srilankite $TiO_2$ are thus confirmed to be anti-corrosive under acid conditions, which provides the possibility of their use under harsh conditions. The embedding of Ag NPs is also confirmed by the XRD profile shown in FIGS. 20A-20B, where ZnO are also found to have much higher crystallinity than $TiO_x$. In some aspects, (Re-irradiation) RI treatment was performed on the synthesized Ag/$TiO_2$ using a laser, such as, for example, a 532 nm laser. Such an operation was found to reshape already formed irregular shaped $CoO_x$ NPs into spherical ones with enlarged sizes. Here, however, RI induces the formation of small clusters inside the big spherical srilankite $TiO_2$ NPs; meanwhile, a portion of embedded Ag NPs move outwards from the edge and become half-embedded, as revealed by FIGS. 19A-19F.

Figure 21A:
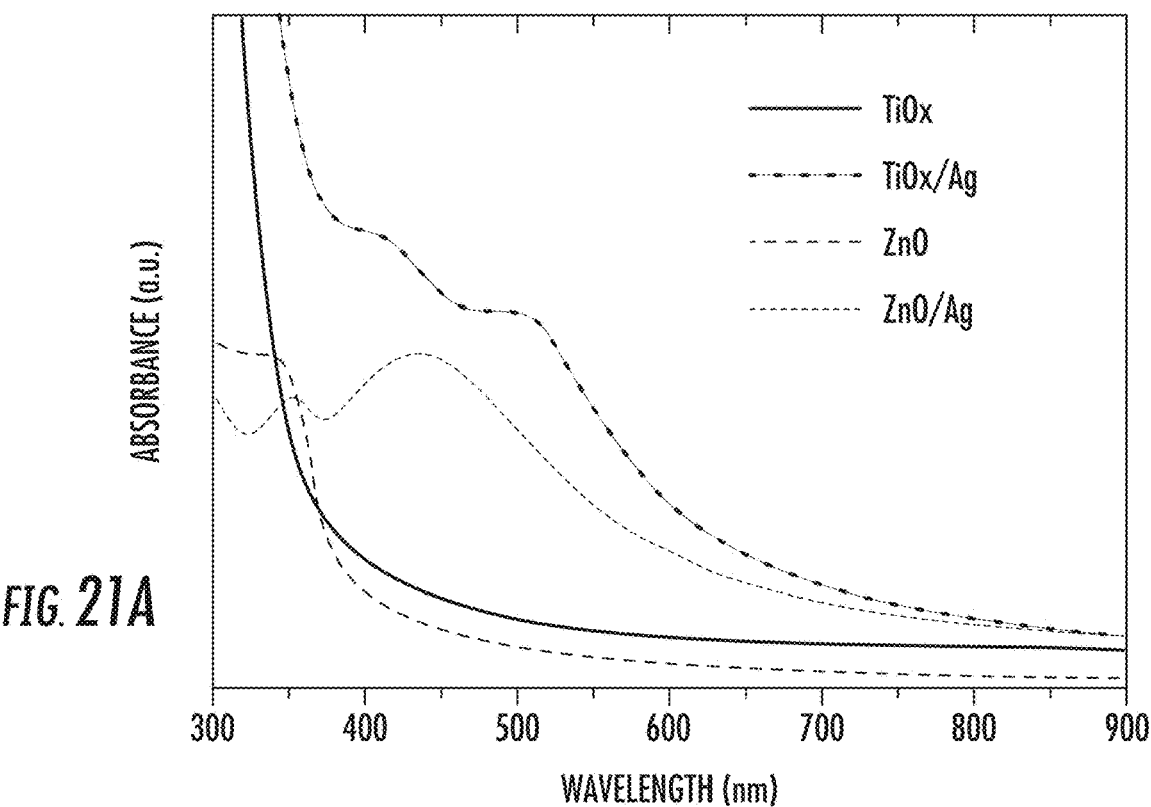
FIGS. 21A-21B depict graphical representations of UV-Vis absorbance.
Figure 21B:
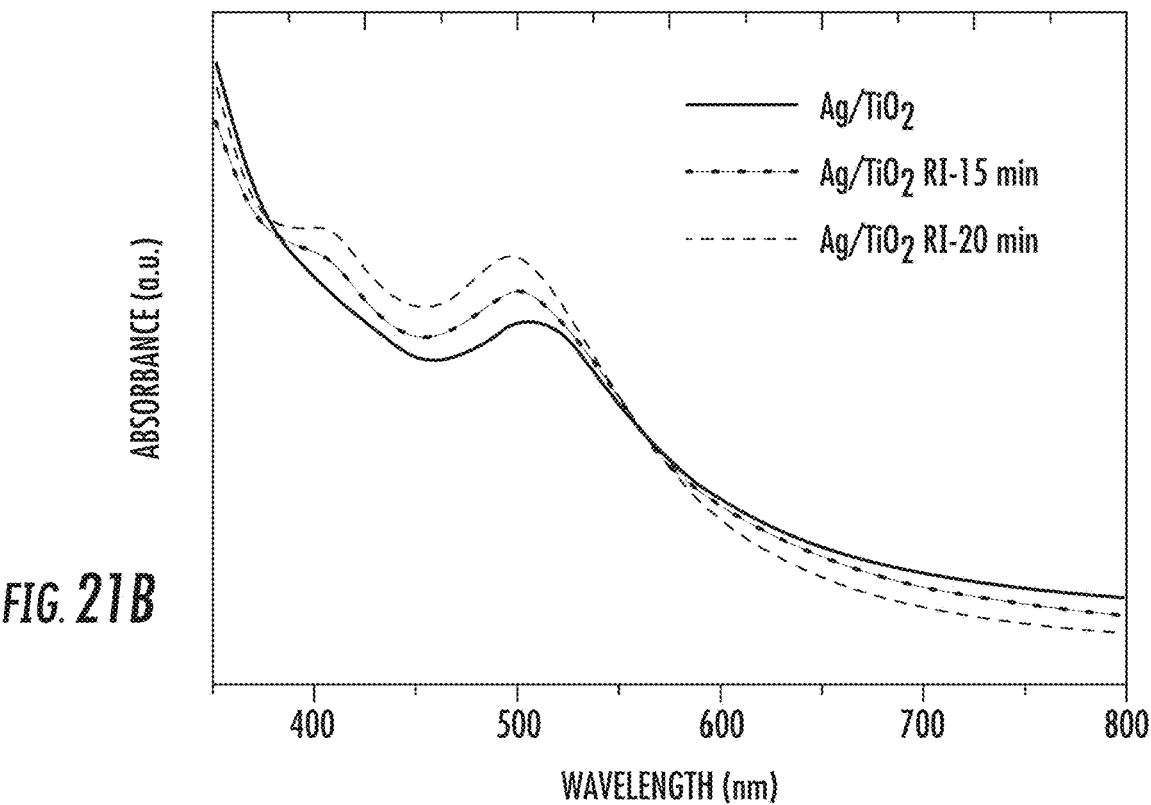

FIGS. 21A-21B illustrate UV-Vis absorbance. In some aspects, Ag is known by those having skill in the art for their localized surface Plasmon resonance (LSPR) properties, which were characterized via UV-Vis absorbance. For Ag/ZnO NCs, two plasmonic peaks form with the major one located at approximately 440 nm and a minor one centered at 350 nm; while for the Ag/$TiO_x$, the two plasmonic peaks red-shift to approximately 500 nm and 410 nm respectively, as can be seen in FIG. 21A. The dissimilarity may be due to the different Ag-metal oxide interactions as well as the variation in sizes, which may dramatically impact the electron resonance frequency and hence affect the LSPR position. FIG. 21B illustrates the RI effect on the acid washed Ag/$TiO_x$ NCs. It is first noted that right after acid wash, the minor peak at 400 nm is gone, which corresponds to the scattered Ag embedded in the amorphous $TiO_x$. However, the core-shell Ag/$TiO_2$ structure protects the Ag inside from washing away by acid, and therefore, remains the major LSPR peak. After RI for approximately 15 and 30 min, the major peak slightly blue-shifts to the smaller wavelength (i.e., approximately 490 nm), while the minor peak at 400 nm starts showing up again. In some cases, while it is not desired to be bound by any particular theory of operation, it is assumed that this is possibly ascribed to the Ag that gradually sliding out from the $TiO_2$ shell—a surface re-structuring process exerted by laser-induced thermal and photonic energy during RI.

Example 3—Synthesis of Ternary Nanoalloys

Figure 22A:
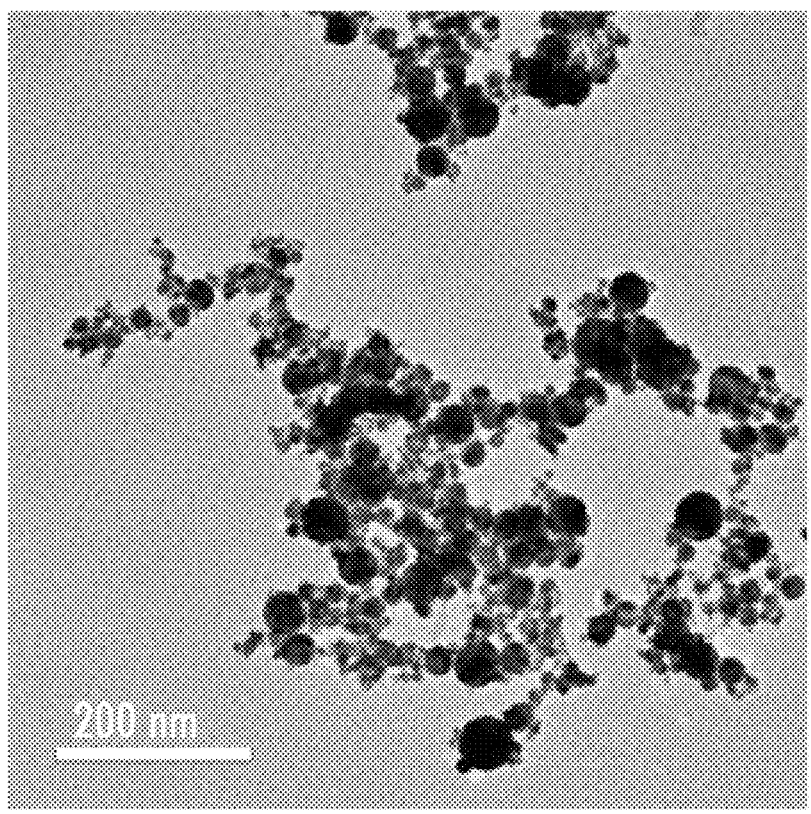
FIG. 22A depicts a TEM image for a sample PtCuCo-2 ternary alloy synthesized via tandem LASiS-GRR.
Figure 22B:
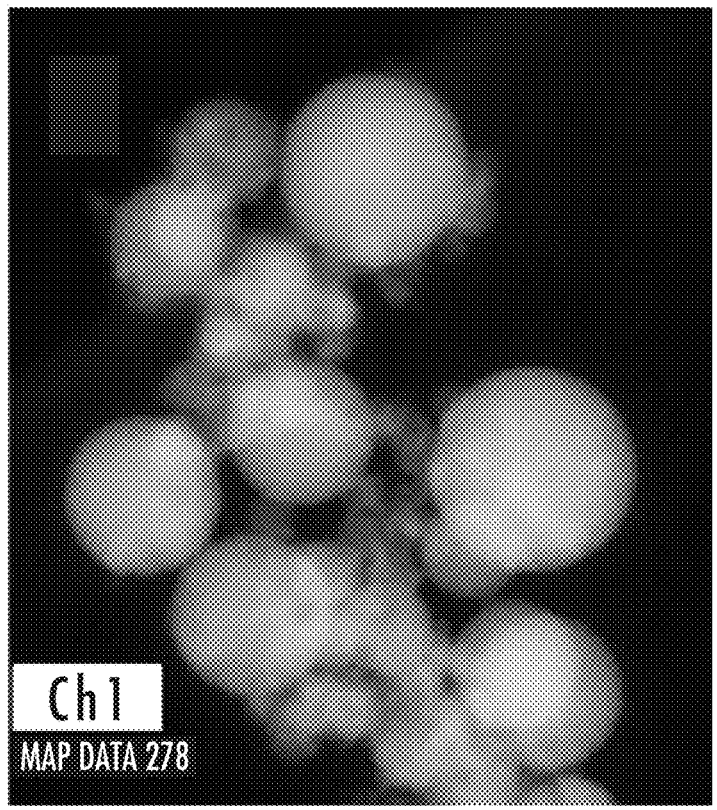
FIG. 22B depicts an EDX mapping of a sample of the PtCuCo-2 ternary alloy synthesized via tandem LASiS-GRR, as illustrated from FIG. 22A.
Figure 22C:
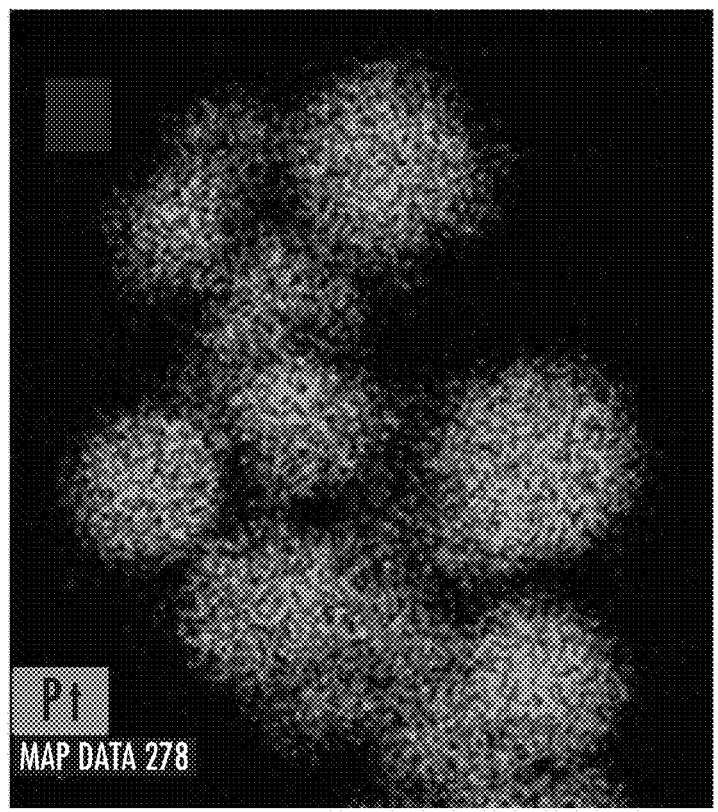
FIG. 22C depicts a corresponding EDX mapping of Pt from FIG. 22B.
Figure 22D:
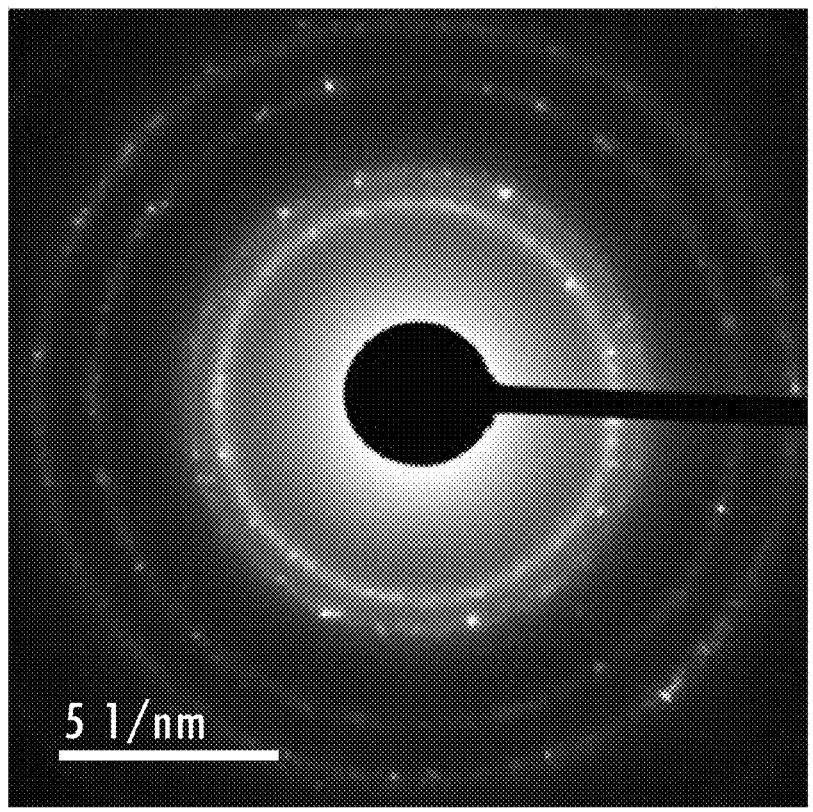
FIG. 22D depicts a SAED image at a scale of 5 (1/nm) of the PtCuCo-2 ternary alloy.
Figure 22E:
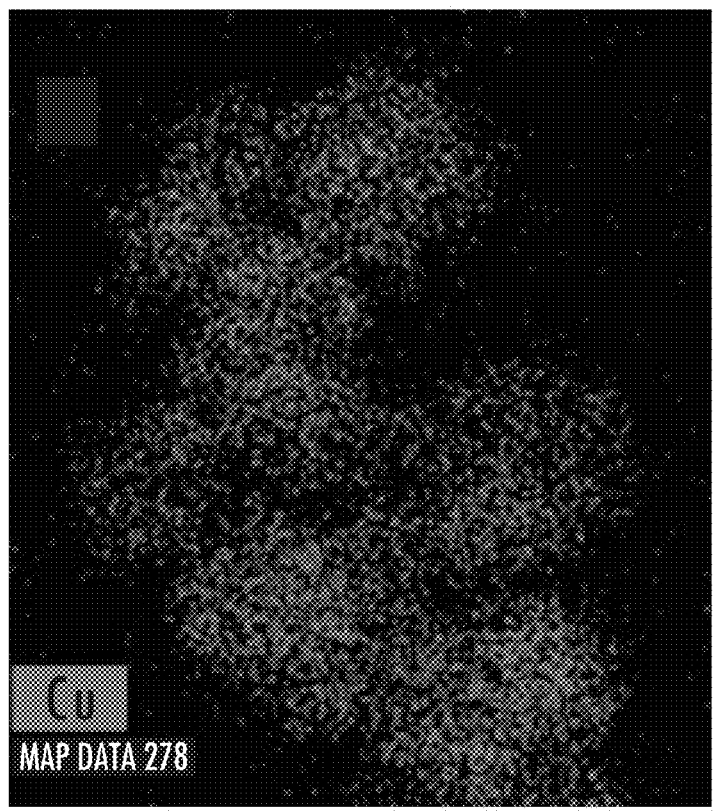
FIG. 22E depicts a corresponding EDX mapping of Cu from FIG. 22B.
Figure 22F:
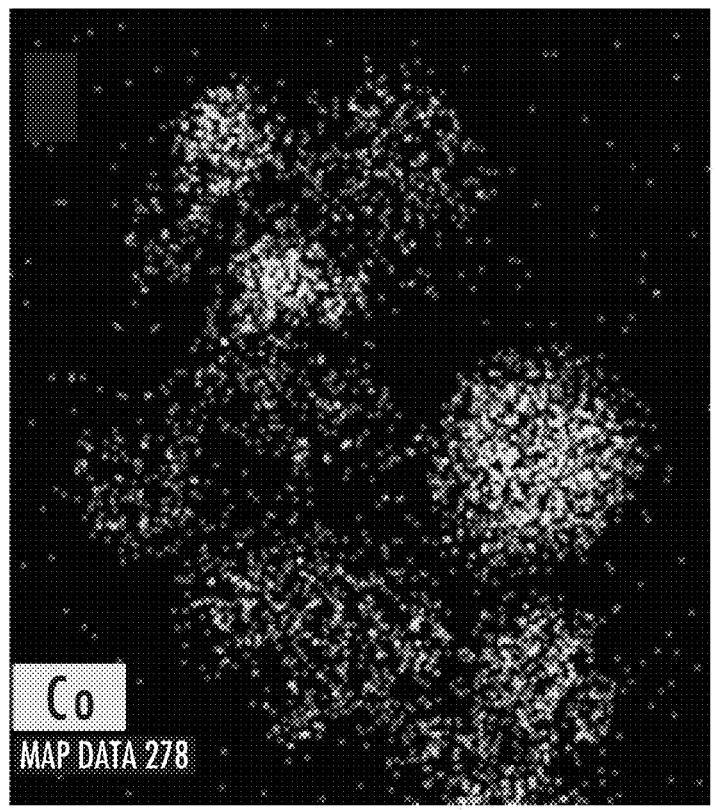
FIG. 22F depicts a corresponding EDX mapping of Co from FIG. 22B.
Figure 23:
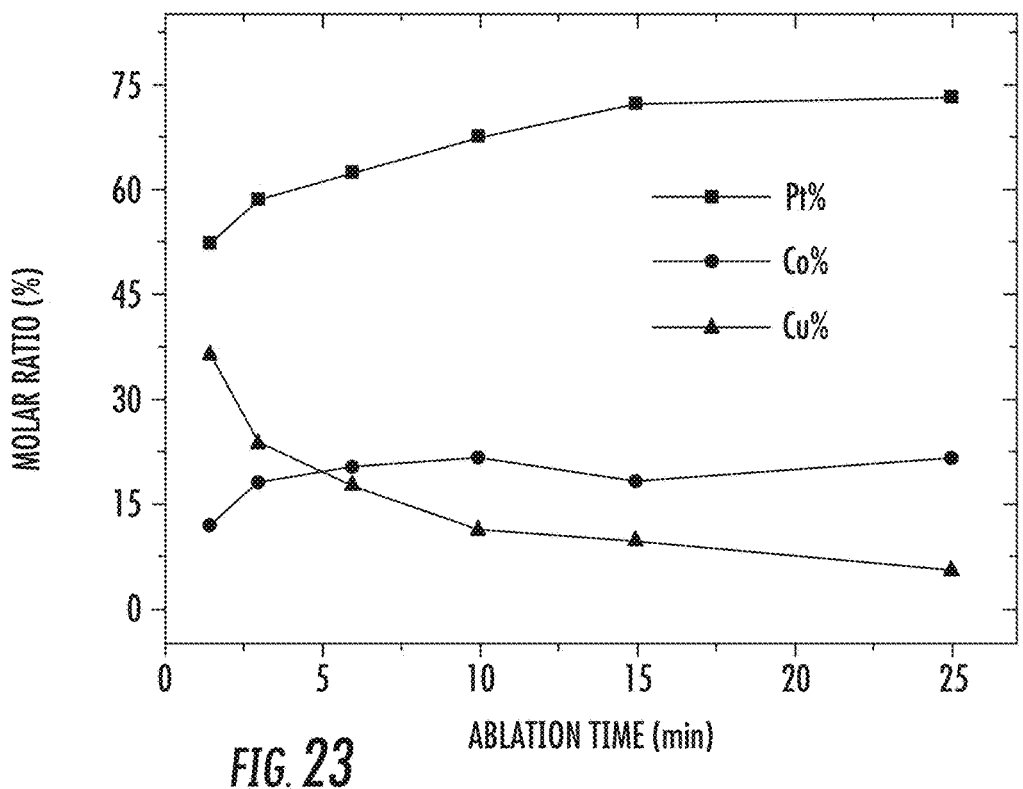
FIG. 23 depicts a graphical representation of elemental compositions of ternary alloys with a change of laser ablation time.

FIG. 22A illustrates a TEM image for a sample PtCuCo-2 ternary alloy synthesized via tandem LASiS-GRR, as described herein. By carrying out tandem LASiS-GRR on Co with both $K_2PtCl_4$ and CuCl as metal salt precursors, as well as applying the post treatment of acid wash and centrifugation, PtCuCo ternary NAs with various elemental ratios are produced. FIG. 22B illustrates the HAADF image for a sample of the PtCuCo-2 ternary alloy synthesized via tandem LASiS-GRR, as illustrated from FIG. 22A, while FIGS. 22C, 22E, and 22F illustrate corresponding EDX mappings of the three elements: Pt, Cu, and Co. Notably, the Co elemental distribution is not perfectly uniform. FIG. 22D illustrates a SAED image at a scale of 5 (1/nm) of the PtCuCo-2 ternary alloy. ICP-OES is used for quantifying the elemental composition of these ternary alloys with the change of laser ablation time, as is shown in FIG. 23.

In some aspects, Co elemental composition is kept at a relative stable value of around 16%, while Pt and Cu exhibit a gradual increase and reduction respectively, which is probably due to already formed Cu that goes through further GRR with $PtCl_4^{2-}$ during longer ablation time. In some aspects, by changing the CuCl salt concentration from 0 to 0.48 mM, while keeping the $K_2PtCl_4$ salt concentration at around 0.3 mM and ablation time at around 6 minutes, the evolution of the elemental composition changes are indicated in Table 4, where the Cu percentage (% at. ratio) is enhanced up to around 22% with increase in the initial CuCl quantity, whereas both Pt and Co ratio lowers down accordingly.

TABLE 4

| Sample | $K_2PtCl_4$ (mM) | CuCl (mM) | Ablation time (min) | Pt % | Co % | Cu % |
| --- | --- | --- | --- | --- | --- | --- |
| PtCo | 0.3 | 0 | 6 | 77 | 23 | 0 |
| PtCuCo-1 | | 0.03 | | 70 | 24 | 6 |
| PtCuCo-2 | | 0.12 | | 67 | 15 | 18 |
| PtCuCo-3 | | 0.48 | | 65 | 13 | 22 |

Figure 24:
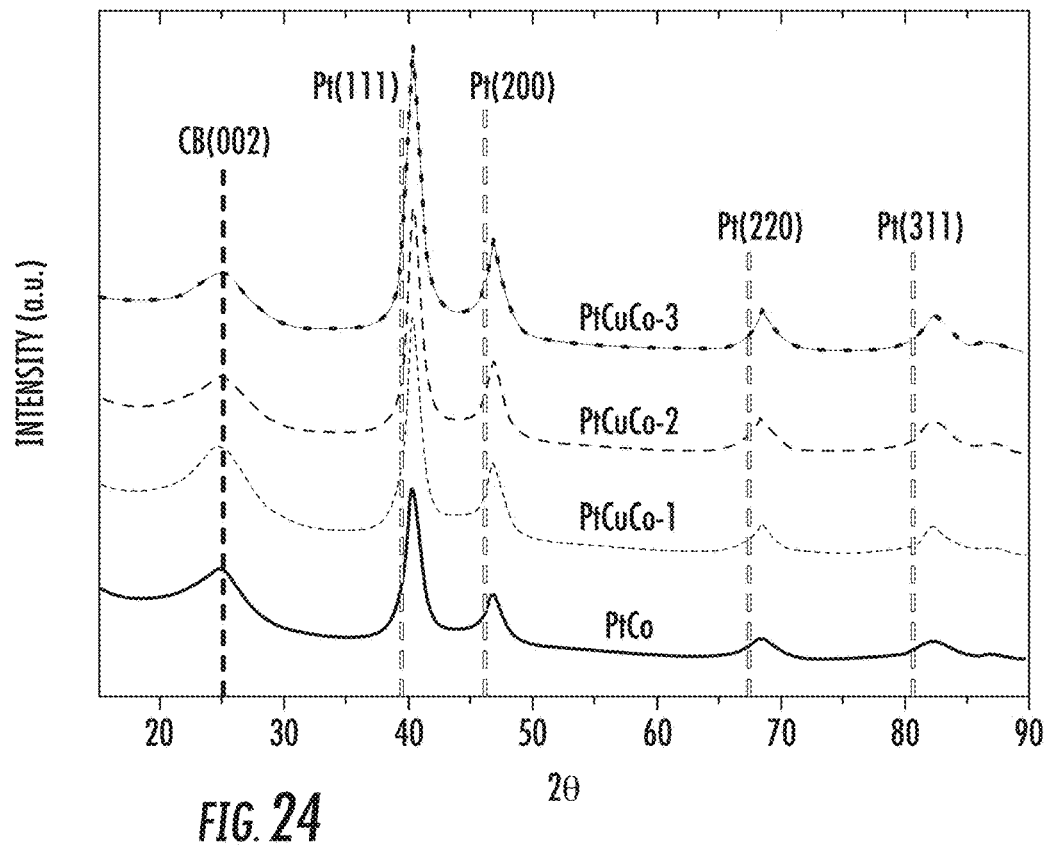
FIG. 24 depicts an XRD profile for PtCuCo NAs by identification of the Pt characteristic peak shift to higher 2-theta angles.

In some aspects, FIG. 24 illustrates an XRD profile for PtCuCo NAs by identification of the Pt characteristic peak shift to higher 2-theta angles.

REFERENCES

The references listed below as well as all references cited in the specification are incorporated herein by reference to the extent that they supplement, explain, provide a background for or teach methodology, techniques and/or compositions employed herein.

[1] E. Antolini, J. R. C. Salgado, M. J. Giz, E. R. Gonzalez, Effects of geometric and electronic factors on ORR activity of carbon supported Pt—Co electrocatalysts in PEM fuel cells, Int. J. Hydrogen Energy. 30 (2005) 1213-1220. doi:10.1016/j.ijhydene.2005.05.001.

[2] F. Godinez-Salomón, M. Hallen-López, O. Solorza-Feria, Enhanced electroactivity for the oxygen reduction on Ni@Pt core-shell nanocatalysts, Int. J. Hydrogen Energy. 37 (2012) 14902-14910. doi:10.1016/j.ijhydene.2012.01.157.
[3] J.-H. Jang, E. Lee, J. Park, G. Kim, S. Hong, Y.-U. Kwon, Rational syntheses of core-shell Fex@Pt nanoparticles for the study of electrocatalytic oxygen reduction reaction., Sci. Rep. 3 (2013) 2872. doi:10.1038/srep02872.
[4] S. Koh, M. F. Toney, P. Strasser, Activity-stability relationships of ordered and disordered alloy phases of Pt3Co electrocatalysts for the oxygen reduction reaction (ORR), Electrochim. Acta. 52 (2007) 2765-2774. doi:10.1016/j.electacta.2006.08.039.
[5] X. Li, H. R. Colón-Mercado, G. Wu, J.-W. Lee, B. N. Popov, Development of Method for Synthesis of Pt—Co Cathode Catalysts for PEM Fuel Cells, Electrochem. Solid-State Lett. 10 (2007) B201. doi:10.1149/1.2777009.
[6] Y.-J. Wang, N. Zhao, B. Fang, H. Li, X. T. Bi, H. Wang, Carbon-Supported Pt-Based Alloy Electrocatalysts for the Oxygen Reduction Reaction in Polymer Electrolyte Membrane Fuel Cells: Particle Size, Shape, and Composition Manipulation and Their Impact to Activity, Chem. Rev. (2015) 150414100746000. doi:10.1021/cr500519c.
[7] X. Zhao, S. Chen, Z. Fang, J. Ding, W. Sang, Y. Wang, et al., Octahedral Pd@Pt 1.8 Ni Core-Shell Nanocrystals with Ultrathin PtNi Alloy Shells as Active Catalysts for Oxygen Reduction Reaction, J. Am. Chem. Soc. 137 (2015) 2804-2807. doi:10.1021/ja511596c.
[8] C. Zhang, S. Y. Hwang, A. Trout, Z. Peng, Solid-state chemistry-enabled scalable production of octahedral Pt—Ni alloy electrocatalyst for oxygen reduction reaction, J. Am. Chem. Soc. 136 (2014) 7805-7808. doi:10.1021/ja501293x.
[9] Q.-H. Zhang, W.-H. Yang, H.-H. Wang, M.-Q. Wang, C.-J. Cai, Facile Synthesis of Platinum Alloy Nanoparticles with Enhanced Activity for Ethylene Glycol Electro-Oxidation, ECS Electrochem. Lett. 3 (2014) F73-F75. doi:10.1149/2.0031412eel.
[10] L. Han, P. Cui, H. He, H. Liu, Z. Peng, J. Yang, A seed-mediated approach to the morphology-controlled synthesis of bimetallic copper-platinum alloy nanoparticles with enhanced electrocatalytic performance for the methanol oxidation reaction, J. Power Sources. 286 (2015) 488-494. doi:10.1016/j.jpowsour.2015.04.003.
[11] N. M. Markovic, T. J. Schmidt, V. Stamenkovic, P. N. Ross, Oxygen Reduction Reaction on Pt and Pt Bimetallic Surfaces: A Selective Review, Fuel Cells. 1 (2001) 105-116. doi:10.1002/1615-6854(200107)1:2<105::aid-fuce105>3.3.co; 2-0.
[12] U. Paulus, a Wokaun, Oxygen Reduction on Carbon-Supported Pt—Ni and Pt—Co Alloy Catalysts, J. Phys. Chem. B. 106 (2002) 4181-4191. http://pubs.acs.org/doi/abs/10.1021/jp0134421.
[13] T. Toda, Enhancement of the Electroreduction of Oxygen on Pt Alloys with Fe, Ni, and Co, J. Electrochem. Soc. 146 (1999) 3750. doi:10.1149/1.1392544.
[14] V. R. Stamenkovic, B. S. Mun, M. Arenz, K. J. J. Mayrhofer, C. a Lucas, G. Wang, et al., Trends in electrocatalysis on extended and nanoscale Pt-bimetallic alloy surfaces., Nat. Mater. 6 (2007) 241-247. doi:10.1038/nmat1840.
[15] J. Greeley, I. E. L. Stephens, a S. Bondarenko, T. P. Johansson, H. a Hansen, T. F. Jaramillo, et al., Alloys of platinum and early transition metals as oxygen reduction electrocatalysts., Nat. Chem. 1 (2009) 552-556. doi:10.1038/nchem.367.
[16] J. Wu, H. Yang, Platinum-based oxygen reduction electrocatalysts, Acc. Chem. Res. 46 (2013) 1848-1857. doi:10.1021/ar300359w.
[17] US Department of Energy, Fuel Cell Technical Team Roadmap, June 2013, Http://Www.Eere.Energy.Gov/Vehiclesandfuels/Pdfs/Program/Fctt_Roadmap_June2013.Pdf. (2013). http://wwwl.eere.energy.gov/vehiclesandfuels/pdfs/program/fctt_roadmap_june2013.pdf.
[18] B. Chen, D. Cheng, J. Zhu, Synthesis of PtCu nanowires in nonaqueous solvent with enhanced activity and stability for oxygen reduction reaction, J. Power Sources. 267 (2014) 380-387. doi:10.1016/j.jpowsour.2014.05.104.
[19] J. Zhang, H. Yang, J. Fang, S. Zou, Synthesis and oxygen reduction activity of shape-controlled Pt(3)Ni nanopolyhedra, Nano Lett. 10 (2010) 638-644. doi:10.1021/nl903717z.
[20] Z. Zhu, Y. Zhai, S. Dong, Facial Synthesis of PtM (M=Fe, Co, Cu, Ni) Bimetallic Alloy Nanosponges and Their Enhanced Catalysis for Oxygen Reduction Reaction, ACS Appl. Mater. Interfaces. 6 (2014) 16721-16726. doi:10.1021/am503689t.
[21] C. Wang, D. Van Der Vliet, K. C. Chang, H. You, D. Strmcnik, J. a. Schlueter, et al., Monodisperse Pt3Co nanoparticles as a catalyst for the oxygen reduction reaction: Size-dependent activity, J. Phys. Chem. C. 113 (2009) 19365-19368. doi:10.1021/fjp908203p.
[22] C. Wang, N. M. Markovic, V. R. Stamenkovic, Advanced platinum alloy electrocatalysts for the oxygen reduction reaction, ACS Catal. 2 (2012) 891-898. doi:10.1021/cs3000792.
[23] X. Huang, L. Cao, Y. Chen, E. Zhu, Z. Lin, M. Li, et al., High-performance transition metal doped Pt 3 Ni octahedra for oxygen reduction reaction, Science (80-.). 4489 (2014).
[24] L. Gan, C. Cui, M. Heggen, F. Dionigi, S. Rudi, P. Strasser, Element-specific anisotropic growth of shaped platinum alloy nanocrystals, Science (80-.). 346 (2014).
[25] Y.-C. Hsieh, Y. Zhang, D. Su, V. Volkov, R. Si, L. Wu, et al., Ordered bilayer ruthenium-platinum core-shell nanoparticles as carbon monoxide-tolerant fuel cell catalysts, Nat. Commun. 4 (2013) 2466. doi:10.1038/ncomms3466.
[26] J. Li, G. Wang, J. Wang, S. Miao, M. Wei, F. Yang, et al., Architecture of PtFe/C catalyst with high activity and durability for oxygen reduction reaction, Nano Res. 7 (2014) 1519-1527. doi:10.1007/s12274-014-0513-1.
[27] H. Yano, M. Kataoka, H. Yamashita, H. Uchida, M. Watanabe, Oxygen reduction activity of carbon-supported Pt-M (M=V, Ni, Cr, Co, and Fe) alloys prepared by nanocapsule method, Langmuir. 23 (2007) 6438-6445. doi:10.1021/la070078u.
[28] S. Choi, M. Shao, N. Lu, A. Ruditskiy, H. Peng, J. Park, et al., Synthesis and Characterization of Pd @ Pt A Ni Core A Shell Octahedra with High Activity toward Oxygen Reduction, ACS Nano. (2014) 10363-10371. doi:10.1021/nn5036894.
[29] Q. Huang, H. Yang, Y. Tang, T. Lu, D. L. Akins, Carbon-supported Pt—Co alloy nanoparticles for oxygen reduction reaction, Electrochem. Commun. 8 (2006) 1220-1224. doi:10.1016/j.elecom.2006.05.027.
[30] D. Wang, H. L. Xin, R. Hovden, H. Wang, Y. Yu, D. a. Muller, et al., Structurally ordered intermetallic platinum-cobalt core-shell nanoparticles with enhanced activity and stability as oxygen reduction electrocatalysts, Nat. Mater. 12 (2012) 81-7. doi:10.1038/nmat3458.

[31] J. R. C. Salgado, E. Antolini, E. R. Gonzalez, Structure and Activity of Carbon-Supported Pt—Co Electrocatalysts for Oxygen Reduction, J. Phys. Chem. B. 108 (2004) 17767-17774. doi:10.1021/jp0486649.

[32] V. Stamenković, T. J. Schmidt, P. N. Ross, N. M. Markovic, Surface composition effects in electrocatalysis. Kinetics of oxygen reduction on well-defined Pt3Ni and Pt3Co alloy surfaces, J. Phys. Chem. B. 106 (2002) 11970-11979. doi:10.1021/jp021182h.

[33] C. a. Cortés-Escobedo, R. D. G. González-Huerta, A. M. Bolarín-MirÓ, F. Sánchez de Jesús, Q. Zhu, S. E. Canton, et al., Mechanically activated Pt—Ni and Pt—Co alloys as electrocatalysts in the oxygen reduction reaction, Int. J. Hydrogen Energy. 39 (2014) 16722-16730. doi: 10.1016/j.ijhydene.2014.03.025.

[34] J. W. Kim, J. H. Heo, S. J. Hwang, S. J. Yoo, J. H. Jang, J. S. Ha, et al., Effects of stabilizers on the synthesis of Pt3Cox/C electrocatalysts for oxygen reduction, Int. J. Hydrogen Energy. 36 (2011) 12088-12095. doi:10.1016/j.ijhydene.2011.06.137.

[35] H. T. Duong, M. a Rigsby, W. Zhou, A. Wieckowski, Oxygen Reduction Catalysis of the Pt 3 Co Alloy in Alkaline and Acidic Media Studied by X-ray Photoelectron Spectroscopy and Electrochemical Methods, Evaluation. (2007) 13460-13465.

[36] Q. He, S. Mukerjee, Electrocatalysis of oxygen reduction on carbon-supported PtCo catalysts prepared by water-in-oil micro-emulsion, Electrochim. Acta. 55 (2010) 1709-1719. doi:10.1016/j.electacta.2009.10.054.

[37] B. J. Hwang, S. Murugesan, S. Kumar, C. Chen, M. Cheng, D. Liu, et al., An Investigation of Structure—Catalytic Activity Relationship for Pt—Co/C Bimetallic Nanoparticles toward the Oxygen Reduction Reaction, J. Phys. Chem. C. (2007) 15267-15276.

[38] S. C. Zignani, E. Antolini, E. R. Gonzalez, Evaluation of the stability and durability of Pt and Pt—Co/C catalysts for polymer electrolyte membrane fuel cells, J. Power Sources. 182 (2008) 83-90. doi:10.1016/j.jpowsour.2008.03.061.

[39] M. K. Carpenter, T. E. Moylan, R. S. Kukreja, M. H. Atwan, M. M. Tessema, Solvothermal synthesis of platinum alloy nanoparticles for oxygen reduction electrocatalysis, J. Am. Chem. Soc. 134 (2012) 8535-8542. doi:10.1021/ja300756y.

[40] E. I. Santiago, L. C. Varanda, H. M. Villullas, Carbon-supported Pt—Co catalysts prepared by a modified polyol process as cathodes for PEM fuel cells, J. Phys. Chem. C. 111 (2007) 3146-3151. doi:10.1021/jp0670081.

[41] Z. Liu, C. Yu, I. a. Rusakova, D. Huang, P. Strasser, Synthesis of Pt3Co alloy nanocatalyst via reverse micelle for oxygen reduction reaction in PEMFCs, Top. Catal. 49 (2008) 241-250. doi:10.1007/si 1244-008-9083-2.

[42] N. Kristian, Y. Yu, J. M. Lee, X. Liu, X. Wang, Synthesis and characterization of Cocore-Ptshell electrocatalyst prepared by spontaneous replacement reaction for oxygen reduction reaction, Electrochim. Acta. 56 (2010) 1000-1007. doi:10.1016/j.electacta.2010.09.073.

[43] J. N. Zheng, L. L. He, C. Chen, A. J. Wang, K. F. Ma, J. J. Feng, One-pot synthesis of platinum3cobalt nanoflowers with enhanced oxygen reduction and methanol oxidation, J. Power Sources. 268 (2014) 744-751. doi:10.1016/j.jpowsour.2014.06.109.

[44] J. D. Blakemore, H. B. Gray, J. R. Winkler, A. M. Müller, Co3 O 4 nanoparticles made by pulsed-laser ablation in liquids as high activity catalysts for water oxidation, ACS Catal. 3 (2013) 2497-2500.

[45] G. Ledoux, D. Amans, C. Dujardin, K. Masenelli-Varlot, Facile and rapid synthesis of highly luminescent nanoparticles via pulsed laser ablation in liquid, Nanotechnology. 20 (2009) 445605. doi:10.1088/0957-4484/20/44/445605.

[46] L. Liao, Q. Zhang, Z. Su, Z. Zhao, Y. Wang, Y. Li, et al., Efficient solar water-splitting using a nanocrystalline CoO photocatalyst, Nat. Nanotechnol. 9 (2014) 69-73. doi:10.1038/nnano.2013.272.

[47] V. Amendola, M. Meneghetti, Laser ablation synthesis in solution and size manipulation of noble metal nanoparticles, Phys. Chem. Chem. Phys. 11 (2009) 3805-3821. doi:10.1039/b900654k.

[48] G. Cristoforetti, E. Pitzalis, R. Spiniello, R. Ishak, M. Muniz-Miranda, Production of palladium nanoparticles by pulsed laser ablation in water and their characterization, J. Phys. Chem. C. 115 (2011) 5073-5083. doi:10.1021/jp109281q.

[49] K. Y. Niu, J. Yang, S. a. Kulinich, J. Sun, X. W. Du, Hollow nanoparticles of metal oxides and sulfides: Fast preparation via laser ablation in liquid, Langmuir. 26 (2010) 16652-16657. doi:10.1021/la1033146.

[50] V. Amendola, M. Meneghetti, What controls the composition and the structure of nanomaterials generated by laser ablation in liquid solution?, Phys. Chem. Chem. Phys. 15 (2012) 3027-46. doi:10.1039/c2cp42895d.

[51] P. Liu, W. Cai, M. Fang, Z. Li, H. Zeng, J. Hu, et al., Room temperature synthesized rutile TiO(2) nanoparticles induced by laser ablation in liquid and their photocatalytic activity, Nanotechnology. 20 (2009) 285707. doi:10.1088/0957-4484/20/28/285707.

[52] P. Liu, H. Cui, C. X. Wang, G. W. Yang, From nanocrystal synthesis to functional nanostructure fabrication: laser ablation in liquid, Phys. Chem. Chem. Phys. 12 (2010) 3942-3952. doi:10.1039/b918759f.

[53] a. Miotello, R. Kelly, Laser-induced phase explosion: New physical problems when a condensed phase approaches the thermodynamic critical temperature, Appl. Phys. A Mater. Sci. Process. 69 (1999) 67-73. doi:10.1007/s003399900296.

[54] S. Barcikowski, G. Compagnini, Advanced nanoparticle generation and excitation by lasers in liquids, Phys. Chem. Chem. Phys. 15 (2013) 3022-6. doi:10.1039/c2cp90132c.

[55] P. Wagener, S. Ibrahimkutty, A. Menzel, A. Plech, S. Barcikowski, Dynamics of silver nanoparticle formation and agglomeration inside the cavitation bubble after pulsed laser ablation in liquid, Phys. Chem. Chem. Phys. 15 (2013) 3068-3074. doi:10.1039/c2cp42592k.

[56] S. Hu, C. Melton, D. Mukherjee, A facile route for the synthesis of nanostructured oxides and hydroxides of cobalt using laser ablation synthesis in solution (LASIS), Phys. Chem. Chem. Phys. 16 (2014) 24034-24044. doi:10.1039/C4CP03018D.

[57] H. Zeng, X. W. Du, S. C. Singh, S. a. Kulinich, S. Yang, J. He, et al., Nanomaterials via laser ablation/irradiation in liquid: A review, Adv. Funct. Mater. 22 (2012) 1333-1353. doi:10.1002/adfm.201102295.

[58] G. Sievers, S. Mueller, A. Quade, F. Steffen, S. Jakubith, A. Kruth, et al., Mesoporous Pt—Co oxygen reduction reaction (ORR) catalysts for low temperature proton exchange membrane fuel cell synthesized by alternating sputtering, J. Power Sources. 268 (2014) 255-260. doi:10.1016/j.jpowsour.2014.06.013.

[59] A. Schenk, C. Grimmer, M. Perchthaler, S. Weinberger, B. Pichler, C. Heinzl, et al., Platinum-cobalt catalysts for the oxygen reduction reaction in high temperature proton exchange membrane fuel cells—Long term behavior under ex-situ and in-situ conditions, J. Power Sources. 266 (2014) 313-322. doi.10.1016/j.jpowsour.2014.05.023.

[60] C. Wang, M. Chi, D. Li, D. Van Der Vliet, G. Wang, Q. Lin, et al., Synthesis of homogeneous Pt-bimetallic nanoparticles as highly efficient electrocatalysts, ACS Catal. 1 (2011) 1355-1359. doi:10.1021/cs200328z.

[61] S. Hu, G. Goenaga, C. Melton, T. Zawodzinski and D. Mukherjee, PtCo/CoO$_x$ Nanocomposites: Bifunctional Electrocatalysts for Oxygen Reduction and Evolution Reactions Synthesized via Tandem Laser Ablation Synthesis in Solution-Galvanic Replacement Reactions *Appl. Calal. B (Environ.)*, 2015 (Accepted).

[62] Y. Gorlin, T. F. Jaramillo, A bifunctional nonprecious metal catalyst for oxygen reduction and water oxidation, J. Am. Chem. Soc. 132 (2010) 13612-13614. doi:10.1021/ja104587v.

[63] R. Lin, C. Cao, T. Zhao, Z. Huang, B. Li, A. Wieckowski, et al., Synthesis and application of core-shell Co@Pt/C electrocatalysts for proton exchange membrane fuel cells, J. Power Sources. 223 (2013) 190-198. doi: 10.1016/j.jpowsour.2012.09.073.

[64] J.-H. Jang, E. Lee, J. Park, G. Kim, S. Hong, Y.-U. Kwon, Rational syntheses of core-shell Fex@Pt nanoparticles for the study of electrocatalytic oxygen reduction reaction, Sci. Rep. 3 (2013) 2872. doi:10.1038/srep02872.

[65] Y. Huang, J. Zhang, a. Kongkanand, F. T. Wagner, J. C. M. Li, J. Jorne, Transient Platinum Oxide Formation and Oxygen Reduction on Carbon-Supported Platinum and Platinum-Cobalt Alloy Electrocatalysts, J. Electrochem. Soc. 161 (2013) F10-F15. doi:10.1149/2.018401jes.

[66] A. Grimaud, K. J. May, C. E. Carlton, Y.-L. Lee, M. Risch, W. T. Hong, et al., Double perovskites as a family of highly active catalysts for oxygen evolution in alkaline solution, Nat. Commun. 4 (2013) 2439. doi: 10.1038/ncomms3439.

[67] J. Suntivich, K. J. May, H. a. Gasteiger, J. B. Goodenough, Y. Shao-Horn, A Perovskite Oxide Optimized for Oxygen Evolution Catalysis from Molecular Orbital Principles, Science (80-.). 334 (2011) 1383-1385. doi: 10.1126/science.1212858.

[68] Y. Zhu, C. Su, X. Xu, W. Zhou, R. Ran, Z. Shao, A Universal and Facile Way for the Development of Superior Bifunctional Electrocatalysts for Oxygen Reduction and Evolution Reactions Utilizing the Synergistic Effect, Chem. —A Eur. J. 20 (2014) 15533-15542. doi:10.1002/chem.201403192.

[69] S. Shan, J. Luo, J. Wu, N. Kang, W. Zhao, H. Cronk, et al., Nanoalloy catalysts for electrochemical energy conversion and storage reactions, Rsc Adv. 4 (2014) 42654-42669. doi:10.1039/c4ra05943c.

[70] R. Loukrakpam, S. Shan, V. Petkov, L. Yang, J. Luo, C. J. Zhong, Atomic ordering enhanced electrocatalytic activity of nanoalloys for oxygen reduction reaction, J. Phys. Chem. C. 117 (2013) 20715-20721. doi: 10.1021fjp4067444.

[71] J. M. Jaksic, D. Labou, G. D. Papakonstantinou, A. Siokou, M. M. Jaksic, Novel spillover interrelating reversible electrocatalysts for oxygen and hydrogen electrode reactions, J. Phys. Chem. C. 114 (2010) 18298-18312. doi:10.1021/jp105491k.

[72] W. Jin, H. Du, S. Zheng, H. Xu, Y. Zhang, Comparison of the oxygen reduction reaction between NaOH and KOH solutions on a Pt electrode: The electrolyte-dependent effect, J. Phys. Chem. B. 114 (2010) 6542-6548. doi.10.1021/jp102367u.

[73] Y. J. Sa, K. Kwon, J. Y. Cheon, F. Kleitz, S. H. Joo, Ordered mesoporous Co3O4 spinels as stable, bifunctional, noble metal-free oxygen electrocatalysts, J. Mater. Chem. A. 1 (2013) 9992. doi:10.1039/c3ta11917c.

[74] Q. Yin, J. M. Tan, C. Besson, Y. V Geletii, D. G. Musaev, A. E. Kuznetsov, et al., A fast soluble carbon-free molecular water oxidation catalyst based on abundant metals, Science. 328 (2010) 342-345. doi:10.1126/science.1185372.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A metal heteronanostructure comprising:
   a substantially uniform alloyed core of a first metal and at least one second metal; and
   a shell or matrix surrounding the substantially uniform alloyed core, the shell or matrix comprising one of the first metal and the at least one second metal.

2. The metal heteronanostructure of claim 1, wherein the shell or matrix comprises an oxide of one of the first metal and the at least one second metal such that the metal heteronanostructure is a metal nanocomposite.

3. The metal heteronanostructure of claim 1, wherein the at least one second metal has a higher redox potential than the first metal.

4. The metal heteronanostructure of claim 3, wherein the first metal comprises a non-precious, transition metal and the at least one second metal comprises at least one precious metal having a higher redox potential than the non-precious, transition metal.

5. The metal heteronanostructure of claim 4, wherein the shell or matrix surrounding the substantially uniform alloyed core comprises the non-precious, transition metal.

6. The metal heteronanostructure of claim 1, wherein the metal heteronanostructure is produced using tandem laser ablation synthesis in solution-galvanic replacement reaction (LASIS-GRR).

7. The metal heteronanostructure of claim 6, wherein at least one characteristic of the metal heteronanostructure is configured to be tailored during the tandem LASIS-GRR by tuning one or more reaction parameter and/or one or more functional parameter during the tandem LASIS-GRR.

8. The metal heteronanostructure of claim 7, wherein the at least one characteristic comprises a size, a shape, a structure, and/or a composition of the metal heteronanostructure.

9. The metal heteronanostructure of claim 1, wherein the metal heteronanostructure is a binary nanocomposite selected from the group consisting of PtCo/CoOx, PdCo/CoOx, Ag/ZnO, and Ag/TiOx.

10. The metal heteronanostructure of claim 1, wherein the substantially uniform alloyed core comprises a uniform precious metal to at least one non-precious, transition metal ratio, with a non-precious transition metal percentage ranging from 0-38%.

11. The metal heteronanostructure of claim 1, wherein the metal heteronanostructure is stable under acidic and/or alkaline conditions.

12. The metal heteronanostructure of claim 1, wherein the metal heteronanostructure is a binary metal nanoalloy selected from the group consisting of PtCo, PtNi, PtCu, and PdCo.

13. The metal heteronanostructure of claim 1, further comprising a third metal, wherein the substantially uniform alloyed core comprises the first metal, the second metal, and the third metal; and the shell or matrix surrounding the substantially uniform alloyed core comprises one or more of the first metal, the second metal, and the third metal.

14. The metal nanocomposite of claim 13, wherein the third metal has a higher redox potential than the first metal, the second metal, or both the first metal and the second metal.

15. The metal heteronanostructure of claim 1, wherein the metal heteronanostructure is a ternary metal nanoalloy selected from the group consisting of PtCuCo, PtCoMn, and PtCoNi.

16. The metal heteronanostructure of claim 1, wherein the metal heteronanostructure comprises a degree of alloying approximately between 40-60%.

17. The metal heteronanostructure of claim 1, wherein the metal heteronanostructure comprises a mean crystallite size approximately between 3-18 nm.

18. The metal heteronanostructure of claim 1, wherein the metal heteronanostructure comprises shrinkage in lattice constant approximately between 0 to 2.4%.

19. A catalyst composition comprising a metal heteronanostructure of claim 1.

\* \* \* \* \*